US010038731B2

(12) United States Patent
Pearl et al.

(10) Patent No.: US 10,038,731 B2
(45) Date of Patent: Jul. 31, 2018

(54) MANAGING FLOW-BASED INTERACTIONS WITH CLOUD-BASED SHARED CONTENT

(71) Applicant: Box, Inc., Redwood City, CA (US)

(72) Inventors: Anne Elizabeth Hiatt Pearl, Los Gatos, CA (US); Jenica Nash Blechschmidt, San Francisco, CA (US); Natalia Vinnik, Mountain View, CA (US); Robert Kyle Waldrop, San Francisco, CA (US); Sam Michael Devlin, San Francisco, CA (US); Steven Luis Cipolla, San Francisco, CA (US); Sesh Jalagam, Union City, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 15/243,695

(22) Filed: Aug. 22, 2016

(65) Prior Publication Data
US 2017/0048285 A1 Feb. 16, 2017

Related U.S. Application Data

(63) Continuation-in-part of application No. 14/474,008, filed on Aug. 29, 2014.
(Continued)

(51) Int. Cl.
*G06F 15/16* (2006.01)
*H04L 29/06* (2006.01)
(Continued)

(52) U.S. Cl.
CPC .......... *H04L 65/403* (2013.01); *G06F 17/301* (2013.01); *G06F 17/3007* (2013.01);
(Continued)

(58) Field of Classification Search
CPC .. G06F 17/30115; H04L 65/403; H04L 67/10; H04L 67/32
(Continued)

(56) References Cited

U.S. PATENT DOCUMENTS

| 858,619 A | 7/1907 | O'Farrell |
| 5,748,735 A | 5/1998 | Ganesan |

(Continued)

FOREIGN PATENT DOCUMENTS

| CA | 2724521 | 11/2009 |
| CN | 101997924 A | 3/2011 |

(Continued)

OTHER PUBLICATIONS

Exam Report for GB1309209.3 Applicant: Box, Inc. dated Jan. 19, 2015, 6 pages.
(Continued)

*Primary Examiner* — Normin Abedin
(74) *Attorney, Agent, or Firm* — Vista IP Law Group, LLP

(57) ABSTRACT

Systems for managing content in a cloud-based service platform. A server in a cloud-based environment is interfaced with storage devices that hold one or more stored objects accessible by two or more users. The stored objects comprise folders and files as well as other objects such as workflow objects that are associated with the folders or the files. The workflow objects comprise workflow metadata that describes a workflow as a set of workflow tasks to be carried out in a progression. Processing of a workflow task and/or carrying out a portion of the progression includes modification of shared content objects. The processing or modification events are detected through workflow events, which in turn cause one or more workflow responses to be generated. Workflow responses comprise updates to the
(Continued)

workflow metadata to record progression through the workflow and/or workflow responses comprise updates to any one or more of the stored objects.

20 Claims, 28 Drawing Sheets

Related U.S. Application Data

(60) Provisional application No. 62/214,176, filed on Sep. 3, 2015, provisional application No. 62/234,024, filed on Sep. 28, 2015.

(51) Int. Cl.
  *H04L 29/08* (2006.01)
  *H04W 4/60* (2018.01)
  *G06F 17/30* (2006.01)
  *H04W 4/00* (2018.01)
  *H04L 12/24* (2006.01)

(52) U.S. Cl.
  CPC .... *G06F 17/30165* (2013.01); *H04L 41/0823* (2013.01); *H04L 67/10* (2013.01); *H04L 67/32* (2013.01); *H04W 4/003* (2013.01); *H04W 4/60* (2018.02)

(58) Field of Classification Search
  USPC ........................................................ 709/205
  See application file for complete search history.

(56) References Cited

U.S. PATENT DOCUMENTS

| | | |
|---|---|---|
| 5,787,175 A | 7/1998 | Carter |
| 5,799,320 A | 8/1998 | Klug |
| 5,848,415 A | 12/1998 | Guck |
| 5,864,870 A | 1/1999 | Guck |
| 5,987,480 A | 11/1999 | Donohue |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,057,841 A | 5/2000 | Thurlow et al. |
| 6,073,161 A | 6/2000 | DeBoskey et al. |
| 6,098,078 A | 8/2000 | Gehani et al. |
| 6,226,618 B1 | 5/2001 | Downs et al. |
| 6,226,630 B1 | 5/2001 | Billmers |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,178,021 B1 | 2/2007 | Hanna et al. |
| 7,222,078 B2 | 5/2007 | Abelow |
| 7,275,244 B1 | 9/2007 | Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | VoQler Ivashchanka et al. |
| 7,937,663 B2 | 5/2011 | Parker et al. |
| 7,958,353 B2 | 6/2011 | Matsuzaki et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eaqan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,214,747 B1 | 7/2012 | Yankovich et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,464,161 B2 | 6/2013 | Giles et al. |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,582,777 B2 | 11/2013 | Urivskiy et al. |
| 8,583,619 B2 | 11/2013 | Ghods et al. |
| 8,607,306 B1 | 12/2013 | Bridge et al. |
| 8,650,498 B1 | 2/2014 | Mihovilovic |
| 8,719,445 B2 | 5/2014 | Ko |
| 8,745,267 B2 | 6/2014 | Luecke et al. |
| 8,825,597 B1 | 9/2014 | Houston et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,856 B1 | 12/2014 | Velummylum et al. |

(56) References Cited

U.S. PATENT DOCUMENTS

| | | |
|---|---|---|
| 8,914,900 B2 | 12/2014 | Smith et al. |
| 8,918,387 B1 | 12/2014 | Sokolov |
| 8,949,939 B2 | 2/2015 | Peddada |
| 8,959,579 B2 | 2/2015 | Barton et al. |
| 8,966,062 B1 | 2/2015 | Giese et al. |
| 8,990,955 B2 | 3/2015 | Hymel et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0021686 A1 | 2/2004 | Barberis |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0143597 A1* | 7/2004 | Benson ................. G06Q 10/10 |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0038997 A1 | 2/2005 | Kojima et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0101328 A1 | 5/2006 | Albornoz et al. |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0016680 A1 | 1/2007 | Burd et al. |
| 2007/0038934 A1 | 2/2007 | Fellman |
| 2007/0067349 A1 | 3/2007 | Jhaveri et al. |
| 2007/0079242 A1 | 4/2007 | Jolley et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0162610 A1 | 7/2007 | Un et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0119322 A1 | 5/2009 | Mills et al. |

(56) References Cited

U.S. PATENT DOCUMENTS

| | | |
|---|---|---|
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samii et al. |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0234850 A1 | 9/2009 | Kocsis |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0259694 A1 | 10/2009 | Hama |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | FitzGerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xionq et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0142410 A1 | 6/2011 | Ishii |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0096521 A1 | 4/2012 | Peddada |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |

(56) References Cited

U.S. PATENT DOCUMENTS

| | | |
|---|---|---|
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna Venkata et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0222106 A1 | 8/2012 | Kuehl |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007587 A1 | 1/2013 | Marantz |
| 2013/0007894 A1 | 1/2013 | Danq et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0103677 A1 | 4/2013 | Chakra |
| 2013/0110565 A1 | 5/2013 | Means, Jr. et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0179799 A1 | 7/2013 | Savage |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0262210 A1 | 10/2013 | Savaqe et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282776 A1 | 10/2013 | Durrant |
| 2013/0282830 A1 | 10/2013 | Besen et al. |
| 2013/0305039 A1 | 11/2013 | Gauda |
| 2013/0326344 A1 | 12/2013 | Masselle et al. |
| 2013/0346444 A1* | 12/2013 | Makkar ............ G06F 17/30997 |
| | | 707/770 |
| 2014/0007205 A1 | 1/2014 | Oikonomou |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0059217 A1 | 2/2014 | Pizurica |
| 2014/0068589 A1 | 3/2014 | Barak |
| 2014/0074629 A1 | 3/2014 | Rathod |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0208414 A1* | 7/2014 | Brandwine ......... G06F 21/6218 |
| | | 726/17 |
| 2014/0344456 A1 | 11/2014 | Buzbee et al. |
| 2014/0359286 A1 | 12/2014 | Wen et al. |
| 2015/0019723 A1 | 1/2015 | Kweon et al. |
| 2015/0081624 A1 | 3/2015 | Masse et al. |
| 2015/0082197 A1 | 3/2015 | Pearl et al. |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |

(56) References Cited

FOREIGN PATENT DOCUMENTS

| | | |
|---|---|---|
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

Agilewords—How to Request Approval, YouTube, http://www.youtube.com/watch?v=3-0v3DYNN3Q, Jan. 31, 2011, 2 pages.

Agilewords—Features, Powerful Features Yet Simple, Jun. 1, 2011, http://web.archive.org/web/20110601223756/hltp:// agilewords.com/product/features, 3 pages.

Conner, "Google Apps: The Missing Manual," published by O'Reilly Media, May 27, 2008, 42 pages.

Exam Report for EP 13177108.1, Applicant: Box, Inc. dated Feb. 17, 2015, 6 pages.

Exam Report for GB1312264.3 Applicant: Box, Inc. dated Jan. 30, 2015, 5 pages.

Exam Report for GB1312874.9 Applicant: Box, Inc. dated Feb. 10, 2015, 7 pages.

Exam Report for GB1316685.5 Applicant: Box, Inc. dated Feb. 17, 2015, 5 pages.

Exam Report for EP 13185269.1, Applicant: Box, Inc. dated Feb. 13, 2015, 8 pages.

Exam Report for GB1316532.9 Applicant: Box, Inc. dated Mar. 27, 2015, 6 pages.

Burney, "How to Move Document from Your Computer to Your iPad and Back Again," May 31, 2011, 3 pages.

Exam Report for GB1311459.0 Applicant: Box, Inc. dated Aug. 19, 2013, 6 pages.

Dropbox: Sync only specific folders, posted on Feb. 9, 2012, available online at http://www.tech-recipes.com/ rx/20865/dropbox-sync-only-specific-folders/, 4 pages.

Extended Search Report for EP131832800, Applicant: Box, Inc. dated Aug. 25, 2014, 7 pages.

Extended Search Report for EP141509422, Applicant: Box, Inc. dated Aug. 26, 2014, 12 pages.

Search Report for EP 13189144.2 Applicant: Box, Inc. dated Sep. 1, 2014, 9 pages.

Exam Report for GB1312874.9 Applicant: Box, Inc. dated Sep. 26, 2014, 2 pages.

Exam Report for GB1415126.0 Applicant: Box, Inc. dated Oct. 2, 2014, 8 pages.

Exam Report for GB1415314.2 Applicant: Box, Inc. dated Oct. 7, 2014, 6 pages.

Exam Report for GB1309209.3 Applicant: Box, Inc. dated Oct. 7, 2014, 3 pages.

Exam Report for GB1315232.7 Applicant: Box, Inc. dated Oct. 9, 2014, 5 pages.

Exam Report for GB1318789.3 Applicant: Box, Inc. dated Oct. 30, 2014, 6 pages.

Microsoft Windows XP Professional Product Documentation: How Inheritance Affects File and Folder Permissions, Apr. 11, 2014, 2 pages.

Exam Report for GB1317393.5 Applicant: Box, Inc. dated Nov. 7, 2014, 6 pages.

Exam Report for GB1311417.8 Applicant: Box, Inc. dated Nov. 7, 2014, 2 pages.

Exam Report for GB1311421.0 Applicant: Box, Inc. dated Nov. 7, 2014, 4 pages.

Exam Report for GB1316682.2 Applicant: Box, Inc. dated Nov. 19, 2014, 6 pages.

Exam Report for GB1312095.1 Applicant: Box, Inc. dated Nov. 19, 2014, 5 pages.

Exam Report for GB1313559.5 Applicant: Box, Inc. dated Nov. 4, 2014, 2 pages.

User's Guide for Smart Board Software for Windows, published Dec. 2004, 90 pages.

Zambonini et al., "Automated Measuring of Interaction with User Interfaces," Published as WO2007113573 Oct. 2007, 19 pages.

Non-Final Office Action dated Oct. 24, 2016 for U.S. Appl. No. 14/474,008.

Notice of Allowance dated Jun. 8, 2017 for U.S. Appl. No. 14/474,008.

"Average Conversion Time for a D60 RAW file?" http://www.dpreview.com, Jul. 22, 2002, 4 pages.

"Conceptboard", One-Step Solution for Online Collaboration, retrieved from websites http://conceptboard.com and https://www.youtube.com/user/ConceptboardApp?feature=watch, printed on Jun. 13, 2013, 9 pages.

"How-to Geek, How to Sync Specific Folders With Dropbox," downloaded from the internet http://www.howtogeek.com, Apr. 23, 2013, 5 pages.

"Microsoft Office SharePoint 2007 User Guide," Feb. 16, 2010, pp. 1-48.

"PaperPort Professional 14," PC Mag. Com review, published Feb. 2012, Ziff Davis, Inc., 8 pages.

"PaperPort," Wikipedia article (old revision), published May 19, 2012, Wikipedia Foundation, 2 pages.

"Quickoffice Enhances Android Mobile office Application for Improved Productivity on latest Smartphone and Table Devices," QuickOffice Press Release, Nov. 21, 2011, QuickOffice Inc., 2 pages.

"QuickOffice," Wikipedia Article (old revision), published May 9, 2012, Wikipedia Foundation, 2 pages.

"Revolving sync conflicts; frequently asked questions," Microsoft Tech Support, Jul. 16, 2012, retrieved from the Internet: http://web.archive.org/web, 2 pages.

"Troubleshoot sync problems," Microsoft Tech Support: May 2, 2012, retrieved from the internet, http://web. Archive.org/web, 3 pages.

"Tulsa TechFest 2012—Agenda," retrieved from the website, http://web.archive.org, Oct. 2, 2012, 2 pages.

"Understanding Metadata," National Information Standards Organization, NISO Press, 2004, 20 pages.

Burns, "Developing Secure Mobile Applications for Android," Oct. 2008, Version 1.0, 1-28 pages.

Cisco, "FTP Load Balancing on ACE in Routed Mode Configuration Example," DocWiki, Jun. 2011, 7 pages.

Cohen, "Debating the Definition of Cloud Computing Platforms," retrieved from the internet, http://forbes.com, Feb. 3, 2014, 7 pages.

Comes, "MediaXchange User's Manual," Version 1.15.15, Feb. 1, 2009, pp. 1-90.

Conner, "Google Apps: The Missing Manual," published by O'Reilly Media, May 27, 2008, 24 pages.

Delendik, "Evolving with Web Standards—The Story of PDF.JS," retrieved from the internet, http://people.mozilla.org, Oct. 12, 2012, 36 pages.

Delendik, "My PDF.js talk slides from Tulsa TechFest," retrieved from the internet, http://twitter.com, Oct. 12, 2012, 2 pages.

Duffy, "The Best File-Syncing Services," pcmag.com, retrieved from the internet: http://www.pcmag.com, Sep. 28, 2012, 7 pages.

Exam Report for EP13158415.3, Applicant: Box, Inc. dated Jun. 4, 2013, 8 pages.

Exam Report for EP13168784.0, Applicant: Box, Inc. dated Nov. 21, 2013, 7 pages.

Exam Report for EP13177108.1, Applicant: Box, Inc. dated May 26, 2014, 6 pages.

Exam Report for EP13185269.1, Applicant: Box, Inc. dated Jan. 28. 7 pages.

Exam Report for GB1300188.8, Applicant: Box, Inc. dated May 31, 2013, 8 pages.

Exam Report for GB1306011.6, Applicant: Box, Inc. dated Apr. 18, 2013, 8 pages.

Exam Report for GB1308842.2, Applicant: Box, Inc. dated Mar. 10, 2014, 4 pages.

Exam Report for GB1309209.3, Applicant: Box, Inc. dated Oct. 30, 2013, 11 pages.

(56) References Cited

OTHER PUBLICATIONS

Exam Report for GB1310666.1, Applicant: Box, Inc. dated Aug. 30, 2013, 10 pages.
Exam Report for GB1311417.8, Applicant: Box, Inc. dated Dec. 23, 2013, 5 pages.
Exam Report for GB1312095.1, Applicant: Box, Inc. dated Dec. 12, 2013, 7 pages.
Exam Report for GB1312264.3, Applicant: Box, Inc. dated Mar. 24, 2014, 7 pages.
Exam Report for GB1312874.9, Applicant: Box, Inc. dated Dec. 20, 2013, 11 pages.
Exam Report for GB1313559.5, Applicant: Box, Inc. dated Aug. 22, 2013, 19 pages.
Exam Report for GB1314771.5, Applicant: Box, Inc. dated Feb. 17, 2014, 7 pages.
Exam Report for GB1316532.9, Applicant: Box, Inc. dated Oct. 31, 2013, 10 pages.
Exam Report for GB1316533.7, Applicant: Box, Inc. dated Oct. 8, 2013, 9 pages.
Exam Report for GB1316971.9, Applicant: Box, Inc. dated Nov. 26, 2013, 10 pages.
Exam Report for GB1317600.3, Applicant: Box, Inc. dated Nov. 21, 2013, 8 pages.
Exam Report for GB1318373.6, Applicant: Box, Inc. dated Dec. 17, 2013, 4 pages.
Exam Report for GB1318792.7, Applicant: Box, Inc. dated Mar. 22, 2014, 2 pages.
Exam Report for GB1320902.8, Applicant: Box, Inc. dated Dec. 20, 2013, 6 pages.
Exam Report for GB1410569.6, Applicant: Box, Inc. dated Jul. 11, 2014, 9 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 dated Oct. 6, 2011, pp. 1-13.
International Search Report and Written Opinion for PCT/US2011/041308 dated Jul. 2, 2012, pp. 1-16.
International Search Report and Written Opinion for PCT/US2011/047530, Applicant: Box, Inc., dated Mar. 22, 2013, pp. 1-10.
International Search Report and Written Opinion for PCT/US2011/056472 dated Jun. 22, 2012, pp. 1-12.
International Search Report and Written Opinion for PCT/US2011/057938, Applicant: Box, Inc., dated Mar. 29, 2013, 10 pages.
International Search Report and Written Opinion for PCT/US2011/060875 dated Oct. 30, 2012, pp. 1-10.
International Search Report and Written Opinion for PCT/US2011/056955, Applicant: Box, Inc., dated Mar. 27, 2013, pp. 1-11.
International Search Report and Written Opinion for PCT/US2012/063041, Applicant: Box, Inc., dated Mar. 29, 2013, 12 pages.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/070366, Applicant: Box, Inc., dated Apr. 24, 2013, 10 pages.
International Search Report and Written Opinion for PCT/US2013/020267, Applicant: Box, Inc., dated May 7, 2013, 10 pages.
International Search Report and Written Opinion for PCT/US2013/023889, Applicant: Box, Inc., dated Jun. 24, 2013, 13 pages.
International Search Report and Written Opinion for PCT/US2013/034662, Applicant: Box, Inc., dated May 31, 2013, 10 pages.
International Search Report and Written Opinion for PCT/US2013/034765, Applicant: Box, Inc., dated Jan. 20, 2014, 15 pages.
International Search Report and Written Opinion for PCT/US2013/035404, Applicant: Box, Inc., dated Jun. 26, 2013, 11 pages.
International Search Report and Written Opinion for PCT/US2013/039782, Applicant: Box, Inc., dated Aug. 28, 2013, 15 pages.
Internet Forums, http://web.archive.org/web/20100528195550/http://en.wikipedia.org/wiki/Internet_forums, Wikipedia, May 30, 2010, pp. 1-20.
John et al., "Always Sync Support Forums—View topic—Allway sync funny behavior," Allway Sync Support Forum at http://sync-center.com, Mar. 28, 2011, XP055109680, 2 pages.
Langfeld L. et al., "Microsoft SharePoint 2003 Unleased," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Partial Search Report for EP131832800, Applicant: Box, Inc. dated May 8, 2014, 5 pages.
Patent Court Document of Approved Judgment for GB0602349.3 and GB0623571.7; Mar. 3, 2009, 17 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc To Add HTML5 Document Converter and Sleek Content Viewing Experience To Cloud Storage Platform," retrieved from the internet, http://techcrunch.com, May 9, 2013, 8 pages.
Search Report for EP 11729851.3, Applicant: Box, Inc. dated Feb. 7, 2014, 9 pages.
Search Report for EP13187217.8, Applicant: Box, Inc. dated Apr. 15, 2014, 12 pages.
Search Report for EP141509422, Applicant: Box, Inc. dated May 8, 2014, 7 pages.
Search Report for EP14151588.2, Applicant: Box, Inc. dated Apr. 15, 2014, 12 pages.
Search Report for EP14153783.7, Applicant: Box, Inc. dated Mar. 24, 2014, 7 pages.
Sommerer, "Presentable Document Format: Improved On-demand PDF to HTML Conversion," retrieved from the internet, http://research.microsoft.com, Nov. 2004, 8 pages.
Supplementary European Search Report European Application No. EP 08 85 8563 dated Jun. 20, 2011 pp. 1-5.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Wayback, "Wayback machine," Wayback, Jun. 1, 2011, 1 page.
Wiki, http://web.archive.org/web/20100213004936/http://en.wikipedia.org/wik/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.

* cited by examiner

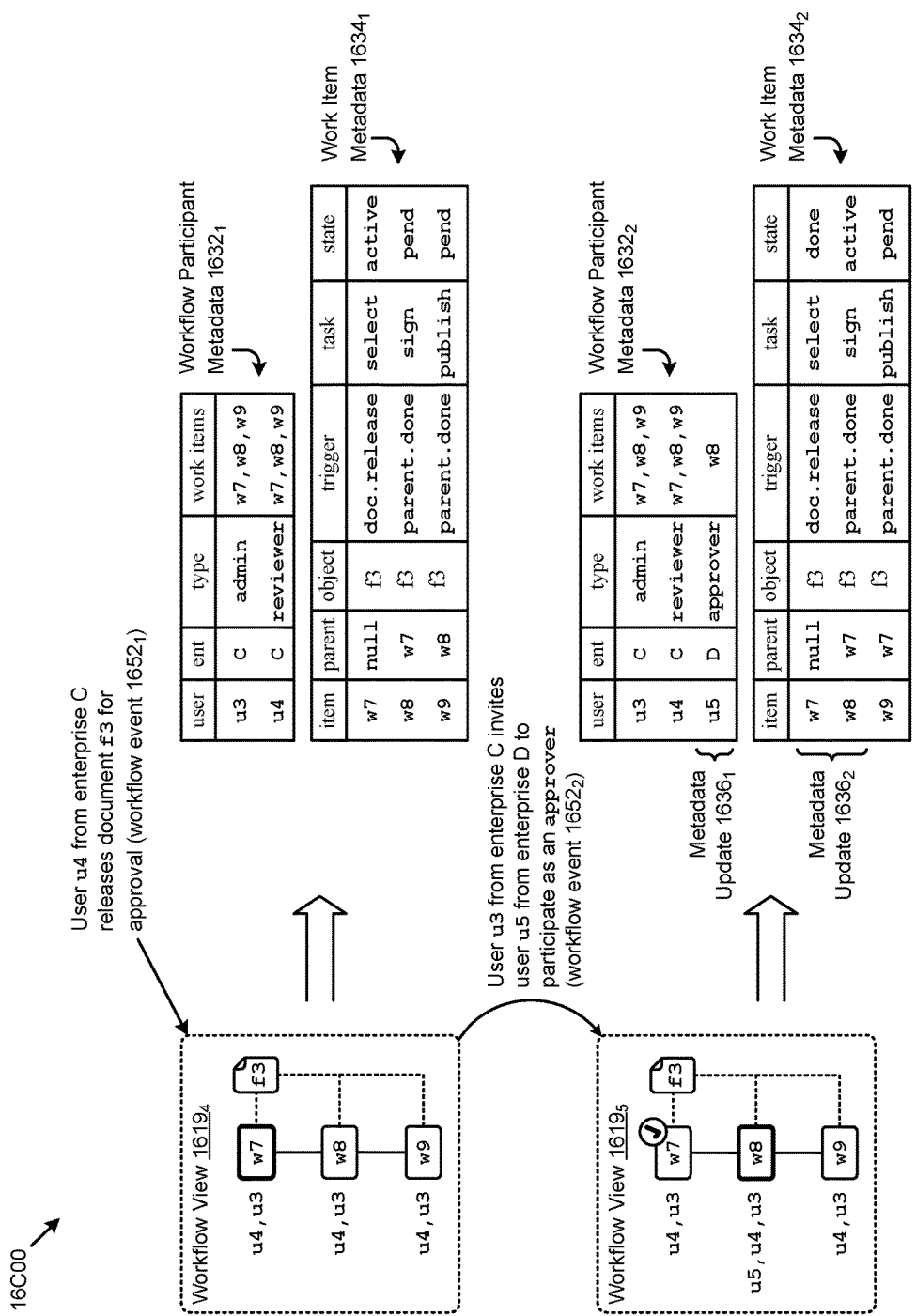
FIG. 16C1

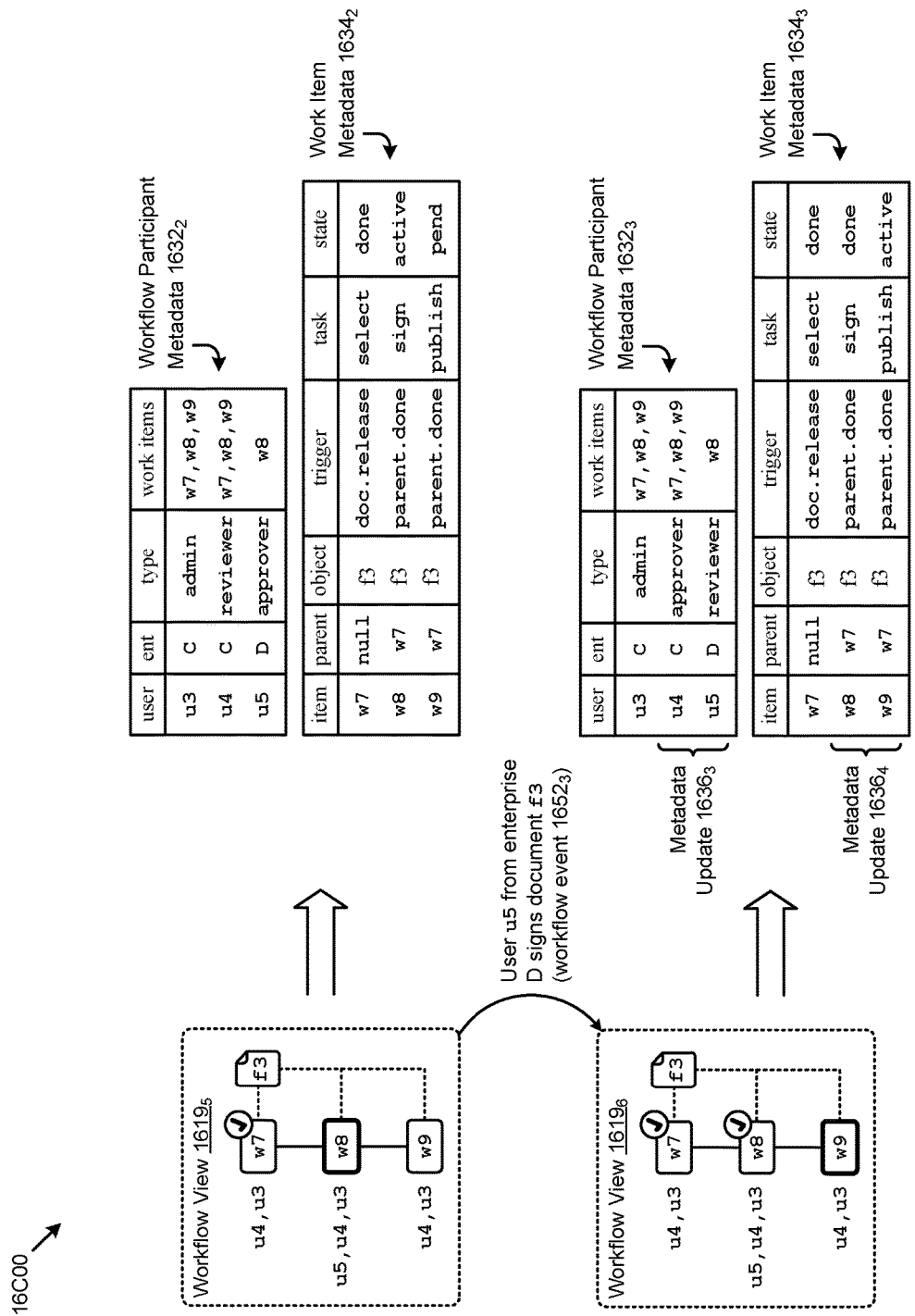
FIG. 16C2

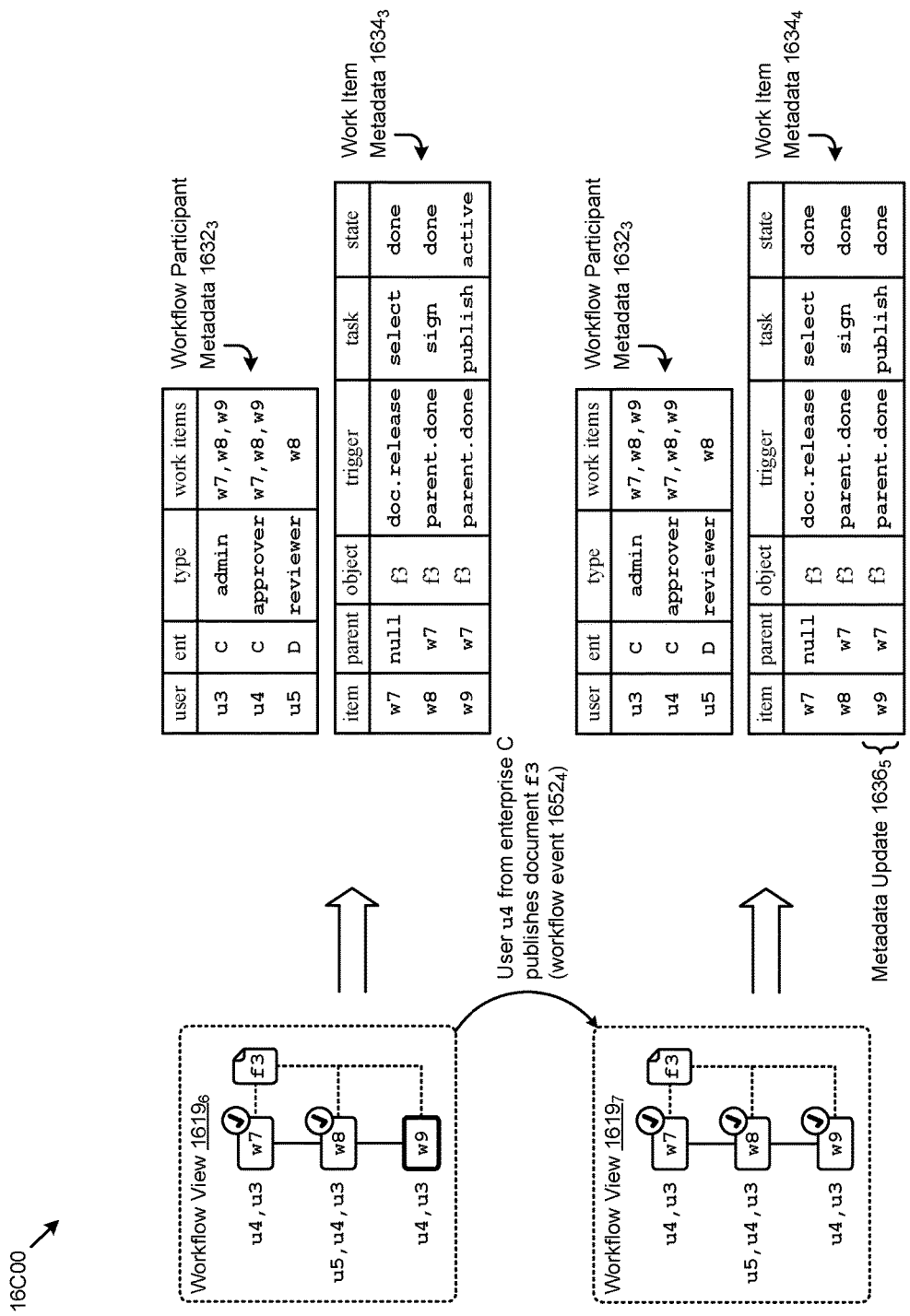
FIG. 16C3

MANAGING FLOW-BASED INTERACTIONS WITH CLOUD-BASED SHARED CONTENT

RELATED APPLICATIONS

The present application is a continuation-in-part of co-pending U.S. patent application Ser. No. 14/474,008 titled, "CONFIGURABLE METADATA-BASED AUTOMATION AND CONTENT CLASSIFICATION ARCHITECTURE FOR CLOUD-BASED COLLABORATION PLATFORMS", filed Aug. 29, 2014, and the present application claims the benefit of priority to U.S. Provisional Application Ser. No. 62/214,176 titled, "RULE-BASED AUTOMATION AND CONTENT CLASSIFICATION ARCHITECTURE FOR CLOUD-BASED COLLABORATION PLATFORMS", filed Sep. 3, 2015, and the present application claims the benefit of priority to U.S. Provisional Application Ser. No. 62/234,024 titled, "CONFIGURABLE METADATA-BASED AUTOMATION AND CONTENT CLASSIFICATION ARCHITECTURE FOR CLOUD-BASED COLLABORATION PLATFORMS USING TASK-DRIVEN WORKFLOWS" filed Sep. 28, 2015, which are all hereby incorporated by reference in their entirety.

FIELD

This disclosure relates to managing content in a cloud-based service platform, and more particularly to techniques for managing flow-based user interactions with shared content in a highly collaborative cloud-based environment.

BACKGROUND

Cloud-based platforms offer the ability to securely share large volumes of content among trusted collaborators on a variety of user devices such as mobile phones, tablets, laptop computers, desktop computers, and/or other devices. For example, a large enterprise with thousands of users (e.g., employees) and many terabytes of content might use a cloud-based content storage platform to efficiently and securely facilitate content access to various individual users and/or collaborative groups of users. In such cases, a user can access a large volume of objects stored in the cloud-based platform from a user device that might store merely a small portion of that volume locally. Such access can enable multiple users (e.g., collaborators) to manage certain shared objects for various collaborative purposes (e.g., document review, document approval, content development, audience presentation, etc.).

In many cases, such collaboration might be constrained by a flow of interactions (e.g., flow-based interactions, flow-based events, workflow, etc.) with the shared content. For example, a certain flow of events (e.g., launch, alert, review, edit, approve, sign, etc.) might be designed to accompany one or more documents (e.g., sales contract, legal agreement, financial underwriting proposal, etc.) to facilitate certain work items (e.g., completion, approval, etc.) pertaining to the documents. In some cases, one enterprise might invite users from one or more other external enterprises to participate in selected work items comprising a given workflow. For example, an external user might be selected for a reviewing role, an auditing role, a signing role, and/or other roles. Implementation of such cross-enterprise workflow collaboration continues to increase as many of today's business models rely on extensive partnering (e.g., with contract partners, with external employees, with external service providers, etc.).

Unfortunately, legacy techniques for managing flow-based interactions with shared content can be limited at least as pertaining to efficiently facilitating such interactions over shared documents.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for managing flow-based user interactions with shared content in a highly collaborative cloud-based environment, which techniques advance the relevant technologies to address technological issues with legacy approaches. More specifically, the present disclosure provides a detailed description of techniques used in systems, methods, and in computer program products for managing flow-based user interactions with shared content in a highly collaborative cloud-based environment. Certain embodiments are directed to technological solutions for implementing a metadata-based workflow attribute management platform to facilitate cross-enterprise, flow-based, shared content collaboration.

The disclosed embodiments modify and improve over legacy approaches. In particular, the herein-disclosed techniques provide technical solutions that address the technical problems attendant to flow-based collaboration on shared content across multiple enterprises. Such technical solutions serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in technical fields related to online collaboration and data storage.

In one aspect, a server in a cloud-based environment is interfaced with storage devices that store one or more stored objects accessible by two or more users. The stored objects comprise folders and files as well as other objects such as workflow objects that are associated with the folders or the files. The workflow objects comprise workflow metadata that describes a workflow as a set of workflow tasks to be carried out in a progression. Processing of a workflow task and/or carrying out a portion of the progression includes modification of shared content objects. The processing or modification events are detected through workflow events, which in turn cause one or more workflow responses to be generated. Workflow responses comprise updates to the workflow metadata to record progression through the workflow and/or workflow responses comprise updates to any one or more of the stored objects.

Further details of aspects, objectives, and advantages of the technological embodiments are described herein and in the following descriptions, drawings and claims.

BRIEF DESCRIPTION OF THE DRAWINGS

The drawings described below are for illustration purposes only. The drawings are not intended to limit the scope of the present disclosure.

FIG. 16C1, FIG. 16C2, and FIG. 16C3 illustrate a workflow attribute update technique facilitated by a metadata-based workflow attribute management platform for cross-enterprise flow-based shared content collaboration, according to an embodiment.

DETAILED DESCRIPTION

Figure 1:
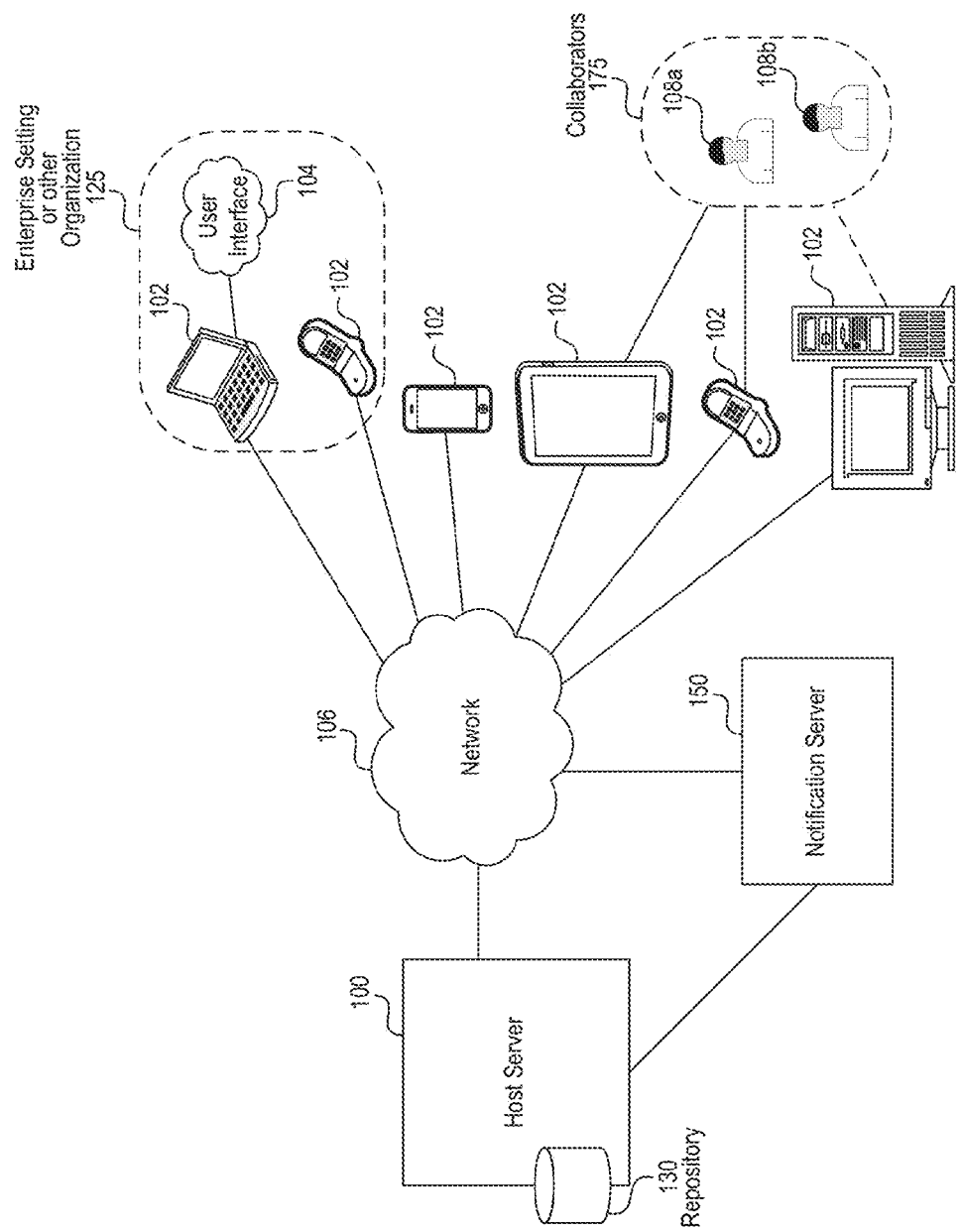
FIG. 1 illustrates a diagram of an example system having a host server of a cloud service and/or cloud storage accounts in a configurable event-based automation architecture.

Some embodiments of the present disclosure address the problem of flow-based collaboration on shared content across multiple enterprises and some embodiments are directed to approaches for implementing a metadata-based workflow attribute management platform to facilitate cross-enterprise, flow-based, shared content collaboration. The accompanying figures and discussions herein present example environments, systems, methods, and computer program products for managing flow-based user interactions with shared content in a highly collaborative cloud-based environment.

Overview

Disclosed herein are techniques that implement a metadata-based workflow attribute management platform to facilitate cross-enterprise, flow-based, shared content collaboration. Specifically, in some embodiments, various workflows comprising work items are defined at least in part by metadata that is stored in a cloud-based storage system, which workflows can mark progress by performing various updates to the metadata. In some embodiments, the metadata can characterize work item attributes pertaining to associated content objects, participants, participant experiences, flow logic, flow status, and/or other work item characteristics and therefore trigger other events. In certain embodiments, events invoked by the workflow participants can be matched to a set of workflow rules to determine one or more workflow responses such as metadata updates, shared content updates, participant alerts, the use of a specific application, customized collaboration visualization, and/or other responses. In some embodiments, participants external to a given enterprise can be invited to collaborate on a workflow defined by the enterprise. Some approaches deliver custom code (e.g., user interface, workflow logic, etc.) and content storage capabilities (e.g., dedicated storage facilities, custom provisioning, etc.) to provide a collaborative workflow solution for a given set of customized workflow tasks that are associated with respective shared documents.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXAMPLE EMBODIMENTS

FIG. 1 illustrates an example diagram of a system having a host server 100 of a cloud service and/or cloud storage accounts in a configurable event-based automation architecture.

The client devices 102 can be any system and/or device, and/or any combination of devices/systems that is able to establish a connection, including wired, wireless, or cellular connections with another device, a server and/or other systems such as host server 100 and/or notification server 150. Client devices 102 will typically include a display and/or other output functionalities to present information and data exchanged between the client devices 102 and/or the host server 100 and/or notification server 150.

For example, the client devices 102 can include mobile, hand held, portable devices, or non-portable devices and can be any of, but not limited to, a server desktop, a desktop computer, a computer cluster, and/or portable devices including a notebook, a laptop computer, a handheld computer, a palmtop computer, a mobile phone, a cell phone, a smart phone, a PDA, a Blackberry device, a Treo, a handheld tablet (e.g., an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, or Symbian platform. In one embodiment, the client devices 102, host server 100, and/or app servers are coupled via a network 106. In some embodiments, the devices 102 and host server 100 may be directly connected to one another.

The input mechanism on client devices 102 can include a touch screen keypad (including single touch, multi-touch, gesture sensing in 2D or 3D, etc.), a physical keypad, a mouse, a pointer, a track pad, a motion detector (e.g., including 1-axis, 2-axis, 3-axis accelerometer, etc.); a light sensor, capacitance sensor, resistance sensor, temperature sensor, or proximity sensor; a piezoelectric device; a device orientation detector (e.g., electronic compass, tilt sensor, rotation sensor, gyroscope, accelerometer); or a combination or variation of the above.

Signals received or detected indicating user activity at client devices 102 through one or more of the above input mechanism, or others, can be used in the disclosed technology by various users or collaborators (e.g., collaborators 175) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., devices 102). The digital content can include .pdf files, .doc or .docx files, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators 175 (e.g., creator user 108a or an administrative user 108b) which have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate efforts on work items such that each user can see, remotely, edits, revisions, comments, or annotations being made to specific work items through their own user devices. For example, a user can upload a document to a workspace for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators in a workspace.

Figure 2:
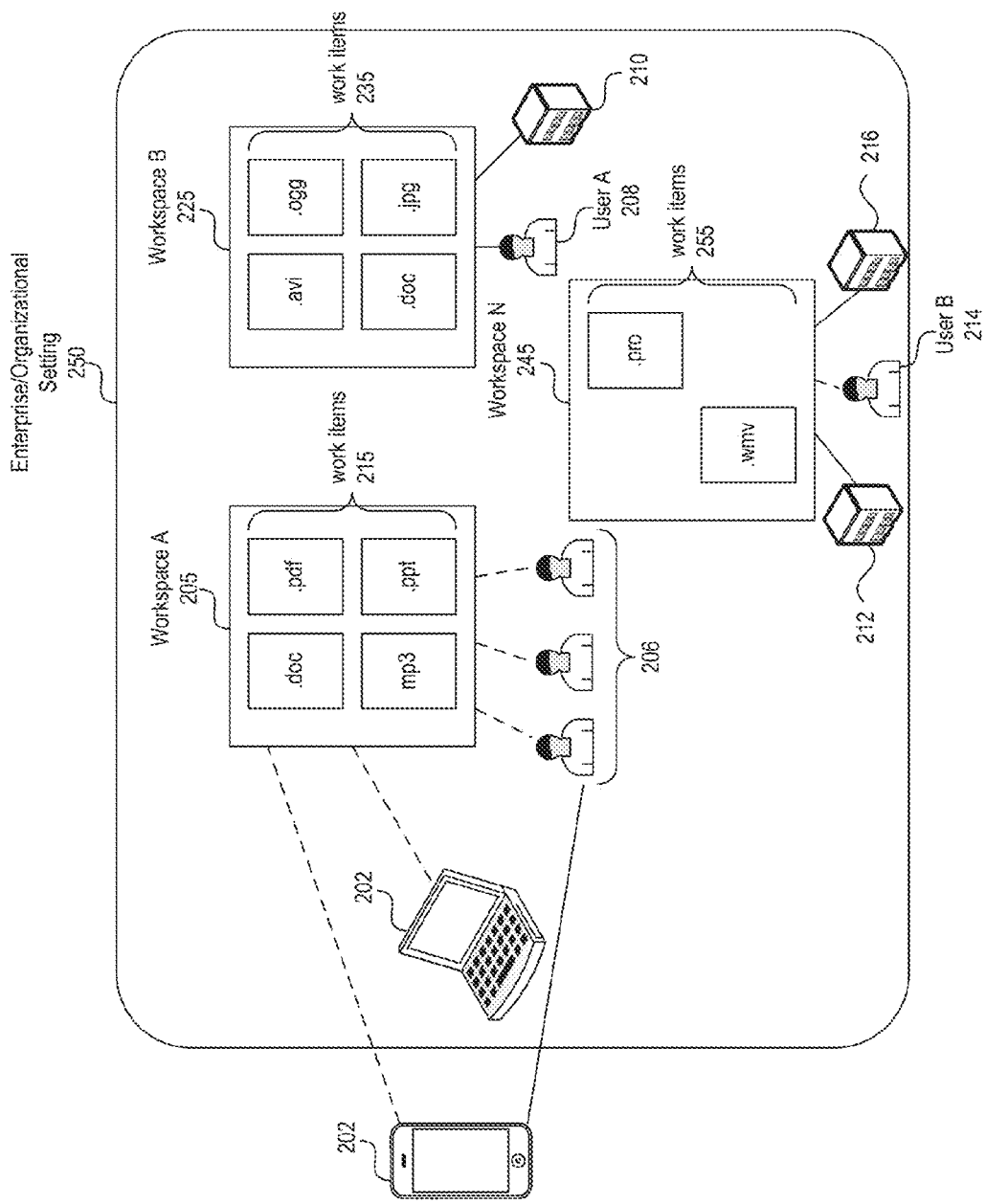
FIG. 2 depicts a diagram of an example web-based or online collaboration platform deployed in an enterprise or other organizational setting for organizing work items and workspaces as one example of a hosted cloud file sharing, collaboration service and/or a cloud storage service in a configurable event-based automation architecture.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, client devices 102 communicate with the host server 100 and its repository 130 and/or notification server 150 over network 106. In general, network 106, over which the client devices 102, the host server 100, and/or the notification server 150 communicate may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, open system interconnections (OSI), FTP, UPnP, iSCSI, NSF, ISDN, PDH, RS-232, SDH, SONET, etc.

The network 106 can be any collection of distinct networks operating wholly or partially in conjunction with each other so as to provide connectivity to the client devices 102 and the host server 100, and may appear as one or more networks to the serviced systems and devices. In one embodiment, communications to and from the client devices 102 can be achieved by an open network, such as the Internet, or a private network, such as an intranet and/or the extranet. In one embodiment, communications can be achieved by a secure communications protocol such as a secure sockets layer (SSL) or a transport layer security (TLS) protocol.

In addition, communications can be achieved via one or more networks such as, but are not limited to, one or more of WiMax, a local area network (LAN), wireless local area network (WLAN), a personal area network (PAN), a campus area network (CAN), a metropolitan area network (MAN), a wide area network (WAN), and/or a wireless wide area network (WWAN) enabled with technologies such as, by way of example, global system for mobile communications (GSM), personal communications service (PCS), digital advanced mobile phone service (D-Amps), Bluetooth, Wi-Fi, fixed wireless data, 2G, 2.5G, 3G, 4G, IMT-advanced, pre-4G, 3G LTE, 3GPP LTE, LTE advanced, mobile WiMax, WiMax 2, wirelessMAN-advanced networks, enhanced data rates for GSM evolution (EDGE), general packet radio service (GPRS), enhanced GPRS, iBurst, UMTS, HSPDA, HSUPA, HSPA, UMTS-TDD, 1×RTT, EV-DO, and messaging protocols such as TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

A diagrammatic illustration of the cloud-based environment (e.g., collaboration environment) and the relationships between workspaces and users/collaborators are illustrated with further reference to the example of FIG. 2. A diagrammatic illustration of a workspace having multiple work items which collaborators can access through multiple devices is illustrated with further reference to the example of FIG. 3.

In one embodiment, actions performed on work items or other activities that occur in a workspace can be detected in real time or in near real-time. The host server can generate notifications or notification events for one or more of the plurality of activities and select one or more recipients for each notification. Various mechanisms or external messaging applications can then be used to notify users or collaborators, including notification through the web interface to access the collaboration platform, via email, and/or SMS, for example.

In one embodiment, the host server can comprise a distributed system including both front-end and back-end components (systems). Although not shown, the host server can include an action log, an event dispatcher, one or more processors, one or more databases, and/or one or more real-time clients. Together these components are generally referred to herein as an "action log framework" (ALF). Components of the ALF may reside in the front-end systems, the back-end systems, and/or a combination thereof.

In one embodiment, the event dispatcher (also referred to as the event manager dispatcher, see e.g., FIG. 14), accumulates events and dispatches and/or otherwise distributes the events to one or more rule managers. As described herein, the event-based automation engine includes a rule-based engine to automatically translate each event into one or more jobs based on user-specified rules (e.g., administrator-specified rules) and a job manager.

FIG. 2 depicts a diagram of an example web-based or online collaboration platform deployed in an enterprise or other organizational setting 250 for organizing work items 215, 235, 255 and workspaces (e.g., workspace A 205, workspace B 225, workspace N 245) as one example of a hosted cloud file sharing, collaboration service and/or a cloud storage service in a configurable event-based automation architecture.

The web-based platform for collaborating on projects or jointly working on documents can be used by individual users and shared among collaborators. In addition, the collaboration platform can be deployed in an organized setting including, but not limited to, a company (e.g., an enterprise setting), a department in a company, an academic institution, a department in an academic institution, a class or course setting, or any other type of organization or organized setting.

When deployed in an organizational setting, multiple workspaces (e.g., workspace A-N) may be created to support different projects or a variety of work flows. Each workspace may have its own associate work items. For example, workspace A 205 may be associated with work items 215, workspace B 225 may be associated with work items 235, and workspace N may be associated with work items 255. The work items 215, 235, and 255 may be unique to each workspace, but need not be. For example, a particular word document may be associated with only one workspace (e.g., workspace A 205) or it may be associated with multiple workspaces (e.g., workspace A 205 and workspace B 225, etc.).

In general, each workspace has a set of users or collaborators associated with it. For example, workspace A 205 is associated with multiple users or collaborators 206. In some instances, workspaces deployed in an enterprise may be department specific. For example, workspace B may be associated with department 210 and some users shown as example user A 208, and workspace N 245 may be associated with departments 212 and 216 and a user shown as example user B 214.

Each user associated with a workspace may generally access the work items associated with the workspace. The level of access may depend on permissions associated with the specific workspace and/or with a specific work item. Permissions may be set for the workspace or set individually on a per work item basis. For example, the creator of a workspace (e.g., one of user A 208 who creates workspace B) may set one permission setting applicable to all work items 235 for other associated users and/or users associated with the affiliate (e.g., department 210). Creator user A 208 may also set different permission settings for each work item, which may be the same for different users, or varying for different users.

In each workspace A, B, . . . , N, when an action is performed on a work item by a given user or any other activity is detected in the workspace, other users in the same workspace may be notified (e.g., in real time or in near real-time, or not in real time). Activities which trigger real time notifications can include, by way of example but not limitation, adding, deleting, and/or modifying collaborators in the workspace; uploading, downloading, adding, and/or deleting a work item in the workspace; and creating a discussion topic in the workspace.

In some embodiments, items or content (content items) downloaded or edited in accordance with the techniques described in the present disclosure can cause notifications to be generated. Such notifications can be sent to relevant users to notify them of actions surrounding a download, an edit, a change, a modification, a new file, a conflicting version, or an upload of an edited or modified file. Additionally, as discussed above, actions performed on the content items can be maintained by an ALF system.

In one embodiment, in a user interface of the web-based collaboration platform where notifications are presented, users can, via the user interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a workspace (e.g., workspace A, B or N, etc.), actionable events on work items can be created and/or delegated/assigned to other users such as collaborators of a given workspace or other users. Through the same user interface, task status and updates from multiple users or collaborators can be indicated and reflected. In some instances, the users can perform the tasks (e.g., review or approve or reject, etc.) via the same user interface.

Figure 3:
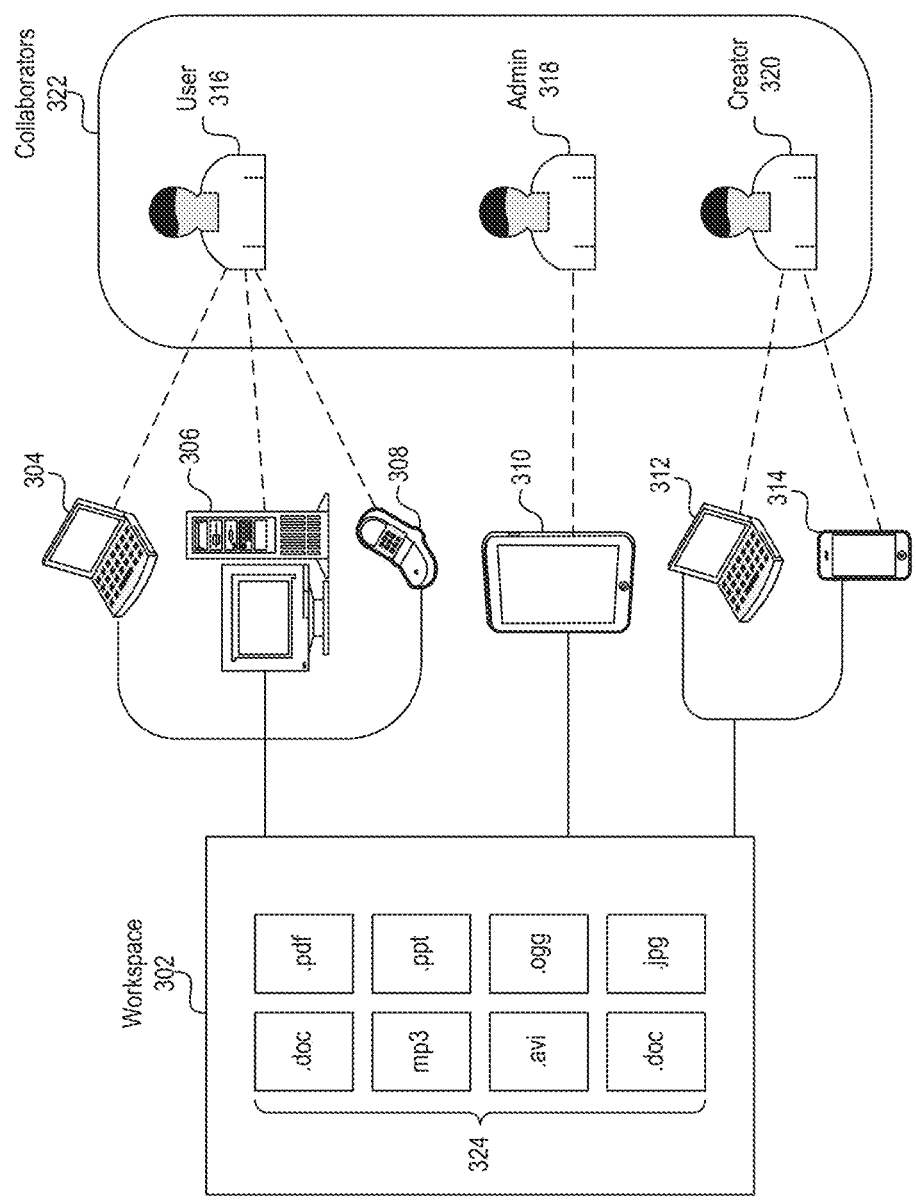
FIG. 3 depicts a diagram of an example workspace in an online or web-based collaboration environment accessible by multiple collaborators through various devices authorized to access the workspace.

FIG. 3 depicts an example diagram of a workspace 302 in an online or web-based collaboration environment accessible by multiple collaborators 322 through various devices authorized to access the workspace.

Each of users 316, 318, and 320 may individually use multiple different devices to access and/or manipulate work items 324 (e.g., content items) in the workspace 302 with which they are associated with. For example, users 316, 318, 320 may be collaborators on a project to which work items 324 are relevant. Since the work items 324 are hosted by the collaboration environment (e.g., a cloud-based environment), each user may access the work items 324 at any time and from any physical location using any device (e.g., including devices they own or any shared/public/loaner devices).

Work items to be edited or viewed may be accessed from the workspace 302 in accordance with the platform and/or application independent mechanisms. Users may also be notified of access-, edit-, modification-, and/or upload-related actions performed on work items 324 by other users or any other types of activities detected in workspace 302. For example, if user 316 modifies a document, one or both of the other collaborators (e.g., user 318 and user 320) can be notified of the modification in real time, or near real-time, or not in real time. The notifications can be sent through any or all or some of the devices associated with a given user, in various formats including one or more of email, SMS, or via a pop-up window in a user interface which the user uses to access the collaboration platform. In the event of multiple notifications, each notification may be depicted preferentially (e.g., ordering in the user interface) based on user preferences and/or relevance to the user (e.g., implicit or explicit).

For example, a notification of a download-, access-, read-, write-, edit-, or upload-related activities may be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query who they wish to be collaborators in a common workspace.

Work items hosted by a collaboration environment (e.g., a cloud-based collaboration environment) can be accessed by users (e.g., user 316, user 318, and user 320) via multiple different devices (e.g., devices 304-314) for viewing, editing, processing or performing other manipulations on work items. The devices can include applications for accessing a server hosting a cloud-based platform or service or other back-end web service (hereinafter "cloud-based collaboration platform application") and applications for viewing, editing, processing, or performing other manipulations on work items. The communication between such applications are generally facilitated by a communication mechanism of the OS. For example, in Android OS, the communication mechanism is based on "Intents". As previously described, the underlying communication mechanism is generally not secure, and any data passed between applications is visible to all other applications on a device.

Figure 4:
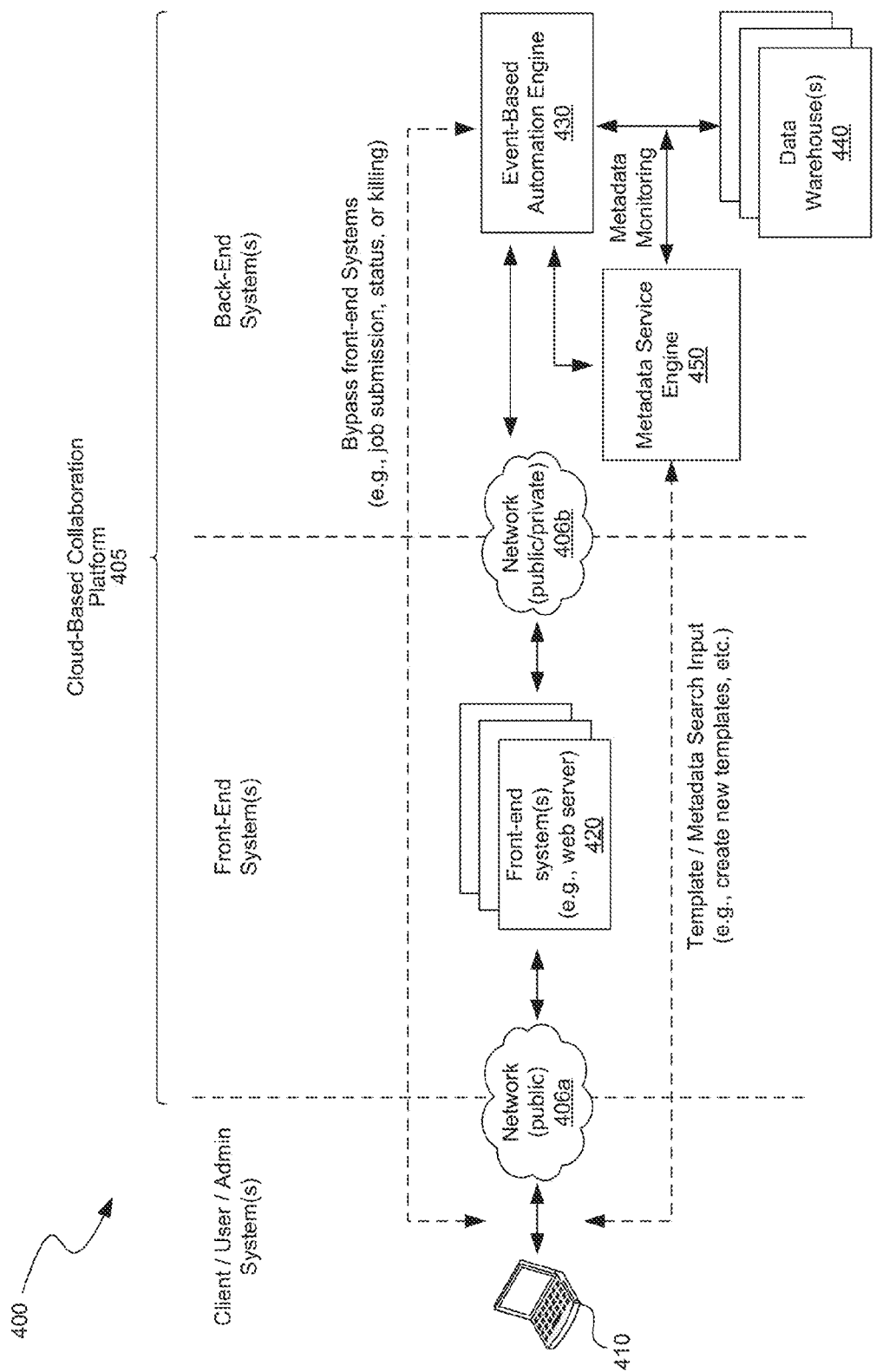
FIG. 4 depicts a diagram illustrating an example event-based automation architecture for a cloud-based collaboration platform including a user-configurable back-end event-based automation engine.

FIG. 4 depicts a diagram illustrating an example event-based automation architecture 400 for a cloud-based collaboration platform 405 including a user-configurable back-end event-based automation engine 430 and a metadata service engine 450. As shown, the event-based automation architecture 400 can include various client (or user or administer) systems and the cloud-based collaboration platform 405. Notably, as illustrated and discussed in the example of FIG. 4, placement of the event-based automation engine 430 is in the back-end of the cloud-based architecture providing scalability in the architectural design.

In one embodiment, the cloud-based collaboration platform 405 can include the host server 100 and/or the notification server 150 of FIG. 1. The cloud-based collaboration platform 405 can include various front-end system(s) and back-end system(s) that can be physically and/or functionally distributed. As shown, the cloud-based collaboration platform 405 includes front-end system 420 (e.g., a web server), a back-end event-based automation engine 430, various data warehouse(s) 440, and a metadata service engine 450. The client systems 410 can be configured to communicate via the network 406a with the front-end system(s) 420. Similarly, the front-end system(s) 420 can be configured to communicate with the client or user system(s) and the event-based automation engine 430 via the network 406b, and the event-based automation engine 430 can be configured to communicate with the front-end system(s) 420 via the network 406b and the data warehouse(s) 440.

Additionally, in some embodiments, an administrator's system (e.g., client system 410) can be configured to bypass the front-end systems in order to directly submit a job, determine the status of a job, kill a job, etc. via a web interface or application program interface built into the event-based automation engine 430. In some embodiments, clients, users and/or administrators can access the metadata service engine 450 in order to select, configure, and/or generate templates or provide input for metadata searching.

In one embodiment, the front-end system(s) 420 can include various web applications and/or web servers. Additionally, in some embodiments, the front-end system(s) 420 can provide ALF events to the event-based automation engine 430. As discussed in greater detail with reference to FIG. 6, the back-end event-based automation engine 430 can include a rule-based engine and a computing platform. The rule engine can be configured to generate and manage user-defined (or specified) rules and apply those rules to incoming ALF events. The computing platform includes a jobs manager configured to generate jobs based on job requests, track the job statuses, and distribute work to workers. The various components, functions, and or tools that can be associated with and/or included within an event-based automation engine are discussed in greater detail with reference to FIG. 6.

In one embodiment, the rules-based engine can be configured to generate and manage user-defined (or specified) metadata rules and apply the metadata rules to metadata events generated by the metadata service engine 450. As described in greater detail with reference to FIG. 5, the metadata service engine 450 monitors metadata (e.g., job requests, events, actions, etc.) to identify changes to metadata. The metadata events can be generated responsive to these metadata changes. As described herein, the metadata service engine 450 can provide the ability to generate and/or select templates for providing a metadata framework to particular work items. Additionally, the metadata service engine 450 provides the ability to search metadata in the cloud-based environment.

Figure 5:
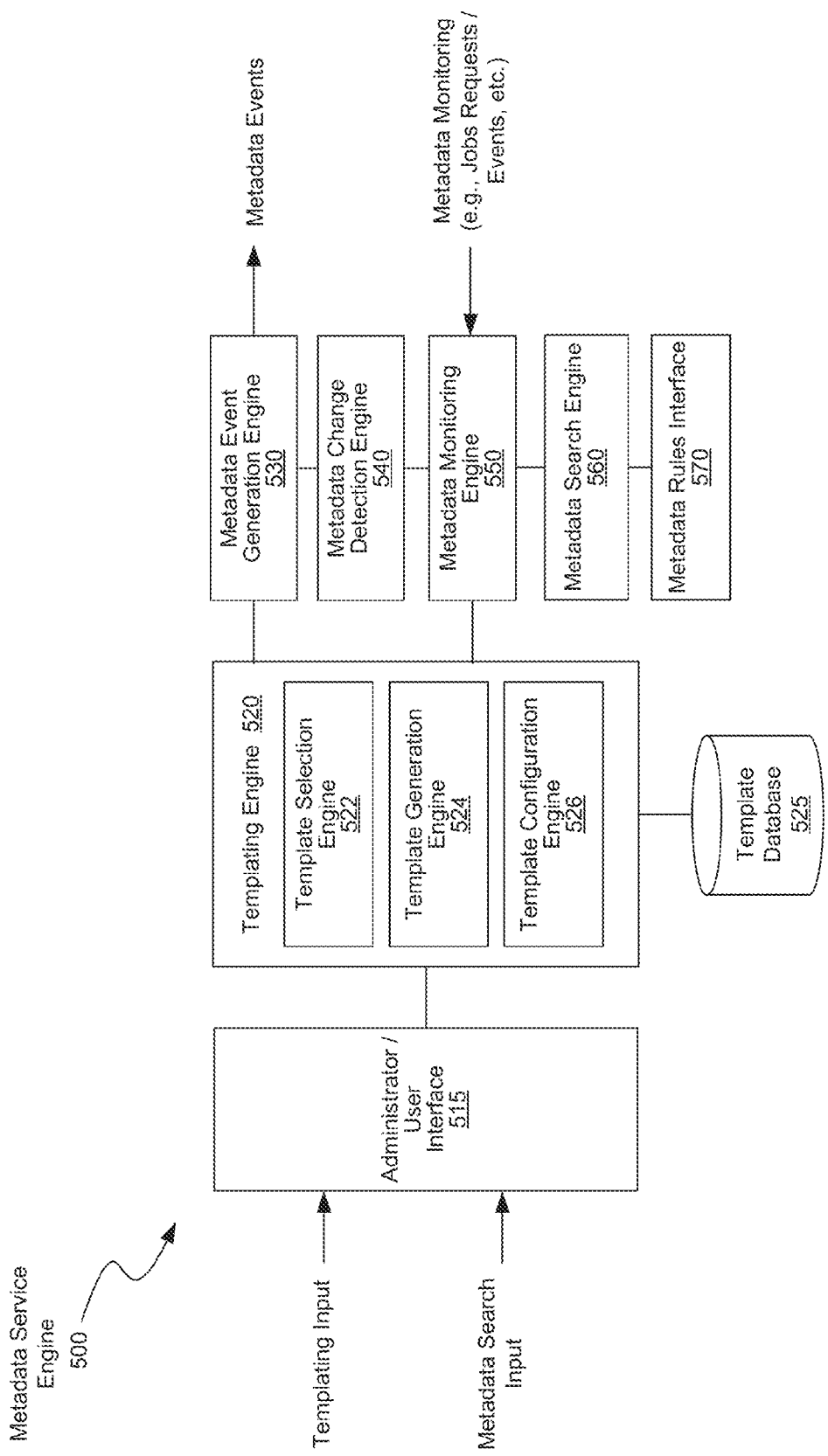
FIG. 5 depicts a diagram illustrating an example metadata service engine.

FIG. 5 depicts a diagram illustrating an example metadata service engine 500. The metadata service engine 500 can be the metadata service engine 450 of FIG. 4, although alternative configurations are possible. As shown in the example of FIG. 5, the metadata service engine includes an administrator/user interface 515, a templating engine 520, a template database 525, a metadata event generation engine 530, a metadata change detection engine 540, a metadata monitoring engine 550, a metadata search engine 560, and a metadata rules interface 570. The templating engine 520 also includes a template selection engine 522, a template generation engine 524, and a template configuration engine 526.

Additional or fewer components/modules/engines can be included in the metadata service engine 500 and/or in each illustrated component/module/engine. Further, although illustrated as included as part of the metadata service engine 500, the components/modules/engines and/or the template databases 525 can be physically and/or functionally distributed.

One embodiment of the metadata service engine 500 includes the administrator/user interface 515. The administrator/user interface 515 can comprise any interface configured to facilitate receiving and processing of templating inputs for selection, configuration, and/or generation of metadata templates. For example, the administrator/user interface 515 can include a network interface having a networking module that facilitates the metadata service engine 500 to mediate data in a network with an entity that is external to the metadata service engine 500 through any known and/or convenient communications protocol supported by the host and the external entity. The network interface can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, a bridge router, a hub, a digital media receiver, and/or a repeater.

Additionally, the administrator/user interface 515 can comprise any interface configured to facilitate receiving of metadata search input. As discussed below, the administrator/user interface 515 interacts with the metadata search engine 560 to provide users and/or administrators the ability to search by metadata.

One embodiment of the metadata service engine 500 includes the templating engine 520. The templating engine 520 can include customizable and/or pre-built metadata templates which can be used to automatically apply a metadata framework (e.g., particular fields) to files (or work items) based on, for example, the upload or placement of a particular file in a particular folder, selection of those files by a user or administrator, and/or in other manners discussed herein or known in the art. As discussed above, the templating engine 520 includes a template selection engine 522, template generation engine 524, and a template configuration engine 526. The template selection engine 522 is configured to select one or more preconfigured templates for application of those templates to work items in the cloud-based collaborative environment. The template generation engine 524 and a template configuration engine 526 are configured to generate and configure metadata templates responsive to the templating input. One or more template database(s) 525 persistently stores the templates in the cloud-based collaborative environment.

One embodiment of the metadata service engine 500 includes the metadata event generation engine 530, the metadata change detection engine 540, and the metadata monitoring engine 550. The metadata monitoring engine 550 monitors actions, events, jobs, job requests, etc. to identify changes to metadata occurring to work items within the collaborative cloud-based environment. The metadata change detection engine 540 detects these changes to the metadata and the metadata event generation engine 530 responsively generates the metadata events.

One embodiment of the metadata service engine 500 includes the metadata search engine 560. The metadata search engine 560 is configured to facilitate searching of the metadata in the collaborative cloud-based environment. In some embodiments, the metadata search engine 560 can index the metadata. For example, the metadata search engine 560 collects, parses, and stores data to facilitate fast and accurate metadata information retrieval.

One embodiment of the metadata service engine 500 includes the metadata rules interface 570. The metadata rules interface 570 is configured to interact with the rule manager to, for example, automatically provide rules to be generated based on configurations/customizations of metadata templates.

Figure 6:
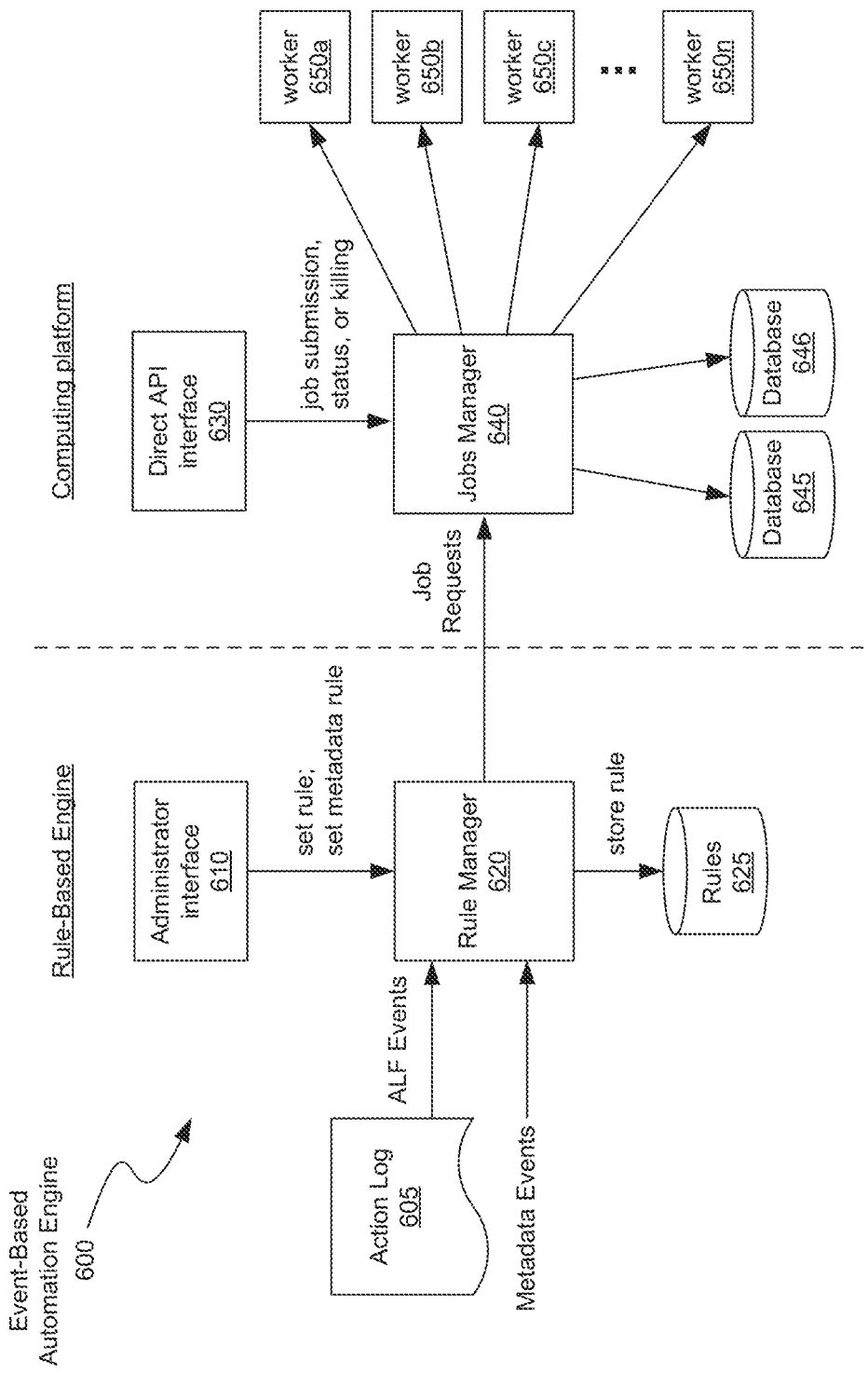
FIG. 6 depicts a diagram illustrating an example event-based automation engine including a rule-based engine and a computing platform.

FIG. 6 depicts a diagram illustrating an example event-based automation engine 600 including a rule-based engine and a computing platform. The event-based automation engine 600 can be the event-based automation engine 430 of FIG. 4, although alternative configurations are possible. As shown in the example of FIG. 6, the rules-based engine includes an action log 605, an administrator interface 610, a rule manager 620, and a rules database 625. The computing platform includes a direct application program interface (API) 630, a rule manager 620, multiple storage databases 645 and 646, and multiple workers 650a-n.

The rule manager 620 can include any system and/or service that is configured to receive incoming ALF events and/or metadata events and apply rules (or metadata rules) to the events to automatically generate corresponding job requests and send the job requests to the jobs manager 640. The administrator interface 610 allows administrative users to generate (or set) rules or metadata rules which are then stored, by the rule manager 620, in the rules database 625. An example a rule manager is discussed in greater detail with reference to FIG. 7.

The jobs manager 640 can, among other functions, receive job requests from the rule manager, generate jobs corresponding to job requests, determine relevant queues for jobs, route jobs to relevant queues for performance by workers, and track and/or otherwise monitor the status of each of the jobs. In addition to supporting content workflow, the jobs manager is also intended to be a general-purpose job system that can provide asynchronous job execution for other services. An example jobs manager is discussed in greater detail with reference to FIG. 8. The workers 650a-n can comprise distributed machines or computers in one or more computer clusters.

Figure 7:
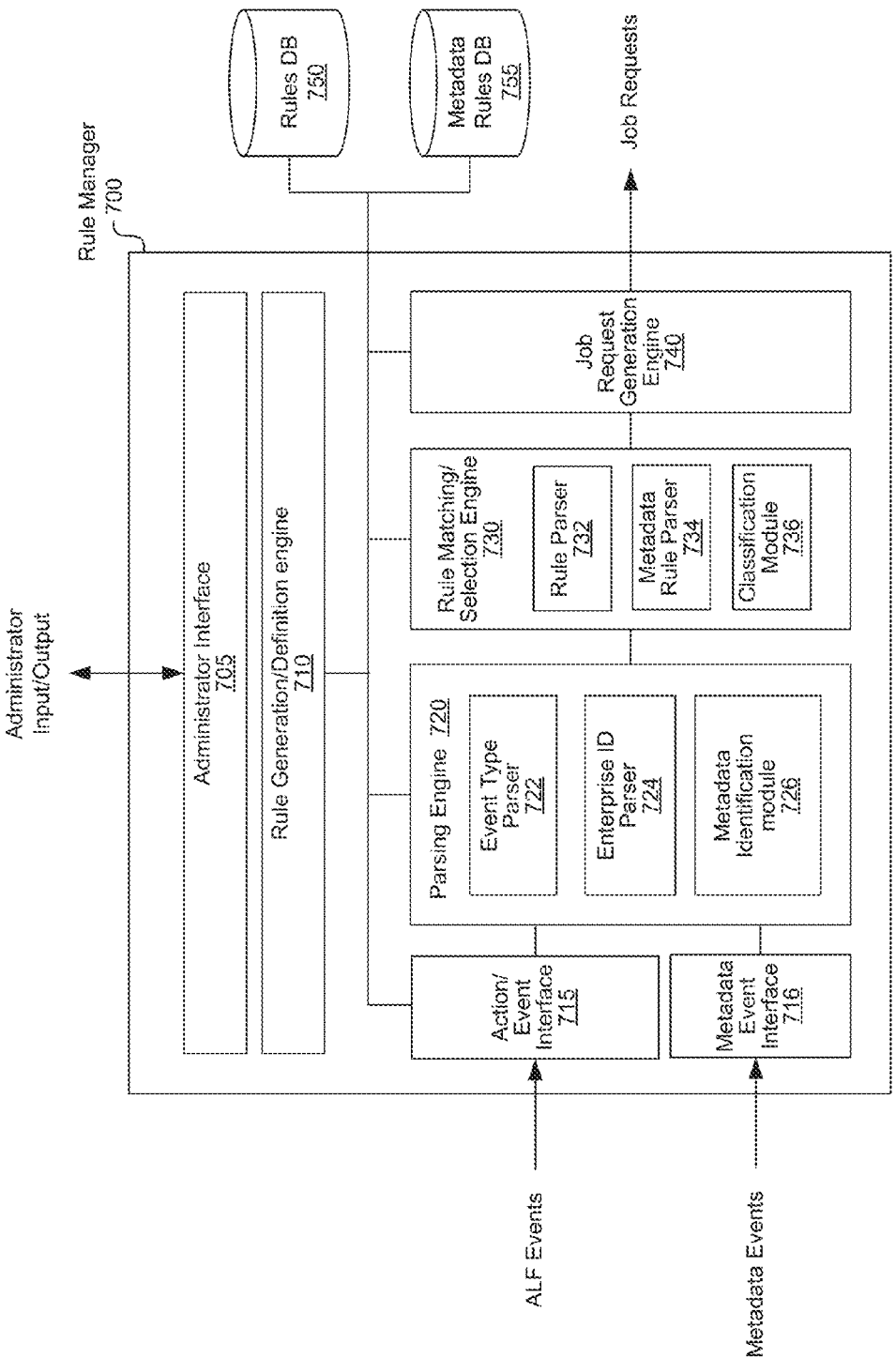
FIG. 7 depicts a block diagram illustrating example components of a rule manager of a rule-based engine for automatically translating events into one or more job requests based on user (or administrator) specified rules.

FIG. 7 depicts a block diagram illustrating example components of a rule manager 700 of a rule-based engine. The rule manager 700 can be configured to automatically translate ALF events into one or more job requests based on user (or administrator) specified rules. The rule manager 700 can be, for example, rule manager 620 of FIG. 6, although alternative configurations are possible.

The rule manager 700 can include an administrator interface 705, a rule generation/definition engine 710, an action/event interface 715, a metadata event interface 716, a parsing engine 720, a rule matching/selection engine 730, and a job request generation engine 740. The parsing engine 720 can include an event type parser 722, an enterprise identifier (ID) parser 724, and a metadata identification module 726. As shown in the example of FIG. 7, the rule manager 700 also includes a rules database (DB) 750 and a metadata rules database (DB) 755.

Additional or fewer components/modules/engines can be included in the rule manager 700 and/or in each illustrated component/module/engine. Further, although illustrated as included as part of the rule manager 700, the components/modules/engines and/or the rules database 750 and/or the metadata rules database 755 can be physically and/or functionally distributed.

One embodiment of the rule manager 700 includes the administrator interface 705. The administrator interface 705 can comprise any interface configured to facilitate setting and/or generation of the user-defined rules by an administrator. For example, the administrator interface 705 can include a network interface having a networking module that facilitates the rule manager 700 to mediate data in a network with an entity that is external to the rule manager 700, through any known and/or convenient communications protocol supported by the host and the external entity. The network interface can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, a bridge router, a hub, a digital media receiver, and/or a repeater.

One embodiment of the rule manager 700 includes the rule generation/definition engine 710. The rule generation/definition engine 710 facilitates rule generation/definition by users or administrators. For example, users can define rules in a rule descriptive language (RDL) that can be automatically triggered and executed by the rule manager. The users or administrators can also define metadata rules in a similar matter. Alternatively or additionally, metadata rules can be automatically generated and input into the system based on user-generated or pre-existing metadata templates defined by the metadata service engine 500.

Each rule can include one or more conditions that can be determined by the user and/or automatically by the system. Each condition is associated with a job. In operation, when a condition is evaluated to be true, the associated job is triggered and/or otherwise generated. Metadata rules can be defined in a similar fashion. Alternatively or additionally, metadata rules can be defined based on keys of key-value pairs. In some embodiments, threshold or defined values for the metadata key-value pairs can be set that trigger the rule. For example, if the metadata template defines a contract, then one metadata attribute may be the value of the contract. A rule can be set that triggers a particular action or job in the event that the value of the contract exceeds a particular preset value. For instance, one or more notifications may be sent to particular individuals for review. Similarly, a metadata attribute of a contract template could include a status attribute that causes a particular action or job to be performed when the value of the key-value pair changes from 'PENDING' to 'APPROVED'. In this manner, metadata or changes to metadata can trigger job requests (e.g., events or actions).

One embodiment of the rule manager 700 includes the action/event interface 715. The action/event interface 715 can receive events including ALF events. For example, the action/event interface 715 can receive events from an action log dispatcher (ALD) (also referred to as a dispatcher or an event manager dispatcher herein). In one embodiment, the ALD accumulates and distributes actions taken and logged by collaborators in the collaboration environment. The distributed events can be, for example, ALF events that indicate the user actions taken on content items in the web applications. The ALD can accumulate and distribute and/or otherwise provide sets of ALF events (e.g., multiple events) to the rule manager simultaneously. For example, in one embodiment, the ALF events can be distributed via an action such as, for example, action log 605 of FIG. 6.

One embodiment of the rule manager 700 includes the metadata event interface 716. The metadata event interface 716 can receive metadata events. For example, the metadata event interface 716 can receive metadata events from a metadata service engine such as, for example, metadata service engine 500 of FIG. 5. The metadata events can identify a change in a metadata key-value pair associated with a particular work item in the collaborative cloud-based environment. For example, a contract (work item) can include a metadata key-value pair including a key being a contract and a value of that key being a monetary value.

One embodiment of the rule manager 700 includes the parsing engine 720. The parsing engine 720 parses each of the events to identify event criteria associated with the event such as, for example, an action type and/or an enterprise identifier (ID). The parsing engine 720 can also parse and/or otherwise process the metadata events and identify the relevant information such as, for example, the associated key-value pair.

The example rule manager 700 of FIG. 7 is shown including an event type parser 722, an enterprise ID parser 724, and a metadata identification module 726; however, it is appreciated that other (any) criteria can be parsed from the event (or metadata events) via the parsing engine 720.

One embodiment of the rule manager 700 includes the rule matching/selection engine 730. The rule matching/selection engine 730 is configured to access predefined rules from the rules database 750, and scan the predefined rules to select predefined rules that match particular event criteria. For example, the rule manger 700 can utilize filters (or criteria) to select or match ALF events with rules. Example filters include, but are not limited to, enterprise_id, all_enterprises, all_users, and event type. Additionally, the rule matching/selection engine 730 can parse the metadata rules to select predefined rules that match a particular key and/or value of a key-value pair associated with a particular metadata event.

In one embodiment, the rule matching/selection engine 730 includes a rule parser 732, a metadata rules parser 734, and a classification module 736. The rule parser 732 is configured to parse the rules to identify one or more conditions associated with the rule and the corresponding job descriptions (also referred to herein as job templates) that are triggered if the condition occurs. The job descriptions are embedded in the rules and define the job to be performed. For example, each job indicates a process or type of work that is to be performed by one of the workers (e.g., distributed processing machines).

The metadata rule parser 734 is configured to parse the metadata rules to identify one or more keys and or values that match the key-value pair associated with the metadata event. For example, the metadata rule parser 734 can determine a predefined metadata rule that matches the key of the key-value pair.

One embodiment of the rule manager 700 includes the job request generation engine 740. The job request generation engine 740 is configured to generate one or more job requests for each rule. For example, in one embodiment, the job request generation engine 740 generates a job request based on each job description (or job template) corresponding to each rule condition. As discussed above, the jobs indicate work to be performed by workers (e.g., workers 650 of FIG. 6). The job request generation engine 740 is also configured to process key-value pairs associated with the metadata events to conditionally generate job requests (e.g., if the rule is triggered). For example, the job request generation engine 740 can determine a value of the metadata key-value pair associated with a particular work item, process the first predefined metadata rule that matches the key of the key-value pair, identify a threshold value associated with the first predefined metadata rule, and compare the value of the metadata key-value pair with the threshold value. The job request can then be generated if the rule is triggered; that is, the job request can be conditionally generated based on the comparison.

Figure 8:
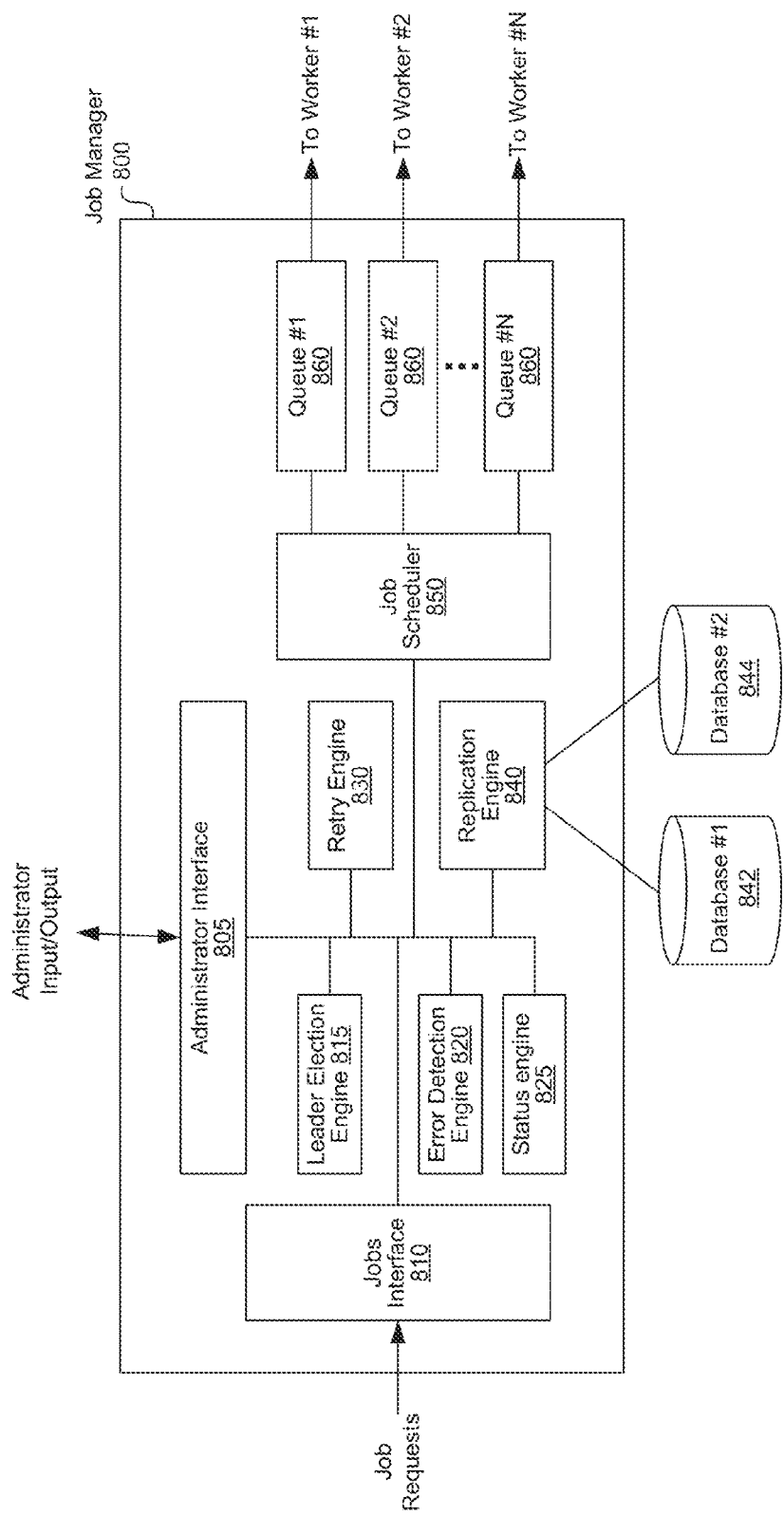
FIG. 8 depicts a block diagram illustrating example components of a job manager of a computing platform for generating, queuing, and ensuring job execution.

FIG. 8 depicts a block diagram illustrating example components of a job manager 800 of a computing platform for generating, queuing, and ensuring job execution. The job manager 800 can, among other functions, route jobs to relevant queues 860 for performance by workers and track and/or otherwise monitor the status of each of the jobs. The job manager 800 can be, for example, job manager 640 of FIG. 6, although alternative configurations are possible.

The job manager 800 can include an administrator interface 805, a jobs interface 810, a leader election engine 815, an error detection engine 820, a status engine 825, a retry engine 830, a replication engine 840, a job scheduler 850, and various queues 860. As shown in the example of FIG. 8, the job manager 800 also includes storage databases 842 and 844, although these database can be considered as distinct in some embodiments. Additional or fewer components/modules/engines can be included in the job manager 800 and/or in each illustrated component/module/engine. Further, although illustrated as included as part of the job manager 800, the components/modules/engines and/or the storage databases 842 and 844 can be physically and/or functionally distributed.

One embodiment of the job manager 800 includes the administrator interface 805. The administrator interface 805 can comprise any interface (e.g., a web interface) configured to facilitate direct administrator access for job submission, job status, or killing of jobs. In one embodiment, the administrator interface 805 can include a network interface having a networking module that facilitates the job manager 800 to mediate data in a network with an entity that is external to the job manager 800, through any known and/or convenient communications protocol supported by the host and the external entity. The network interface can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, a bridge router, a hub, a digital media receiver, and/or a repeater.

One embodiment of the job manager 800 includes the jobs interface 810. The jobs interface 810 can receive jobs including batched jobs. As discussed above, the jobs indicate work to be performed by workers (e.g., workers 650 of FIG. 6).

One embodiment of the job manager 800 includes the jobs interface 810 to leader election engine 815. As described herein, multiple instances of the job manager can be utilized in a distributed environment to prevent data loss and facilitate scalability. The leader election engine 815 can be used to guarantee that only one instance of the job manager 800 is performing operations so that the operations are not duplicated. For example, in one embodiment, the leader election engine 815 is utilized to ensure that only one service in each cluster is retrying and/or replicating jobs.

One embodiment of the job manager 800 includes the error detection engine 820. For example, the error detection engine 820 can provide infinite loop detection. That is, in some cases, users/admins can generate rules that create an infinite loop such as, for example:

Rule 1: Condition/Job
If a file is uploaded/moved to folder A/move file to folder B;
Rule 2: Condition/Job
If a file is moved to folder B/move file to folder A.

In one embodiment, the error detection engine 820 prevents such scenarios by injecting a unique token into the worker-initiated API requests. The token flows through the API and web app and back into the ALF stream with the associated event. The rule manager can then pass the token along to the job manager where the job manager prevents jobs from being queued if the token had been seen too many times. Otherwise, the token would be added to the new job and the workers would need to reuse the token when executing the job.

One embodiment of the job manager 800 includes the status engine 825. The status engine 825 can track and/or otherwise monitor the status of jobs submitted to the queues. The status engine 825 ensures that jobs are executed. In one embodiment, jobs and status updates (started, completed, failed) are persisted in a local database (e.g., the local HBase cluster). The status engine 825 also responds to status queries received at the administrator interface (or web interface).

In one embodiment, status or progress cache is maintained by the job manager. The status or progress cache can provide status and/or progress updates (i.e., 10%, 20%, etc.) of jobs completed to interested clients (administrators). Additionally, as discussed above, the job manager supports an API or administer interface for receiving these updates from the workers and then providing the details to clients via a job status query response. In one embodiment, because of the temporary nature of the updates, rather than storing the updates in HBase, the job manager will store them in memcache.

One embodiment of the job manager 800 includes the replication engine 840. The replication engine 840 can save or store the jobs to first database 842 and second database 844. Each database can comprise an HBase at geographically remote data centers. As described in more detail below, once the job is stored in multiple data centers, the job manager 800 can then respond to the rule manager (e.g., to acknowledge receipt of the jobs).

One embodiment of the job manager 800 includes the job scheduler 850. The job scheduler 850 can generate jobs based on the job requests and determine the appropriate queues 860 for the jobs, then distribute the jobs to the appropriate queues. In one embodiment, the appropriate queues 860 are selected based on the type of job. That is, particular queues can be designed for and serviced by workers that are specifically configured to perform those jobs. By way of example and not limitation, the system can designate dedicated queues for the following jobs: preview jobs, video conversion jobs, text extraction jobs, virus scan jobs, thumbnail creation jobs, data loss prevention (DLP) jobs, etc. Alternatively or additionally, one or more general-purpose queues could be utilized by one or more general-purpose workers (i.e., workers configured to perform a variety of different types of jobs).

Figure 9:
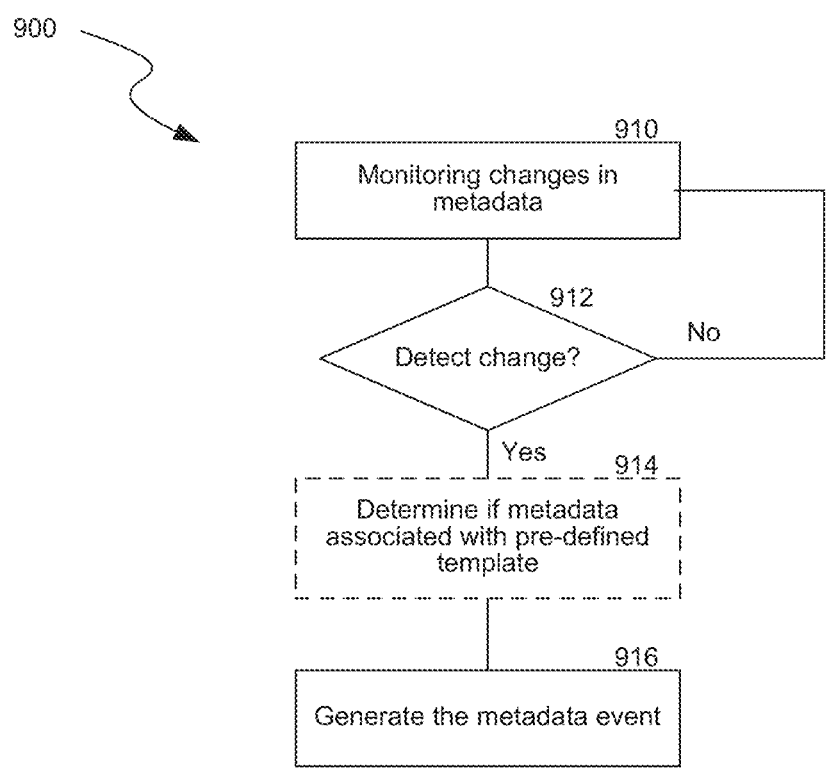
FIG. 9 depicts a data flow diagram illustrating an example process for generation of a metadata event, according to an embodiment.

FIG. 9 depicts a data flow diagram illustrating an example process 900 for generation of a metadata event, according to an embodiment. A metadata service engine such as, for example, the metadata service engine 500 of FIG. 5 can, among other functions, perform the example process 900. The metadata service engine may be embodied as hardware and/or software, including combinations and/or variations thereof. In addition, in some embodiments, the metadata service engine can include instructions, wherein the instructions, when executed by one or more processors, cause the one or more processors to perform one or more processes including the following processes.

To begin, in process 910, the metadata service engine monitors changes in metadata. For example, the metadata service engine can monitor job requests, changed work items, events, actions, etc. in order to identify changes or potential changes to metadata within the collaborative cloud-based environment. In process 912, the metadata service engine determines if a change in the metadata is detected. The change in the metadata can be, for example a change in a metadata key-value pair.

If a change is detected in process 912, the metadata service engine optionally, in process 914, determines if the metadata is associated with a predetermined metadata template. For example, in some instances, the metadata service engine only monitors a subset of the metadata (e.g., metadata for which rules have been established and/or metadata associated with a defined metadata template). In process 916, the metadata service engine generates the metadata event. In some embodiments, the metadata event can be optionally generated based on whether the metadata or changed metadata is associated with a defined metadata template.

Figure 10:
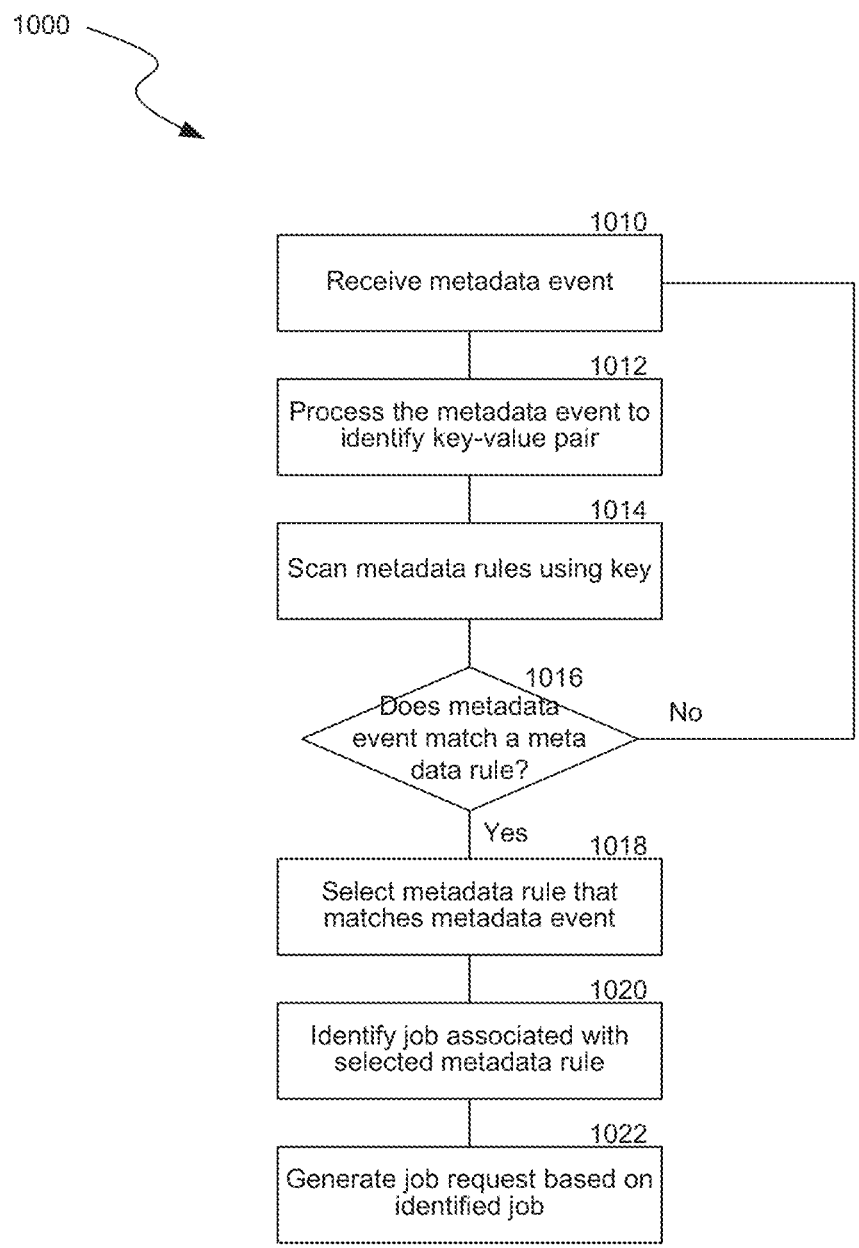
FIG. 10 depicts a data flow diagram illustrating an example process for automatically translating metadata events into one or more job requests based on user (or administrator) specified metadata rules, according to an embodiment.

FIG. 10 depicts a data flow diagram illustrating an example process 1000 for automatically translating metadata events into one or more job requests based on user (or administrator) specified metadata rules, according to an embodiment. A rule manager such as, for example, rule manager 700 of FIG. 7 can, among other functions, perform the example process 1000. The rule manager may be embodied as hardware and/or software, including combinations and/or variations thereof. In addition, in some embodiments, the rule manager can include instructions, wherein the instructions, when executed by one or more processors, cause the one or more processors to perform one or more processes including the following processes.

To begin, in process 1010, the rule manager receives a metadata event and, in process 1012, processes the metadata event to identify or capture an associated key-value pair. As discussed above, the metadata event can be an event that is initiated by a metadata service engine that is responsive to monitored changes in metadata pertaining to content items in the collaborative cloud-based environment.

In process 1014, the rule manager scans the metadata rules based on the metadata key and, at decision process 1016, determines if the metadata key matches a metadata rule. In one embodiment, the rule manager can also scan the metadata rules for other conditions or values that are compared to the value of the key-value pair to make a determination about whether a metadata rule is triggered or if a metadata event matches a rule.

In process 1018, the rule manager selects a metadata rule that matches the metadata event, if one exists. Next, in process 1020, the rule manager identifies a job description associated with the selected metadata rule. For example, the job description can indicate the type of job that is to be performed when the rule is triggered. Lastly, in process 1022, the rule manager generates a new job request based on the job description. As discussed herein, the rule manager distributes the batched jobs to the job manager. In some embodiments, load balancers may be used to distribute events to multiple instances of the rule manager and jobs to multiple instances of the job manager, respectively. Additionally, the instances referred to herein are referring to additional distributed hardware resources.

Figure 11:
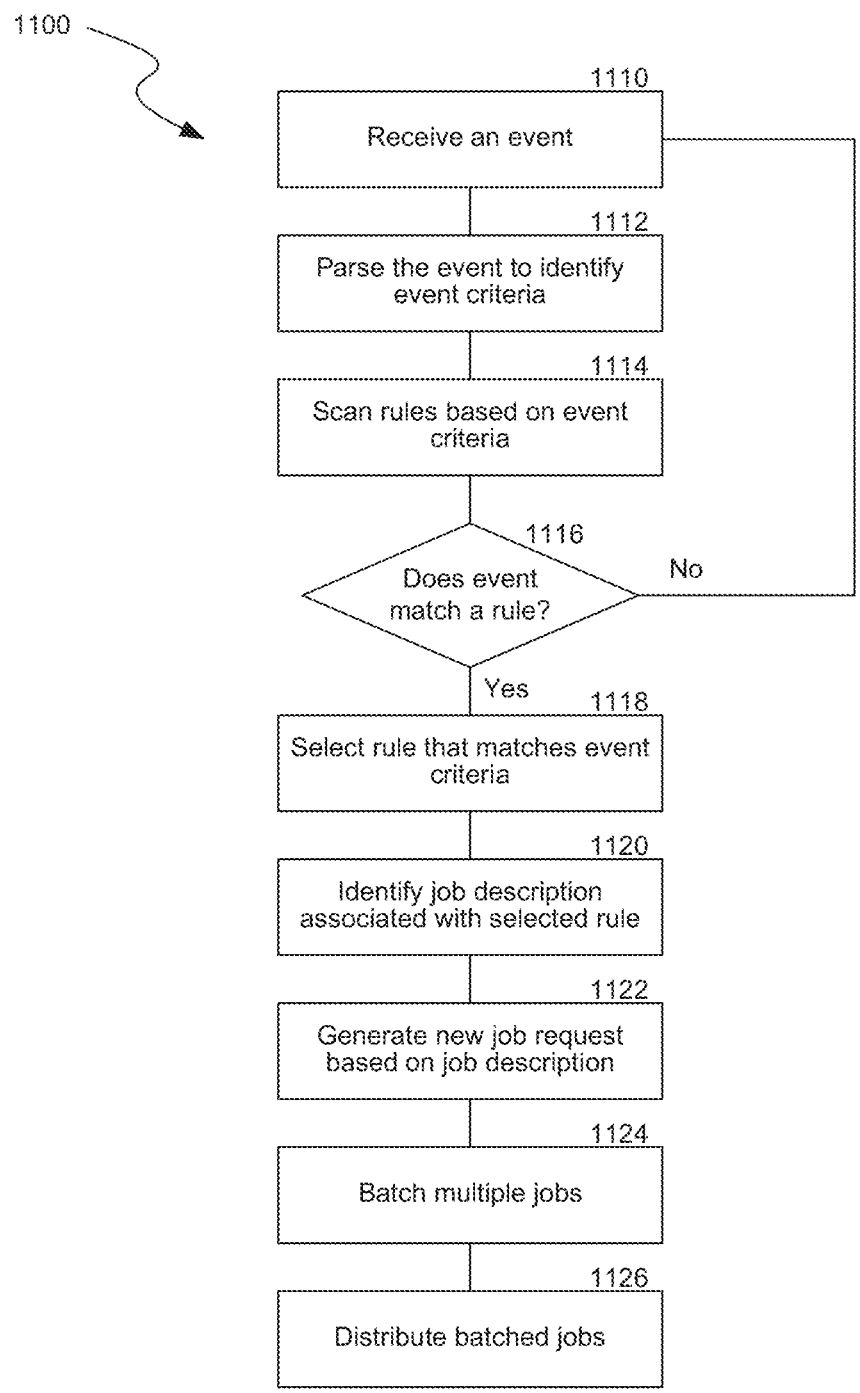
FIG. 11 depicts a data flow diagram illustrating an example process for automatically translating events into one or more job requests in one or more back-end systems based on user (or administrator) specified rules, according to an embodiment.

FIG. 11 depicts a data flow diagram illustrating an example process 1100 for automatically translating events into one or more job requests in one or more back-end systems based on user (or administrator) specified rules, according to an embodiment. A rule manager such as, for example, rule manager 700 of FIG. 7 can, among other functions, perform the example process 1100. The rule manager may be embodied as hardware and/or software, including combinations and/or variations thereof. In addition, in some embodiments, the rule manager can include instructions, wherein the instructions, when executed by one or more processors, cause the one or more processors to perform one or more processes including the following processes.

To begin, in process 1110, the rule manager receives an event and, in process 1112, parses the event to identify event criteria. As discussed above, the event can be an ALF event that is initiated by a web application (e.g., front-end system) responsive to an action taken on a content item in the collaborative cloud-based environment.

In process 1112, the rule manager parses the event to identify event criteria. For example, the event criteria can include an action type (i.e., type of action performed that triggered the event, e.g., upload) or an enterprise identifier.

In process 1114, the rule manager scans the rules based on the event criteria and, at decision process 1116, determines if the event matches a rule. In one embodiment, the rule manager can also scan the rules for conditions that are compared to the event criteria to determine if an event matches a rule. In process 1118, the rule manager selects a rule that matches the event criteria, if one exists. Next, in process 1120, the rule manager identifies a job description associated with the selected rule. For example, the job description can indicate the type of job that is to be performed.

In process 1122, the rule manager generates a new job request based on the job description and, in process 1124, waits for additional new jobs to be generated to batch multiple job requests. Lastly, in process 1126, the rule manager distributes the batched jobs to the job manager. As discussed below with reference to FIG. 11, in some embodiments, load balancers may be used to distribute events to multiple instances of the rule manager and jobs to multiple instances of the job manager, respectively. Additionally, the instances referred to herein are referring to additional distributed hardware resources.

Figure 12:
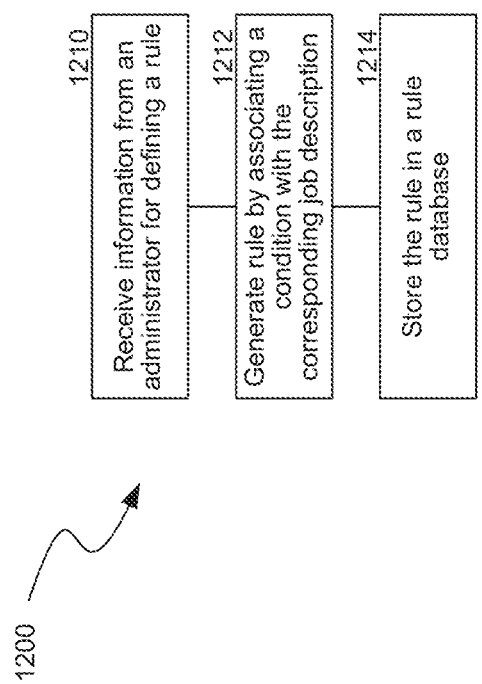
FIG. 12 depicts a flow diagram illustrating an example process for generating and storing a user-defined rule, according to an embodiment.

FIG. 12 depicts a flow diagram illustrating an example process 1200 for generating and storing a user-defined rule, according to an embodiment. A rule manager such as, for example, rule manager 700 of FIG. 7 can, among other functions, perform the example process 1200. The rule manager may be embodied as hardware and/or software, including combinations and/or variations thereof. In addition, in some embodiments, the rule manager can include instructions, wherein the instructions, when executed by one or more processors, cause the one or more processors to perform one or more processes including the following processes.

To begin, in process 1210, the rule manager receives information from an administrator for defining a new rule. In one embodiment, the information includes a user defined condition and a corresponding job definition. For example, the condition "on file upload into folder A" can be received from the administrator with a corresponding job "move the file into folder B." As discussed above, the user-defined (or predefined) rules can be applied to incoming events (e.g., ALF events) to automatically generate jobs to be performed by workers in a computing platform.

In one embodiment, the rule manager can extract various additional conditions and/or job descriptions based on, for example, the type of condition. This is referred to herein as a complex rule. For example, if the condition "on file upload" is received with the job description "scan file," then the system can extract various jobs to perform in sequence: extract text, scan file for keyword, and quarantine file if keyword found.

In process 1212, the rule manager generates the rule by associating condition(s) with the corresponding job description(s) and, lastly, in process 1214, the rule is stored in a rules database.

Figure 13:
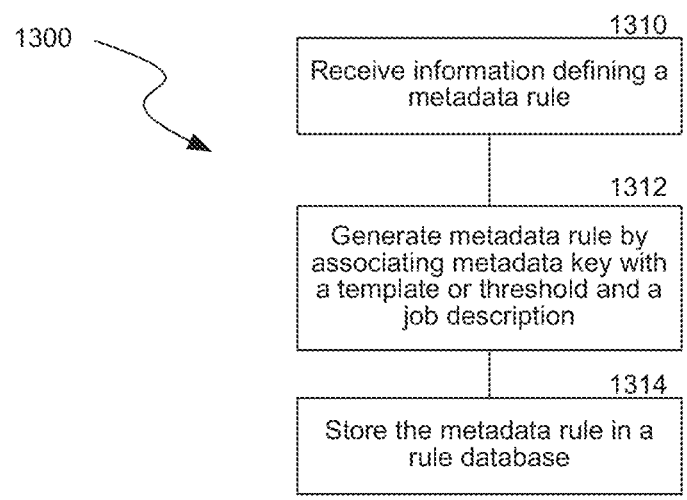
FIG. 13 depicts a flow diagram illustrating an example process for generating and storing a metadata rule, according to an embodiment.

FIG. 13 depicts a flow diagram illustrating an example process 1300 for generating and storing a metadata rule, according to an embodiment. A rule manager such as, for example, rule manager 700 of FIG. 7 can, among other functions, perform the example process 1300. The rule manager may be embodied as hardware and/or software, including combinations and/or variations thereof. In addition, in some embodiments, the rule manager can include instructions, wherein the instructions, when executed by one or more processors, cause the one or more processors to perform one or more processes including the following processes.

To begin, in process 1310, the rule manager receives information from an administrator for defining a new metadata rule. In one embodiment, the information identifies an associated template and/or a key value for metadata. Additionally, the information can also include a threshold value for the key that causes the rule to be triggered. For example, if the metadata template defines a contract, then one metadata attribute or key may be the value of the contract. A rule can be set that triggers a particular action or job in the event that the value of the contract exceeds a particular preset value. For instance, one or more notifications may be sent to particular individuals for review. Similarly, a metadata attribute of a contract template could include a status attribute that causes a particular action or job to be performed when the value of the key-value pair change from 'PENDING' to 'APPROVED'. In this manner, metadata or changes to metadata can trigger job requests (e.g., events or actions).

In process 1312, the rule manager generates the metadata rule by associating the metadata key with additional information (e.g., template and/or threshold value) and with one or more corresponding job description(s) and, lastly, in process 1314, the metadata rule is stored in a rules database.

Figure 14:
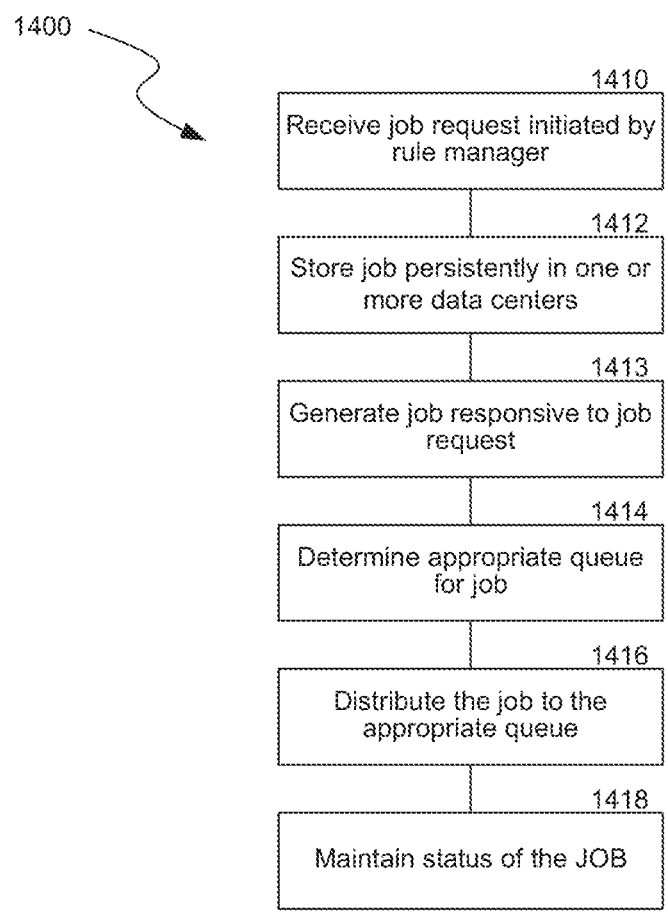
FIG. 14 depicts a flow diagram illustrating an example process for queuing jobs and ensuring job execution, according to an embodiment.

FIG. 14 depicts a flow diagram illustrating an example process 1400 for queuing jobs and ensuring job execution, according to an embodiment. A job manager such as, for example, job manager 800 of FIG. 8 can, among other functions, perform the example process 1400. The job manager may be embodied as hardware and/or software, including combinations and/or variations thereof. In addition, in some embodiments, the rule manager can include instructions, wherein the instructions, when executed by one or more processors, cause the one or more processors to perform one or more processes including the following processes.

To begin, in process 1410, the job manager receives a job initiated by the rule manager and, in process 1412, stores the job persistently in one or more data centers. In one embodiment, the job manager stores the job in multiple remote data centers at least one of which is geographically remote.

In process 1413, the job manager generates jobs responsive to the job requests and, in process 1414, the job manager determines an appropriate queue for the job. In one embodiment, the appropriate queues are selected based on the type of job. That is, particular queues can be designed for and serviced by workers that are specifically configured to perform those jobs. By way of example and not limitation, the system can designate dedicated queues for the following jobs: preview jobs, video conversion jobs, text extraction jobs, virus scan jobs, thumbnail creation jobs, data loss prevention (DLP) jobs, etc. Alternatively or additionally, one or more general-purpose queues could be utilized by one or more general-purpose workers (i.e., workers configured to perform a variety of different types of jobs).

In process 1416, a job manager distributes the job to the appropriate queue and, lastly, in process 1418, the job manager maintains the current status of the job. As described in more detail with reference to FIG. 15, status updates (e.g., started, completed, failed) can be persisted to the local HBase cluster.

Figure 15:
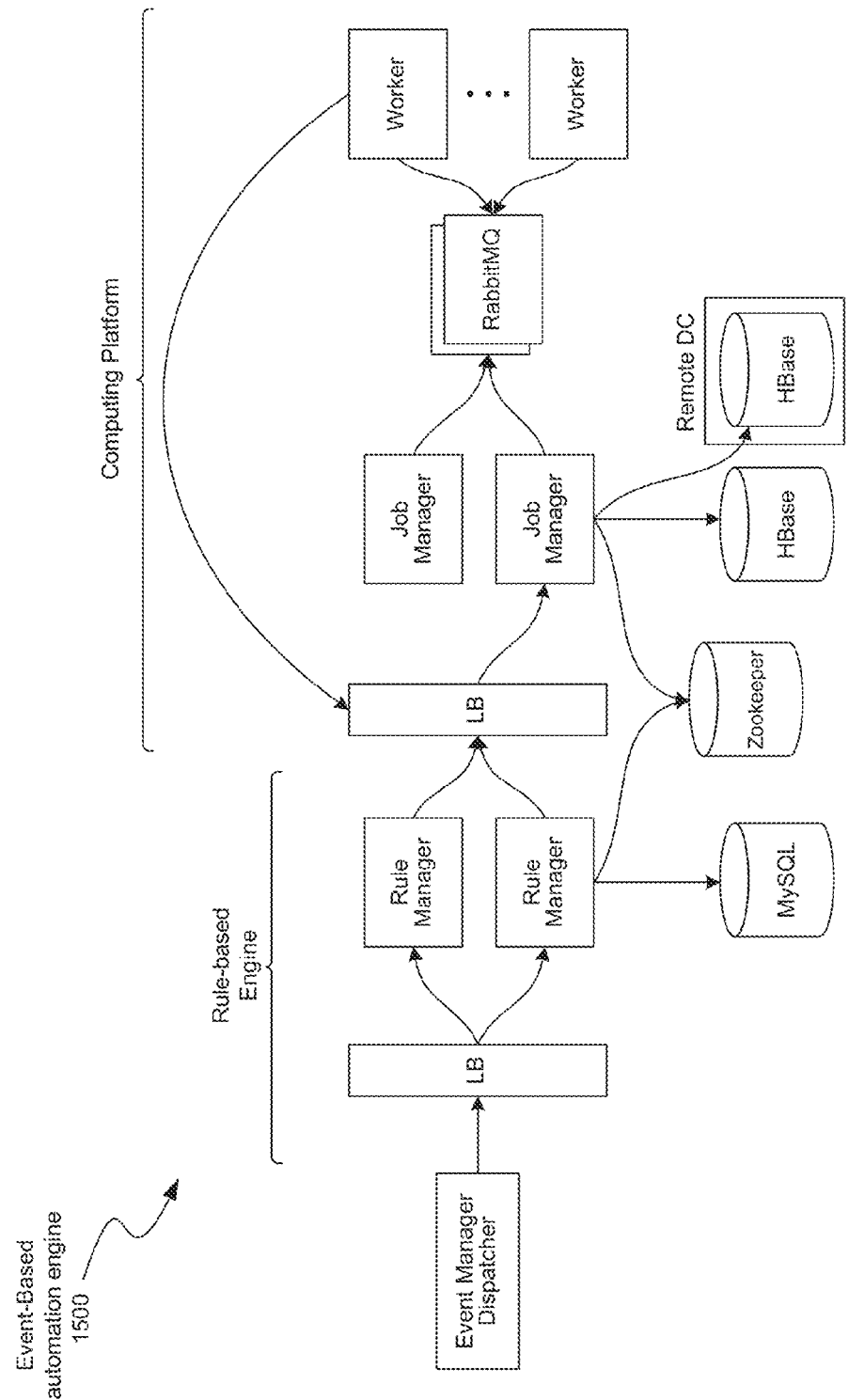
FIG. 15 depicts a diagram illustrating another example event-based automation engine including a rule-based engine and a computing platform.

FIG. 15 depicts a diagram illustrating another example event-based automation engine 1500 including a rule-based engine and a computing platform. As shown in the example of FIG. 15, the rule-based engine includes an event manager dispatcher, an event load balancer, multiple rule managers, a jobs load balancer, multiple job managers, multiple rabbitMQ queues, and multiple workers. Additionally, a MySQL database is shown in communication with the multiple rule managers for storing the rules, and a Zookeeper distributed services system is shown in communication with the rule managers and the job managers as part of the distributed system to help coordinate various different services including coordination and distribution of new rules. Further, an HBase storage database is shown at a local data center and a second HBase storage database is replicated at a remote data center (i.e., remote from the first data center).

The rule manager is responsible for translating events it receives from the action log dispatcher (ALD) (or event manager dispatcher (EMD)) into job requests depending on a set of customer specified rules. For example, if a file is uploaded to a certain folder, a task could be automatically created and assigned to a user for that file. More specifically, the rule manager generates jobs for content workflow based on the ALF stream. Importantly, incoming events are not acknowledged until jobs are persisted to HBase and, thus, the rule matching and job generation step has low latency. In addition, the rules are user-defined and, thus, any number of rules can be defined. The rule manager can scale (i.e., with additional instances) with the increasing number of rules.

In one embodiment, events are distributed from an ALF system via the ALD service. The ALD can send a request containing a set of events to the rule manager. Each event can be described as an action log. Thus, for each action log, the rule manager can parse out the action_type and enterprise_id and then scan for rules matching the action_type and enterprise_id against its local cache.

In one embodiment, the rules are defined using a rule description language (RDL) which can be parsed by the rule manager to extract the filters and job template. For example, rules can have an optional set of simple conditional filters such as, for example, "=" by which to filter out jobs to avoid the need to send no-op jobs to the job manager. The filters work by comparing data extracted from the action log against predefined static values. For job creation, rules can include a template job description that the rule manager can populate using data from the action log. The filled out template is essentially a serialized job body.

Once the events in the current requests from the ALD are evaluated, the rule manager can forward the generated jobs to the job manager. The rule manager will receive an acknowledgement from the job manager and send an acknowledgement back to the ALD. If no jobs are created from a request from the ALD, then the rule manager will simply acknowledge the request immediately.

The job manager is a component of content workflow that receives job requests from the rule manager. In addition to supporting content workflow, the job manager is also intended to be a general-purpose job system that can provide asynchronous job execution for other services. The job manager is generally responsible for creating new jobs and monitoring the status of jobs. The job manager essentially ensures that a job will be executed. As discussed above, new jobs and status updates (e.g., started, completed, failed) can be persisted to the local HBase cluster.

In one embodiment, when the job manager receives a new job request, it first persistently stores the job to HBase. Once the job has been saved to HBase, the job manager will acknowledge the job request and thereby guarantee the execution of the job. After the job manager has acknowledged the job request, the job manager will then queue the job in RabbitMQ for execution. Workers actively pick up jobs off the queue and execute these jobs.

In one embodiment, prior to queuing the job, the job manager can inject callbacks into the job description to be notified by a worker before it begins executing a job, after it finishes executing a job, and/or if an error occurs during execution. To handle temporary errors, the job manager uses an actor to periodically re-queue jobs that have not been started or completed after a configurable amount of time. The job manager also has an actor that is dedicated to replicating to the remote HBase cluster on a configurable interval.

As illustrated in the example of FIG. 15, in one embodiment, the job managers receive requests from behind the jobs load balancer, which distributes requests between multiple job manager instances. In one embodiment, each instance runs a Jetty web server and Scalatra that are bundled together. These services are used to handle communication to the job manager including receiving requests for new jobs and also for status updates from workers.

In one embodiment, each request to the rule manager can contain a batch of requests. The jobs (job requests) sent from the rule manager to the job manager can also be batched. In some embodiments, a single request from the rule manager will contain all the jobs that should be generated for a request from the action log dispatcher (ALD). A single event from the dispatcher can thus spawn a group of jobs (e.g., FILE UPLOAD) and can trigger virus scanning and text extraction jobs. The job manager responds to a request by indicating, for each group of jobs, whether the entire group of jobs is guaranteed to be run. When an incoming job request is written to HBase, it is at that point "guaranteed" by the job manager. This guarantee will be reflected in the response. Additionally, the web interface scales horizontally by deploying additional servers with the job manager service.

In one embodiment, rule updates are performed through the rule manager web application. For example, the web application can perform CRUD operations on rules using the DB_Model framework. For the rule manager to keep its internal cache (or database) of rules in sync with the web application rule changes, the web application can insert an event into the ALF stream for every change to the rules. The rule manager processes all ALF events at least once, and thus, the rule manager identifies the rule update event and can responsively update the version in Zookeeper to notify all subscribing rule manager instances to update their local caches (rule databases).

In one embodiment, the rule manager utilizes RDL to describe rules. The RDL includes syntax for facilitating translation of an action to a job. In one embodiment, each rule has a rule description defined using RDL. The following snippet illustrates the basic structure of an RDL rule:

```
{
  "rdl_version": <int> // what version of the RDL are we using
  "rule_id": <int> // id of the rule. Useful for reporting/debugging
  "action_log_version": <int> // what version of the action was this written against
  "job": {
    /**
     * Template of the job body that would be forwarded to the job manager.
     * See jobs for more
     **/
  }
  "filter": {
    // filters we need to apply before job creation. see filters for more
  }
}
```

In one embodiment, rules are stored in a MySQL database. However, an additional index table can allow the rule manager to quickly filter rules by enterprise id and action type. An example rules search index table schema (Table 1) and the associated rules table schema (Table 2) follow.

TABLE 1

Example rules search index table schema

| Ref | Information |
|---|---|
| 1 | rule_search_index_id - primary id |
| 2 | rule_id - foreign key to g_box_content_workflow_rules |
| 3 | action_type_id - id of the type of action that occurred |
| 4 | enterprise_id - id of the enterprise for which to apply this rule (this field is set to 0 if there is no such specific enterprise) |
| 5 | all_enterprises - Boolean of whether the rule applies to all enterprise users; if this is true, enterprise_id is set to 0 |
| 6 | all_users - Boolean of whether the rule applies to all users; if this is true, enterprise_id is set to 0 |
| 7 | created - timestamp of when the rule_search_index was created |
| 8 | updated - timestamp of when the rule_search_index was updated |
| 9 | deleted - timestamp of when the rule_search_index was deleted |

TABLE 2

Example rules table schema

| Ref | Information |
|---|---|
| 1 | rule_id - primary id |
| 2 | description - description of the rule specified in RDL |
| 3 | created - timestamp of when the rule was created |
| 4 | updated - timestamp of when the rule was updated |
| 5 | deleted - timestamp of when the rule was deleted |

To prevent conflicts of fields used to filter rules aside from action_type_id, only one field from the set of these "filter fields" (enterprise_id, allEnterprises, allUsers) is used. Examples of valid values for the "filter fields" include, but are not limited to, those shown in Table 3.

TABLE 3

Example valid values for "filter fields"

Rule applies to all enterprise actions:
enterprise_id = 0; allEnterprises = true; allUsers = false
Rule applies to actions from enterprise 32:
enterprise_id = 32; allEnterprises = false; allUsers = false
Rule applies to all users (free + enterprise):
enterprise_id = 0; allEnterprises = false; allUsers = true In one embodiment, the rule manager also supports a ruleset. For example, rules that form part of a logical workflow can be grouped together into a ruleset. In this case, a ruleset_id is included with the rules template table schema. Users can interact with this feature from the UI.

In one embodiment, rules are cached in-memory for the rule manager instance. As discussed above, these local caches of all rule manager instances are synchronized via versioning in Zookeeper.

In one embodiment, the rule manager supports the following basic analysis of rules:
1. Given an event, find all rules that will be applied.
2. Given an event, list all jobs generated.

The service can also be set up with a secondary index that will allow aggregation counts of the kinds of rules or jobs present in the system.

In one embodiment, the rule manager supports templating. Templating includes the process of allowing the rule manager to populate fields from the action log into a given field or position in the job template. The fields can reference any field in the API event object.

In one embodiment, the rule manager supports versioning. Versioning allows the rule manager to check the action log version and the RDL version to determine if an incoming action log data can be successfully applied. For user-defined filters, only fields in the official events API can be referenced. The rule manager is responsible for ensuring fields in the events API are correctly extracted from action log data. This means that the rule manager is responsible for maintaining backwards compatibility.

In one embodiment, the rule manager supports permission control. That is, requests to the rule manager must be authenticated.

Workflows for Managing Flow-Based Interactions with Cloud-Based Shared Content

Any of the heretofore-described systems can include a workflow engine that operates using a cloud-based shared content system. The workflow engine manages workspaces accessed by users to facilitate collaboration (e.g., to perform workflow-specific tasks over shared documents). FIG. 16A through FIG. 16D depict variations of implementations and variations of use models.

Figure 16A:
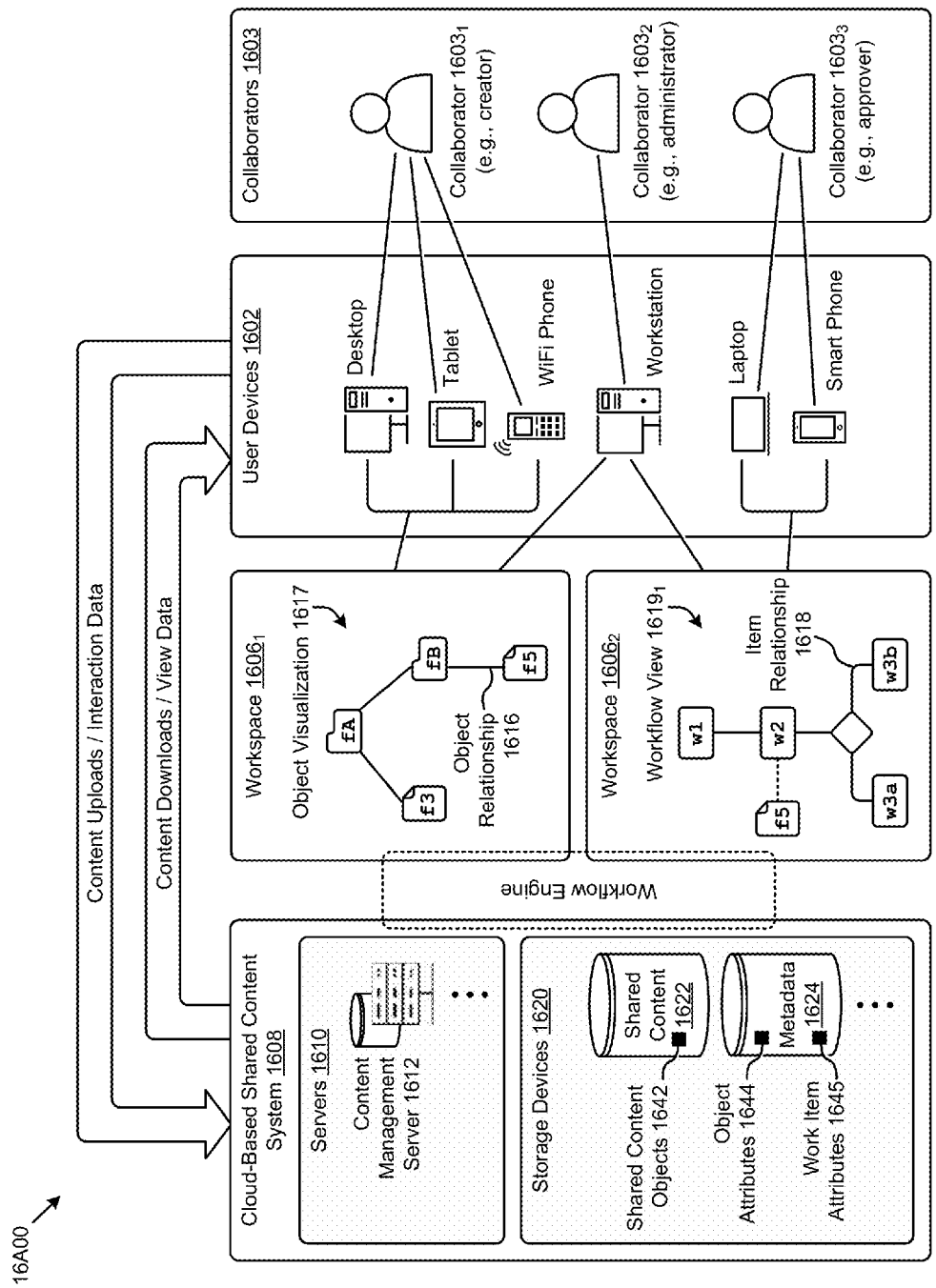
FIG. 16A depicts a cloud-based environment including a collaborative cloud-based shared content management platform that facilitates interactions with a metadata-based workflow attribute management platform, according to some embodiments.

FIG. 16A depicts a cloud-based environment 16A00 including a collaborative cloud-based shared content management platform that facilitates interactions with a metadata-based workflow attribute management platform. As an option, one or more variations of cloud-based environment 16A00 or any aspect thereof may be implemented in the context of the architecture and functionality of the embodiments described herein.

As shown, certain users (e.g., collaborators 1603) having various collaboration roles (e.g., creator, editor, administrator, approver, auditor, reviewer, etc.) can use one or more instances of user devices 1602 to interact with one or more workspaces (e.g., workspace $1606_1$, workspace $1606_2$, etc.) facilitated by a cloud-based shared content system 1608 (e.g., comprising a content-based workflow service) in the cloud-based environment 16A00. As an example, collaborator $1603_1$ might be a content creator (e.g., designer) with access to workspace $1606_1$, collaborator $1603_3$ might be an approver with access to workspace $1606_2$, and collaborator $1603_2$ might be an administrator with access to both workspaces. The workspaces can be stored in any location, and can be at least partially maintained by components within the cloud-based shared content system 1608. The cloud-based shared content system 1608 supports any variety of processing elements and/or storage devices 1620 (e.g., a storage filer, a storage facility, etc.) and/or servers 1610 such as a content management server 1612, a host server, a sync server, an application server, a cloud drive server, a content server, and/or other processing elements.

Any of the users can be provisioned authorized access to various portions (e.g., collections of shared content objects 1642) of a set of shared content 1622 stored in the storage devices 1620 without requiring the additional process of manually downloading and storing a file locally on an instance of the user devices 1602 (e.g., a desktop computer, a tablet, a WiFi phone, a workstation, a laptop computer, a smart phone, etc.). For example, one of the shared content objects 1642 (e.g., computer file, text document, audio file, video file, image file, etc.) created by collaborator $1603_1$ might be viewed and/or approved by collaborator $1603_3$ without informing the collaborator $1603_3$ where the file is physically stored in the storage devices 1620. Such a facility streamlines the frequently repeated sharing and/or collaboration processes (e.g., by automating the process of locating the file).

Such sharing and/or collaboration processes can be facilitated at least in part by certain shared content object visualizations presented to the collaborators in the workspaces. Specifically, for example, an object visualization 1617 is presented in workspace $1606_1$ to facilitate management (e.g., navigation, browsing, selection, etc.) of shared content accessible by a given user and/or collaborator. As shown in object visualization 1617, a collection of folders (e.g., fA and fB) and files (e.g., f3 and f5) are logically associated by various object relationships (e.g., object relationship 1616). In some embodiments, the cloud-based shared content system 1608 can use a set of object attributes 1644 in combination with work item attributes 1645 that are codified in a store of metadata 1624 to facilitate presentation of the object visualization 1617 in the workspace $1606_1$. The object attributes 1644 in combination with work item attributes 1645 characterize various aspects pertaining to each object such as object relationships (e.g., parent folder, child items, etc.), user access permissions, object collaborators, object physical location, and/or other aspects. A workflow object can be explicitly associated with any other object, or a workflow object can be implicitly associated with any other object through a relationship or through shared attributes. The cloud-based shared content system 1608 can facilitate the foregoing collaboration processes by delivering object visualization, view data and/or content downloads to the user devices, and/or receiving interaction data and/or content uploads from the user devices.

In some embodiments, the herein disclosed techniques can also implement metadata-based attribute management techniques to facilitate cross-enterprise flow-based shared content collaboration. Specifically, for example, a workflow view $1619_1$ can be presented in workspace $1606_2$ to represent a workflow pertaining to a single task or a sequence of work items (e.g., w1, w2, w3a, and w3b) that are logically interrelated by various work item relationships (e.g., item relationship 1618). In some cases, certain shared content objects (e.g., file f5) can be associated with one or more work items (e.g., work item w2). In certain embodiments, the cloud-based shared content system 1608 can use a set of work item attributes 1645 codified in the metadata 1624 to facilitate presentation of the workflow view $1619_1$ in the workspace $1606_2$ (e.g., to meet the needs of a collaboration team). The work item attributes 1645 can further be used to mark a progress through the workflow depicted in the workflow view $1619_k$. Specifically, for example, the work item attributes 1645 can characterize various aspects pertaining to each work item comprising the workflow such as the item task (e.g., approve, sign, assign, publish, etc.), item user and/or owner, the item relationships (e.g., parent item, child items, etc.), access and/or view permissions, and/or other aspects. A workflow engine can be situated in this environment anywhere. As shown, the workflow engine facilitates operations performed between cloud-based shared content system components and constituent workspaces.

As earlier mentioned, one enterprise might want to invite users from one or more other external enterprises (or two or more enterprises, etc.) to participate in selected work items comprising a given workflow. For example, an external user might be selected for a reviewing role, an auditing role, a signing role, and/or other roles. Implementation of such cross-enterprise workflow collaboration continues to increase as many of today's business models rely on extensive partnerships. Such cross-enterprise collaboration as facilitated by the herein disclosed techniques is described as pertains to FIG. 16B.

Figure 16B:
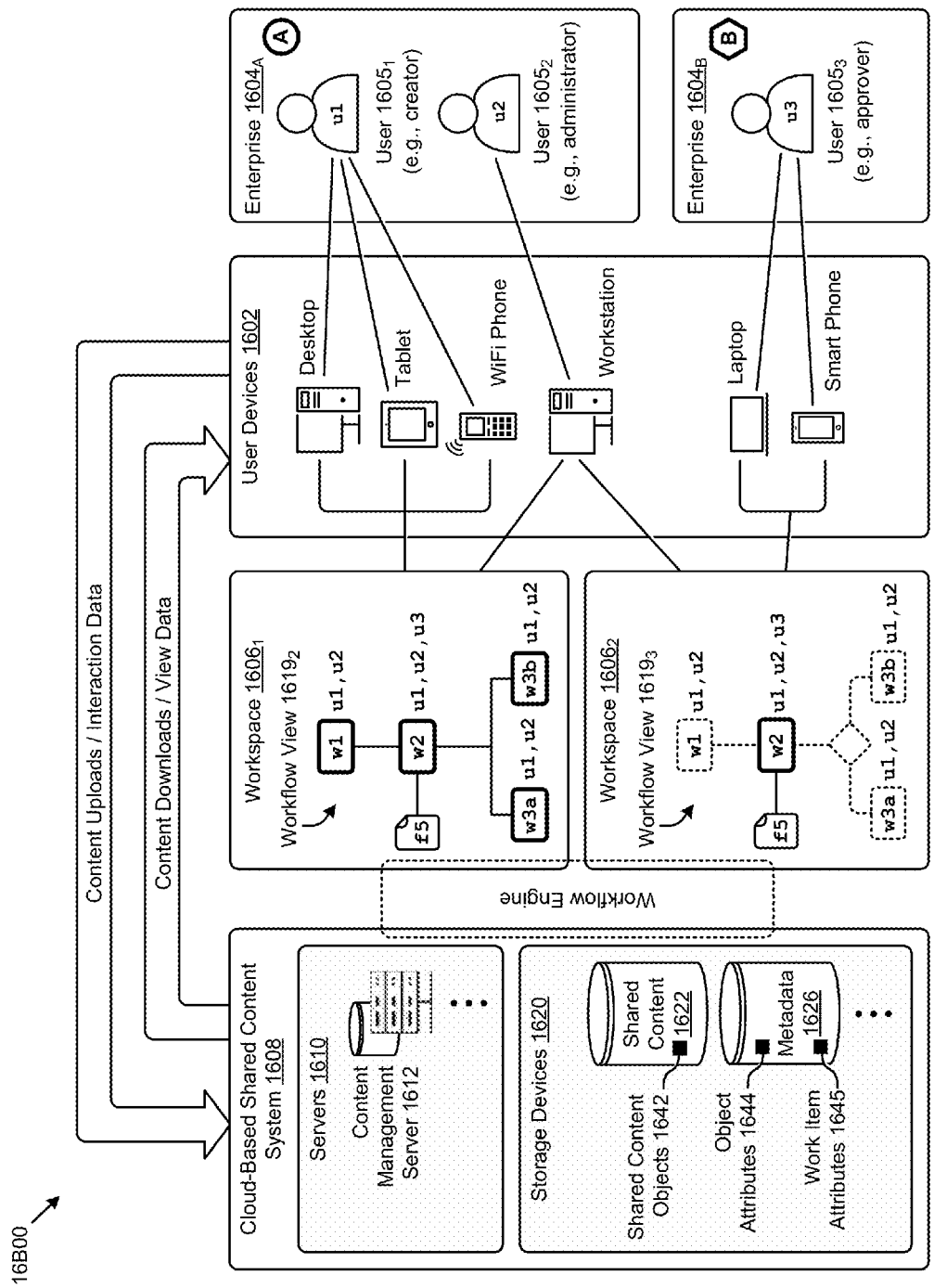
FIG. 16B presents a schematic view of a cloud-based environment showing workspace activity in accordance with cross-enterprise flows, according to some embodiments.

FIG. 16B presents a schematic view 16B00 of a cloud-based environment showing workspace activity in accordance with cross-enterprise flows. As an option, one or more variations of the cloud-based environment or any aspect thereof may be implemented in the context of the architecture and functionality of the embodiments described herein.

The embodiment shown in FIG. 16B is merely one example of various activities and/or operations pertaining to cross-enterprise flow-based shared content collaboration facilitated by the herein disclosed techniques for metadata-based workflow attribute management. Specifically, according to some embodiments, FIG. 16B depicts users from multiple enterprises participating in a flow-based collaboration (e.g., workflow) facilitated by the herein disclosed techniques as implemented in the cloud-based environment 16A00 (e.g., comprising the cloud-based shared content system 1608 and associated components from FIG. 16A). More specifically, a user $1605_1$ (e.g., user u1) and a user $1605_2$ (e.g., user u2) from an enterprise $1604_A$ (e.g., enterprise A) can view a workflow view $1619_2$ in the workspace $1606_1$ from respective instances of the user devices 1602. As an example, the workflow view $1619_2$ might represent a workflow comprising various work items (e.g., w1, w2, w3a, and w3b) pertaining to the approval and release of the file f5. In some cases, the workflow might be selected based on the file type and/or other criteria.

As shown in the workflow view $1619_2$, the work items can be viewed by user u1 and user u2 of enterprise A. As further shown, a user $1605_3$ (e.g., user u3) from an enterprise $1604_B$ (e.g., enterprise B) can also be selected as a participant on work item w2. For example, the administrator user (e.g., user $1605_2$) might select the user $1605_3$ as the approver for file f5 for the workflow based on certain established business processes, rules, and/or policies. In some cases, participants external to the enterprise invoking the workflow might have a different view of the workflow (e.g., a restricted view). Specifically, for example, and as shown in workflow view $1619_3$ in the workspace $1606_2$, the user $1605_3$ might merely have viewing access to work item w2 and the associated file f5.

In certain embodiments, the foregoing viewing and/or access permissions can be associated with each work item comprising a given workflow. According to the herein disclosed techniques, such fine-grained associations can be codified in metadata as further described pertaining to FIG. 16C1, FIG. 16C2, and FIG. 16C3.

FIG. 16C1, FIG. 16C2, and FIG. 16C3 illustrate a workflow attribute update technique 16C00 facilitated by a metadata-based workflow attribute management platform for cross-enterprise flow-based shared content collaboration. As an option, one or more variations of workflow attribute update technique 16C00 or any aspect thereof may be implemented in the context of the architecture and functionality of the embodiments described herein. The workflow attribute update technique 16C00 or any aspect thereof may be implemented in any environment.

As shown in FIG. 16C1, a workflow view $1619_4$ depicts a workflow comprising three work items (e.g., w7, w8, and w9) associated with a shared content object (e.g., document f3). As an example, the workflow might be invoked by a user u4 from an enterprise C releasing the document f3 for approval (at workflow event $1652_1$). In some cases, the shown workflow might be automatically selected based on the document, the user, the enterprise, and/or other criteria. For example, a document might be assigned a certain document type, which document type can then be matched to a specific workflow, which is in turn automatically triggered.

In other cases, the user u4 and/or a workflow administrator associated with the user u4 might design and/or select the shown workflow. Such an administrator can be associated with enterprise C or a third-party workflow application provider.

According to the herein disclosed techniques, the workflow depicted in workflow view $1619_4$ can be managed using work item attributes captured in a metadata storage facility. Specifically, and as shown, such metadata might comprise various instances of workflow participant metadata and/or various instances of work item metadata. Other attributes and/or metadata are possible. For example, the workflow participant metadata $1632_1$ and the work item metadata $1634_1$ might correspond to the state of the workflow represented in the workflow view $1619_4$. At launch of the workflow, the workflow participant metadata $1632_1$ indicates that a user u3 from enterprise C is identified as the workflow administrator (e.g., type=admin) for work items w7, w8, and w9. Further, the user u4 from enterprise C is identified as a reviewer for work items w7, w8, and w9. The work item metadata $1634_1$ associates various attributes with the work items comprising the workflow. For example, work item w7 might be associated with no parent item (e.g., parent=null, namely the root item in the workflow), document f3, a document release event (e.g., trigger=doc.release), selecting participants (e.g., task=select), a then current active state (e.g., state=active), and/or other attributes. As another example, work item w8 might be associated with a parent item w7, document f3, a trigger responsive to completion of the parent item (e.g., trigger=parent.done), an approver signature task (e.g., task=sign), a then current pending state (e.g., state=pend), and/or other attributes. Further, work item w9 might be associated with a parent item w8, document f3, a trigger responsive to completion of the parent item (e.g., trigger=parent.done), a final document publication (e.g., task=publish), a then current pending state (e.g., state=pend), and/or other attributes.

The admin role provisioned to user u3 in workflow view $1619_4$ indicates that user u3 can take action to complete the active work item w7. Specifically, as an example, user u3 might invite user u5 from enterprise D to participate as an approver for the workflow (at workflow event $1652_2$). Responsive to the workflow event $1652_2$, a workflow view $1619_5$ can be presented with associated instances of metadata (e.g., workflow participant metadata $1632_2$ and work item metadata $1634_2$). As shown, the workflow participant metadata $1632_2$ comprises a metadata update $1636_1$ identifying user u5 as the approver at work item w8. The work item metadata $1634_2$ also comprises a metadata update $1636_2$ indicating a state change for work item w7 from active to done, and a state change for work item w8 from pend to active. The work item w8 can remain in the active state until the task (e.g., sign) associated with work item w8 is executed.

FIG. 16C2 depicts a state transition of the workflow view $1619_5$, the workflow participant metadata $1632_2$, and the work item metadata $1634_2$ earlier described in FIG. 16C1. As shown, the state transition is responsive to the user u5 from enterprise D signing the document f3 (at workflow event $1652_3$). Responsive to the workflow event $1652_3$, a workflow view $1619_6$ can be presented with associated instances of metadata (e.g., workflow participant metadata $1632_3$ and work item metadata $1634_3$). As shown, the workflow participant metadata $1632_3$ comprises a metadata update $1636_3$ updating the role of user u4 to approver and updating the role of user u5 to reviewer. The work item metadata $1634_3$ also comprises a metadata update $1636_4$ indicating a state change for work item w8 from active to done and a state change for work item w9 from pend to active. The work item w9 can remain in the active state until the task (e.g., publish) associated with work item w9 is executed.

Specifically, FIG. 16C3 depicts a state transition of the workflow view $1619_6$, the workflow participant metadata $1632_3$, and the work item metadata $1634_3$ earlier described in FIG. 16C2. As shown, the state transition is responsive to the user u4 from enterprise C publishing the document f3 (at workflow event $1652_4$). For example, the user u4 might click a "Publish" button presented in a user device after reviewing the workflow view $1619_6$ and/or the document f3 to confirm completion of all ancestor work items in the workflow. Responsive to the workflow event $1652_4$, a workflow view $1619_7$ can be presented with associated instances of metadata (e.g., workflow participant metadata $1632_3$ and work item metadata $1634_4$). As shown, the work item metadata 1634₄ comprises a metadata update 1636₅ indicating a state change for work item w9 from active to done.

Figure 16D:
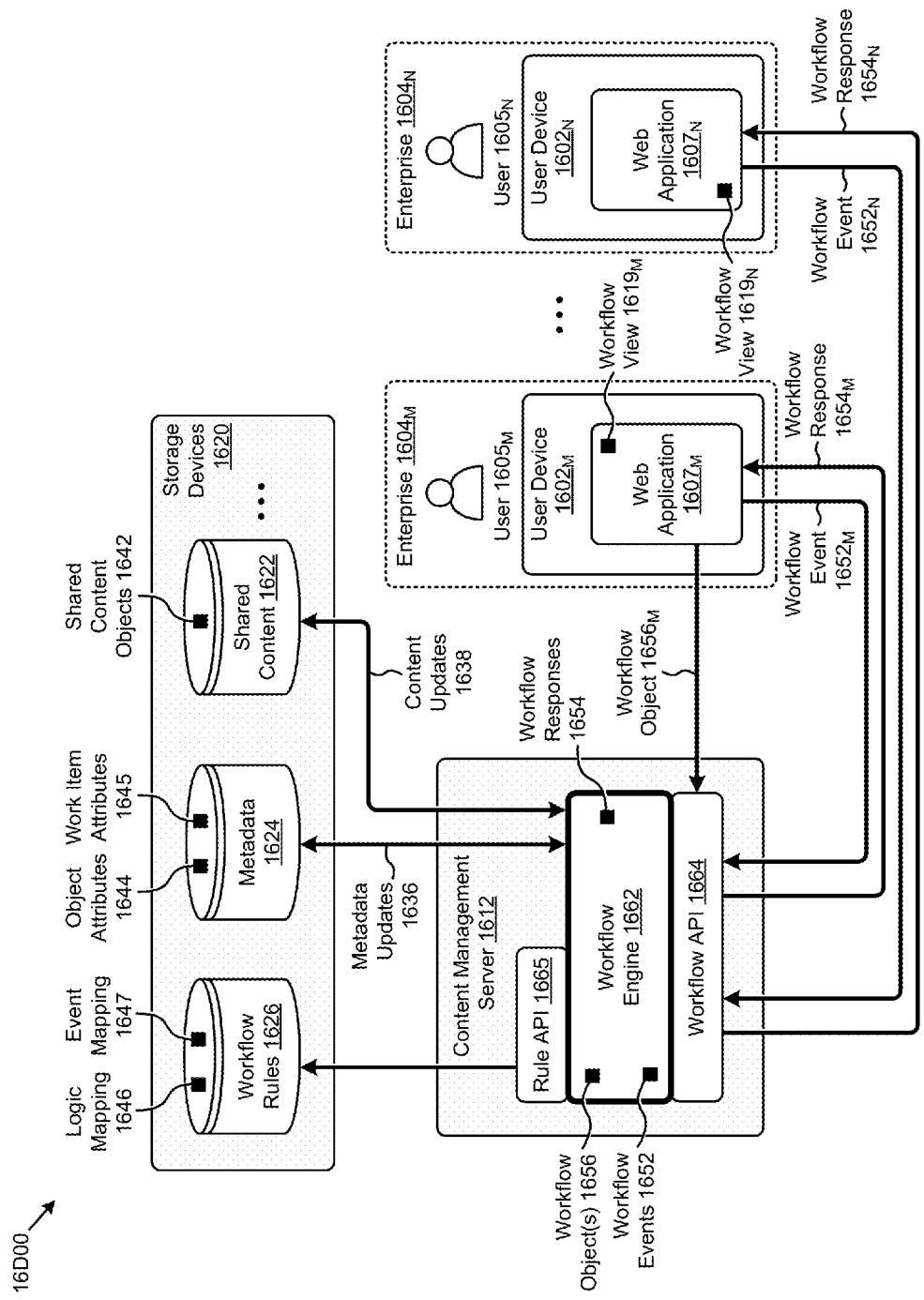
FIG. 16D is a block diagram of a system for managing flow-based user interactions with shared content in a highly collaborative cloud-based environment, according to an embodiment.

One embodiment of a system for implementing the foregoing workflow attribute update technique 16C00 and/or other herein disclosed techniques is described as pertaining to FIG. 16D.

FIG. 16D is a block diagram 16D00 of a system for managing flow-based user interactions with shared content in a highly collaborative cloud-based environment. As an option, one or more variations of block diagram 16D00 or any aspect thereof may be implemented in the context of the architecture and functionality of the embodiments described herein. The block diagram 16D00 or any aspect thereof may be implemented in any environment.

The system in FIG. 16D depicts multiple users from multiple enterprises (e.g., user $1605_M$ from enterprise $1604_M$, and user $1605_N$ from enterprise $1604_N$) participating in flow-based collaboration on the shared content 1622 from the storage devices 1620 using the herein disclosed techniques. Specifically, in one or more embodiments, the components comprising the system can facilitate a metadata-based workflow attribute management platform to facilitate cross-enterprise, flow-based, shared content collaboration. More specifically, the user $1605_M$ can participate in such flow-based collaboration using a web application $1607_M$ on a user device $1602_M$ to issue instances of a workflow event $1652_M$ to, and receive instances of a workflow response $1654_M$ from, an application programming interface (e.g., workflow API 1664) at the content management server 1612.

The user $1605_N$ can further participate in flow-based collaboration using a web application $1607_N$ on a user device $1602_N$ to issue instances of a workflow event $1652_N$ to, and receive instances of a workflow response $1654_N$ from, the workflow API 1664. The user $1605_M$ and the user $1605_N$ can use one or more instances of a workflow view $1619_M$ and a workflow view $1619_N$, respectively, at their respective user devices to further facilitate the flow-based collaboration. In some cases, for example, workflow events can be invoked from the workflow views. For example, a user might click an "Approve" button in a workflow view to create a workflow event that might change the state of the workflow. In other cases, the workflow views can be derived from the workflow responses. For example, a workflow state change might precipitate a workflow response that results in presenting a signature box to an approver in a workflow view.

The workflow API 1664 can process (e.g., parse, translate, etc.) the incoming and outgoing messages (e.g., events, responses, etc.) to facilitate interactions with a workflow engine 1662 operating at the content management server 1612. Specifically, the workflow event $1652_M$ and/or the workflow event $1652_N$ might correspond to at least a portion of the workflow events 1652 processed at the workflow engine 1662. The workflow response $1654_M$ and/or the workflow response $1654_N$ can correspond with at least a portion of the workflow responses 1654 processed at the workflow engine 1662. In certain embodiments, one or more of the users (e.g., user $1605_M$) participating in the flow-based collaboration can select one or more workflow objects (e.g., workflow object $1656_M$) to deliver to the workflow API 1664, which workflow objects describe a given workflow (e.g., the work items, etc.). In some cases, a given workflow object might be selected by the workflow engine 1662 based on certain workflow events and/or other information. A set of workflow objects 1656 might be available at the workflow engine 1662 for selection and/or activation.

Each instance of workflow objects 1656 can be characterized by the work item attributes 1645 codified in the metadata 1624 stored in the storage devices 1620. The herein disclosed techniques can be facilitated at least in part by a set of metadata updates 1636 to the metadata 1624 responsive to the workflow events 1652. Specifically, the workflow engine 1662 can generate the workflow responses 1654 based at least in part on detected instances of the workflow events 1652. The workflow responses 1654 can be used to determine the metadata updates 1636. For example, a workflow event corresponding to a "Forward" button click might generate a workflow response comprising an update to metadata describing a work item state (e.g., from state=active to state=done) and a workflow alert sent to the user device of the owner of the next work item in the workflow. In some cases, one or more of the object attributes 1644 characterizing one of the shared content objects 1642 associated with the workflow might be updated in the metadata 1624. In other cases, a given workflow response might precipitate one or more instances of content updates 1638 to the shared content 1622. For example, a signature provided by an approver might be applied in a designated location of a legal agreement without having to download, print, sign, scan, and upload the agreement.

In some embodiments, the workflow engine 1662 might apply a set of workflow rules 1626 to the workflow events 1652 and/or the work item attributes 1645 to determine the workflow responses 1654, the metadata updates 1636, and/or the content updates 1638. Specifically, an event mapping 1647 in the workflow rules 1626 might map a received workflow event to one or more operations (e.g., update metadata, update content, send workflow alert, etc.) executed at the workflow engine 1662. A logic mapping 1646 in the workflow rules 1626 and/or a mapping operation of functions within the rule API 1665 might map a trigger description in the work item attributes 1645 to a set of logic to be executed at the workflow engine 1662. For example, a trigger=parent.done work item attribute might map to a set of conditional logic (e.g., if parent.state=="done" THEN set.metadata.child.state="active") comprising inputs extracted from other metadata (e.g., parent attributes, state attributes, etc.).

The system shown in FIG. 16D presents merely one partitioning. The specific example shown is purely exemplary, and other subsystems and/or partitionings are envisioned. One example of the work item attributes 1645 implemented in such systems, subsystems, and/or partitionings for managing flow-based user interactions with shared content in a highly collaborative cloud-based environment is presented in FIG. 17.

Figure 17:
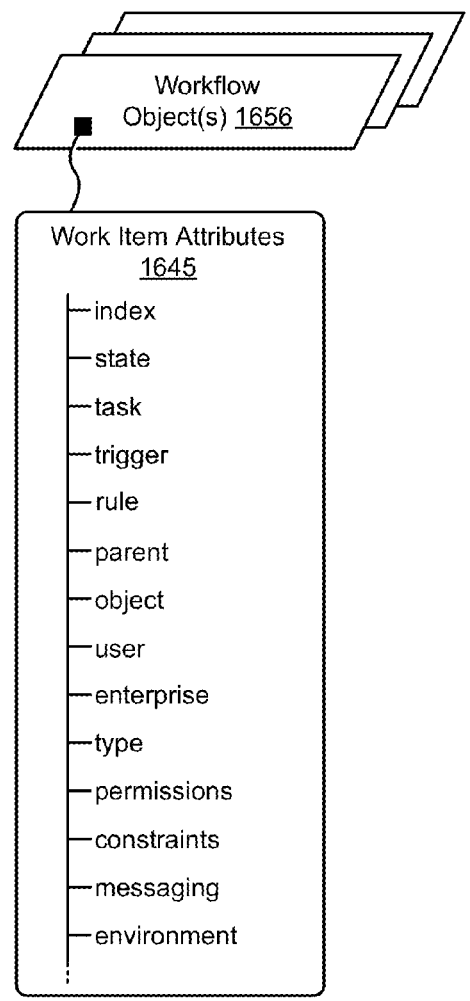
FIG. 17 presents a diagrammatic representation of workflow object attributes for use in systems for managing flow-based user interactions with shared content in a highly collaborative cloud-based environment, according to an embodiment.

FIG. 17 presents a diagrammatic representation 1700 of workflow object attributes for use in systems for managing flow-based user interactions with shared content in a highly collaborative cloud-based environment. As an option, one or more variations of diagrammatic representation 1700 or any aspect thereof may be implemented in the context of the architecture and functionality of the embodiments described herein. The diagrammatic representation 1700 or any aspect thereof may be implemented in any environment.

As earlier described, each instance of the workflow objects 1656 can be characterized by a set of work item attributes 1645. As an example, each work item comprising a workflow defined by a workflow object might be described in a metadata table (e.g., persistent store) having columns corresponding to the attributes shown in FIG. 17, and rows corresponding to each of the work items. The workflow object might be structured as a programming code object comprising various instances or time-based streams of work item attributes 1645.

Specifically, the example set of work item attributes 1645 shown in FIG. 17 identifying attributes pertaining to: an item (e.g., unique item identifier, etc.), a state (e.g., pending, active, done, etc.), a task (e.g., select, sign, approve, review, publish, etc.), a trigger (e.g., parent.done, workflow.launch, doc.release, etc.), a rule (e.g., if state=="done" . . . , etc.), a parent (e.g., preceding work item), an object (e.g., unique identifier of associated content, etc.), a user (e.g., unique identifier of associated participants, etc.), an enterprise (e.g., unique identifier of associated user enterprises, etc.), a type (e.g., reviewer, approver, editor, auditor, internal, external, etc.), permissions (e.g., full, limited, view only, etc.), constraints (e.g., time limit, value limit, etc.), messaging settings (e.g., push specifications, pull specifications, alerts on, alerts off, etc.), an environment (e.g., internal, external, department, geographic region, etc.), and/or other attributes.

In some embodiments, at least some of the foregoing attributes and/or other information might be applied to machine learning techniques to select and/or dynamically construct a workflow object for a given scenario. For example, such techniques might facilitate automatically applying a security classification and associated workflow object (e.g., for approval, compliance, etc.) to a document based on its attributes as compared to the attributes of other documents and workflow objects. In such cases, the learning model might be trained by workflow objects manually designed by administrators.

Further details regarding general approaches to providing secure access to shared documents are described in U.S. application Ser. No. 14/838,212 titled, "ACCESSING A CLOUD-BASED SERVICE PLATFORM USING ENTERPRISE APPLICATION AUTHENTICATION" filed on Aug. 27, 2015, which is hereby incorporated by reference in its entirety.

Further details regarding general approaches to machine learning analysis of documents are described in U.S. Application Ser. No. 62/113,288 titled, "METHOD AND SYSTEM FOR IMPLEMENTING MACHINE LEARNING ANALYSIS OF DOCUMENTS" filed on Feb. 6, 2015, which is hereby incorporated by reference in its entirety.

Figure 18:
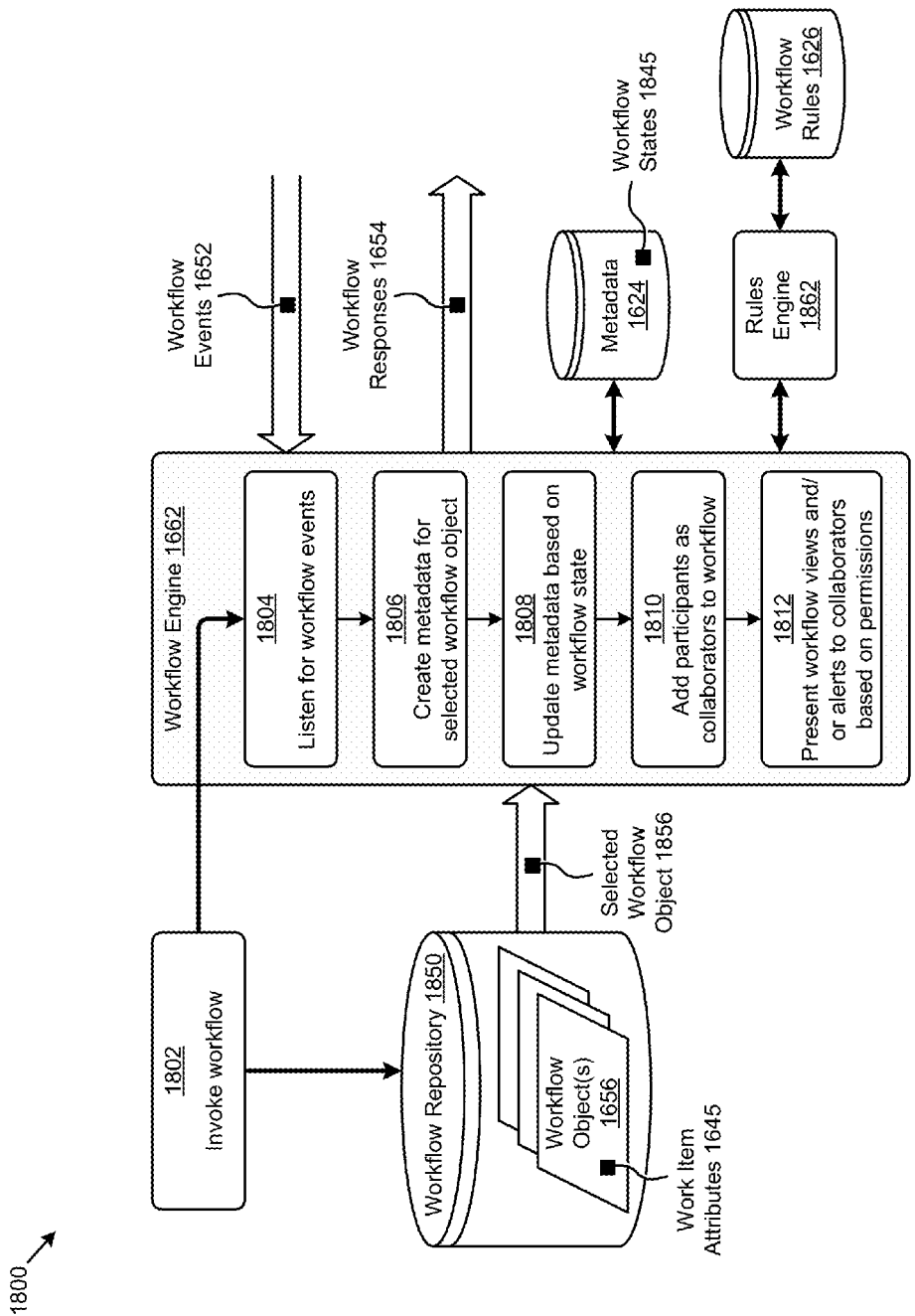
FIG. 18 presents a subsystem for managing workflow operations in platforms implementing metadata-based workflow attribute management to facilitate cross-enterprise flow-based shared content collaboration, according to an embodiment.

In other embodiments, the workflow object can be selected from a repository of workflows (e.g., workflow templates) for implementation. FIG. 18 illustrates such a scenario.

FIG. 18 presents a subsystem 1800 for managing workflow operations in platforms implementing metadata-based workflow attribute management to facilitate cross-enterprise flow-based shared content collaboration. As an option, one or more variations of subsystem 1800 or any aspect thereof may be implemented in the context of the architecture and functionality of the embodiments described herein. The subsystem 1800 or any aspect thereof may be implemented in any environment.

As shown in FIG. 18, a workflow repository 1850 can comprise one or more workflow objects 1656 defining a respective workflow. The workflow objects can have a schema to facilitate implementation of the workflow in the workflow engine 1662. For example, the schema might describe a structure for holding the work item attributes 1645 for the work items comprising a given workflow. Such work item attributes can describe progression paths among the stages (e.g., work items, states, etc.) of the workflow. Additionally, the work item attributes 1645 may define authorization permissions, users (e.g., participants, etc.), and/or other attributes associated with the workflow object.

A selected workflow object 1856 can be selected from the workflow repository 1850 when a user invokes a workflow at the workflow engine 1662 (at operation 1802). Responsive to the configuration of the selected workflow object 1856, the workflow engine 1662 can perform various operations, which operations might generate instances of workflow responses 1654. Specifically, the workflow engine 1662 can begin listening for workflow events 1652 (at operation 1804). Instances of workflow events 1652 and/or other inputs to the workflow engine 1662 can be received from a cloud-based shared content storage service, from external sources (e.g., third-party systems), and/or other sources. The workflow engine 1662 can also create metadata for the selected workflow object 1856 (at operation 1806). For example, the metadata 1624 might be based at least in part on the work item attributes for the selected workflow object 1856 for managing the workflow states 1845 and/or other workflow attributes. In some cases, the metadata can be updated by the workflow engine 1662 based on detected instances of the workflow events 1652 (at operation 1808). The workflow engine 1662 might also update the metadata to identify participants added as collaborators to the workflow (at operation 1810). Various workflow views and/or alerts can be presented to such participants to facilitate the execution of the workflow (at operation 1812).

In some embodiments, the workflow engine 1662 can use the workflow rules 1626 to determine the workflow responses 1654 and/or other outcomes. For example, the workflow rules 1626 can apply to the selected workflow object 1856 and/or to the work items comprising the selected workflow object 1856. As an example, such rules might comprise Boolean and/or conditional logic clauses or statements. In some cases, certain workflow attributes and/or workflow event data might be applied as inputs to such rule-based logic. In certain embodiments, a rules engine 1862 might be implemented to interface between the workflow engine 1662 and the workflow rules 1626. The rules engine 1862 can be implemented as a service. In such cases, the workflow engine 1662 can pass messages and/or data to the rules engine 1862 (e.g., external to the workflow engine environment) for processing and response.

The techniques described as pertaining to subsystem 1800 and/or other embodiments disclosed herein can facilitate cross-enterprise flow-based shared content collaboration for users and/or enterprises (e.g., two or more users that are associated with one or more different enterprises) interacting directly with a cloud-based shared content platform or interacting with the cloud-based shared content platform through a third-party workflow provider (e.g., using an API provided by the cloud-based platform). Embodiments implementing variations of a third-party provider framework are shown and described as pertaining to FIG. 19A and FIG. 19B.

Figure 19A:
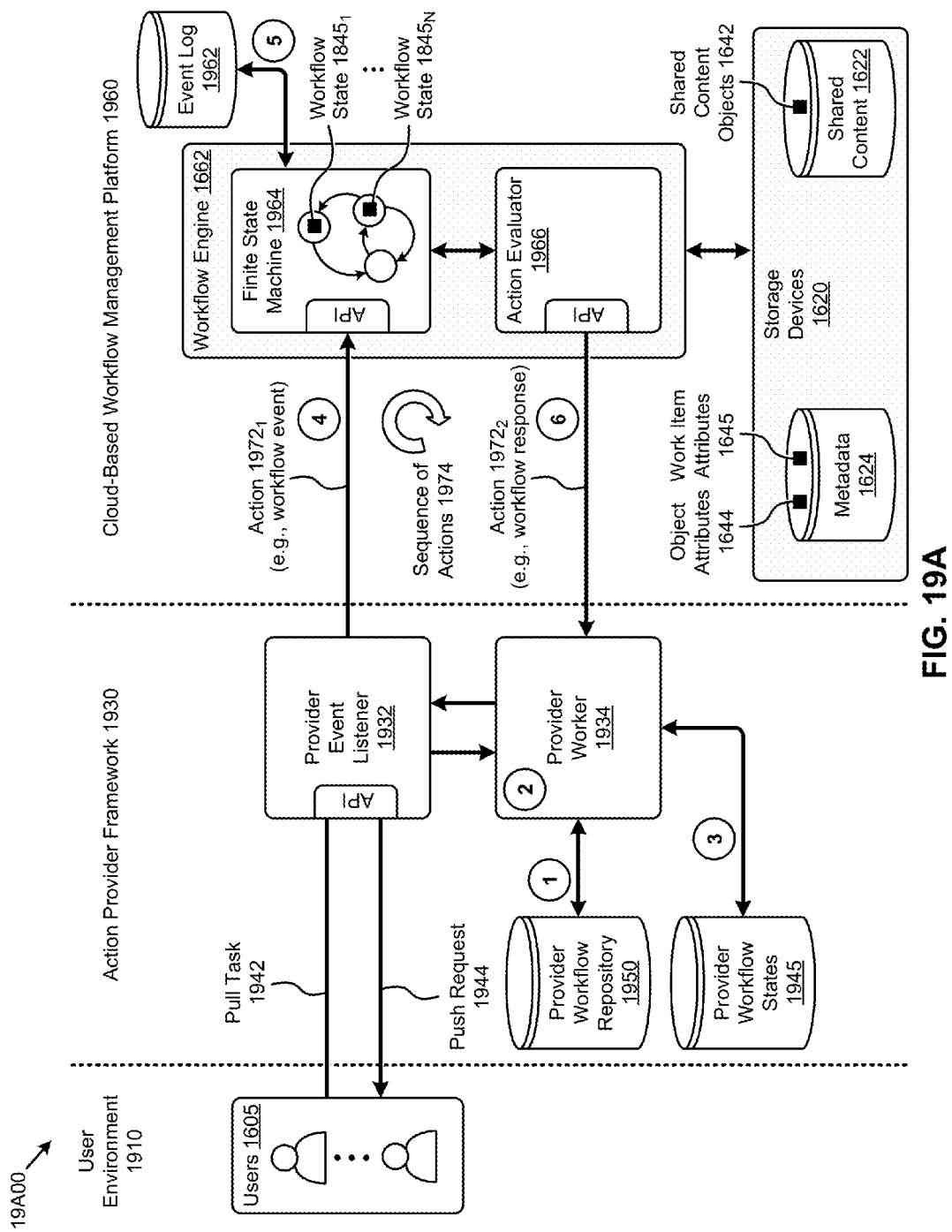
FIG. 19A depicts a workflow as implemented using a third-party application interfacing with a metadata-based workflow management platform, according to some embodiments.

FIG. 19A depicts a workflow 19A00 as implemented using a third-party application interfacing with a metadata-based workflow management platform. As an option, one or more variations of document workflow 19A00 or any aspect thereof may be implemented in the context of the architecture and functionality of the embodiments described herein. The document workflow 19A00 or any aspect thereof may be implemented in any environment.

The herein disclosed techniques can be implemented in systems comprising various partitions (e.g., layers) such as partitions that can facilitate one or more third-party applications pertaining to workflow management. For example, a third party might provide a framework to provide workflow templates (e.g., for collaboration over a document) to a set of external users. In such cases, the third party can use an API provided by a "back-end" cloud-based workflow management environment implementing the herein disclosed techniques.

Specifically, FIG. 19A depicts a user environment 1910 that comprises various instances of users 1605 interacting with an action provider framework 1930 (e.g., third-party workflow application) facilitated by a cloud-based workflow management platform 1960 implementing the herein disclosed techniques. Specifically, the users 1605 interact with a provider event listener 1932 coupled with a provider worker in the action provider framework 1930. The provider event listener 1932 and the provider worker 1934 interface with a finite state machine 1964 and an action evaluator 1966, respectively, at a workflow engine 1662 in the cloud-based workflow management platform 1960. The provider event listener 1932 can issue messages (e.g., push request 1944, alerts, views, etc.) to the users 1605 and/or receive messages (e.g., pull task 1942, DOM events, etc.) from the users 1605 as pertains to a workflow traversing through various work items and/or states. For example, and as shown, the workflow might be selected from a provider workflow repository 1950. The states of the workflow might be captured in the provider workflow states 1945.

The provider event listener 1932 can issue various messages (e.g., action $1972_1$, workflow event, etc.) to the finite state machine 1964 through an API. As an example, the finite state machine 1964 can manage the sequence of steps (e.g., work items, tasks, internal events, etc.) comprising a given workflow instance. The finite state machine 1964 can also evaluate the context of events and/or responses, publish state transition events, and/or perform other operations. Specifically, for example, the finite state machine 1964 can respond to the received messages according to the workflow selected at the action provider framework 1930. In some cases, received actions and/or workflow events can precipitate a change to shared content (e.g., a document to be acted upon) and/or can precipitate a change to workflow states (e.g., workflow state $1845_1$, . . . , workflow state $1845_N$) pertaining to the selected workflow. Some events might be captured in an event log 1962 to facilitate certain operations such as workflow processing, auditing, and/or other operations. The action evaluator 1966 can interpret the action, the workflow state, and/or other information to determine one or more messages to deliver to the provider worker 1934. For example, multiple operations (e.g., recurrent scheduled jobs) within the cloud-based workflow management platform 1960 in response to a received instance of the action $1972_1$ might result in merely one instance of the action $1972_2$ (e.g., work item is "complete") delivered to the provider worker 1934.

A sequence of actions 1974 (e.g., continuous incoming and outgoing actions) can comprise the actions for fully executing a given workflow. For example, a multiple user document collaboration workflow might be invoked by a user creating and submitting (e.g., using the provider worker 1934) a document to be acted upon (at step #1). Responsive to detecting the document submission, the provider can select a workflow object and/or template from the provider workflow repository 1950 based on the submitted document (at step #2). In some cases, certain attributes (e.g., work item attributes) pertaining to the selected workflow might be delivered to the workflow engine 1662 to facilitate later processing. In other cases, certain information associated with the work items (e.g., review tasks) of the selected workflow can be stored in the provider workflow states 1945 (at step #3). The provider event listener 1932 can detect the completion of an action over the document by a first user and inform the finite state machine 1964 of the occurrence of action $1972_1$ (at step #4). In some cases, the event can be logged (at step #5). The action evaluator 1966 can interpret the workflow state and/or other information available to the workflow engine 1662 to determine a response to provide to the provider worker 1934. For example, a message might be delivered indicating a next action is called for by the workflow such that the provider worker 1934 can issue an alert to the user responsible for taking the next action. The sequence of actions 1974 can continue until the workflow is complete. In some cases, the sequence of actions 1974 can be logged during processing and/or at completion of the workflow.

Any of the aforementioned operations over work items and their constituent metadata (e.g., work item attributes 1645) and/or operations over shared content (e.g., shared content objects 1642 in FIG. 16A, FIG. 16B, FIG. 16D, FIG. 19A, and FIG. 19B) and/or its constituent attributes (e.g., object attributes 1644 in FIG. 16A, FIG. 16B, FIG. 16D, FIG. 19A, and FIG. 19B) can be stored as metadata 1624 or shared content 1622 in storage devices 1620, as shown.

Such metadata can be used in many contexts, including contexts involving applications that interface with a metadata-based workflow management platform to carry out a workflow involving multiple parties, and involving documents that are stored at and accessed through a cloud-based repository. Strictly as one example, a metadata-based workflow management platform can be used to carry out multiple tasks to obtain a signature on a document.

Figure 19B:
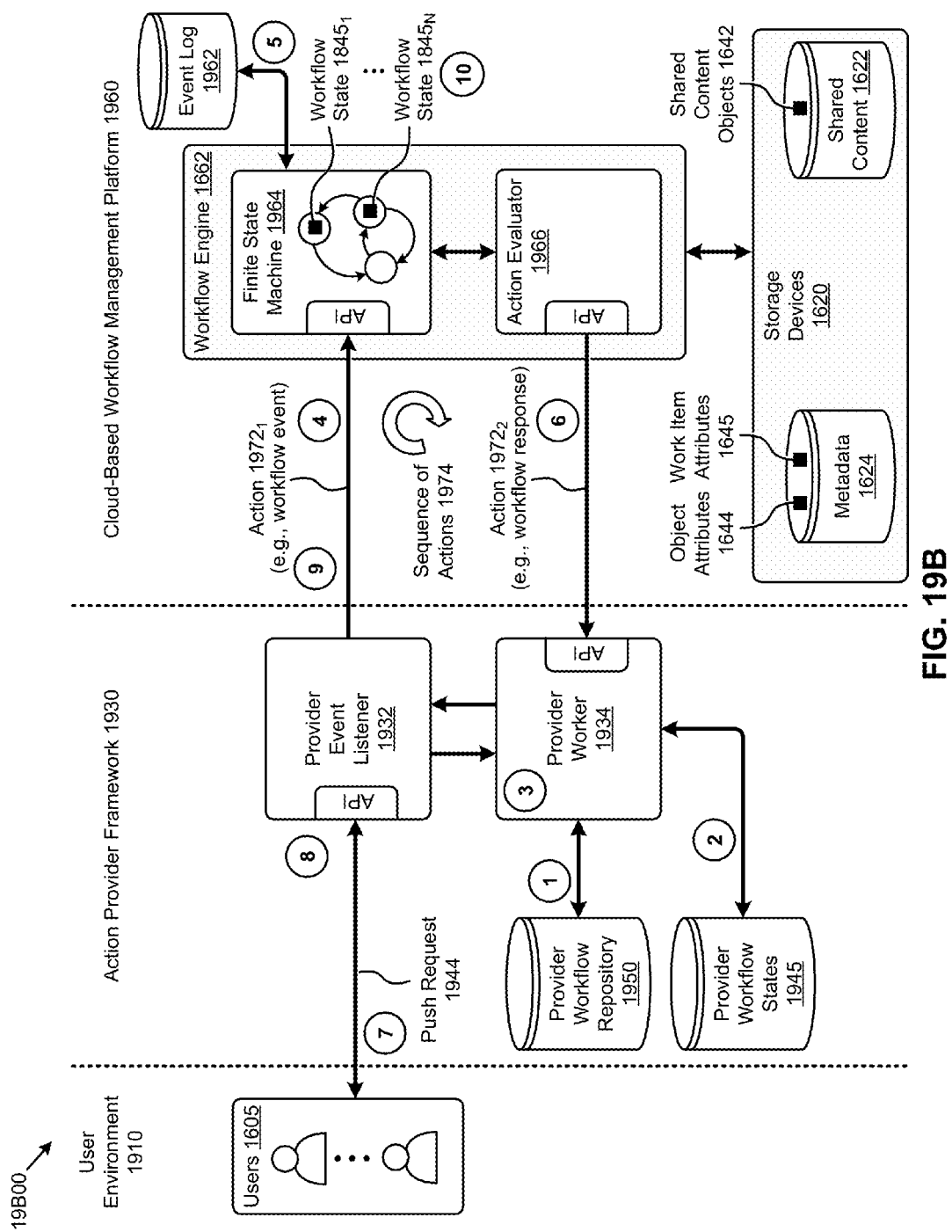
FIG. 19B depicts a document signature workflow as implemented using a third-party application interfacing with a metadata-based workflow management platform, according to some embodiments.

FIG. 19B depicts a document signature workflow 19B00 as implemented using a third-party application interfacing with a metadata-based workflow management platform. As an option, one or more variations of document signature workflow 19B00 or any aspect thereof may be implemented in the context of the architecture and functionality of the embodiments described herein. The document signature workflow 19B00 or any aspect thereof may be implemented in any environment.

As aforementioned, workflow objects comprise workflow metadata that describes a workflow (e.g., a document signature workflow) as a set of workflow tasks to be carried out in a progression. Processing of a workflow task and/or carrying out a portion of the progression includes modification of shared content objects (e.g., by applying a signature to the document). The processing or modification events are detected through workflow events that occur either in the domain of the action provider framework 1930 or in the domain of the cloud-based workflow management platform 1960. Such events cause one or more workflow responses to be generated. Workflow responses comprise updates to the workflow metadata to record progression through the workflow (e.g., the document has been signed) and/or workflow responses comprise updates to any one or more of the stored objects (e.g., the signature is applied to the document).

The shown flow (e.g., step #1 through step #5) depicts a "Document Signing Workflow". In this scenario, a document provider such as a bank agent or real estate broker creates a document to be signed. Such a document might be stored in the provider workflow repository 1950 (as shown at step #1). Next (step #2), in this "Document Signing Workflow", a provider generates a workflow as a series of upload, sharing, review, signature application, possibly as well as further review, and/or further sharing tasks. Availability of the created document and availability of the generated workflow is made known to the provider worker 1934. The act of accessing the created document and generated workflow by the provider worker can themselves be events and/or can precipitate further events that are detected by the provider event listener 1932. Some or all of the generated workflow and some or all of the created document are communicated from the action provider framework 1930 to the cloud-based workflow management platform 1960 (step #4). Some portions or all of the generated workflow and some portions or all of the created document are stored as shared content 1622, which (as shown) is accessible by the workflow engine 1662. The act of the aforementioned storage of shared content can be logged (step #5) in event log 1962. Moreover, the generated workflow and any corresponding metadata is read by the workflow engine.

In some cases, and as shown, the generated workflow and any corresponding metadata is processed by a finite state machine 1964. The action evaluator 1966 determines if there are workflow tasks that are ready to be completed and/or workflow tasks that are ready to be initiated. If so, then the workflow engine might take one or more actions based on the workflow and/or the workflow metadata values. In the specific case of a document signing workflow, the action evaluator will respond by emitting a workflow response (e.g., action $1972_2$) that is to advise the provider worker that the document is in a sharable state and that the workflow indicates that the availability of the document can be promulgated to the users 1605 (step #6). The user or users can receive notification of the availability of the document and request for signature via a push request 1944 (step #7).

At some point, a user will sign the document or otherwise respond to the request (e.g., by following instructions in the request, or by saving the signed document, etc.) which causes the push request to be satisfied. In the situation that the user does not respond to the request within a certain amount of time, the provider worker might issue a further push request to spur the user to follow the instructions or otherwise complete the assigned task. When the user follows the instructions or otherwise completes the assigned task (e.g., signs the file), the provider listener detects the completion event (step #8) and forwards the event to the workflow engine of the cloud-based workflow management platform (step #9). The event (e.g., the signing of the document), possibly including a document or document link or metadata corresponding to the event, is processed by the workflow engine, which in turn can advance the workflow state $1845_N$ (step #10). The next workflow state is entered and considered with respect to its possible completion or need to initiate next actions. In this "Document Signing Workflow", next actions might involve communications to the users to indicated the advance of the state (e.g., that the document has been signed). In some cases the advance of the state might invoke workflow responses to make updates to the document and/or its metadata and/or to the work item attributes or any other aspects of the workflow metadata and/or to any other shared content objects.

ADDITIONAL EMBODIMENTS OF THE DISCLOSURE

Additional Practical Application Examples

Figure 20:
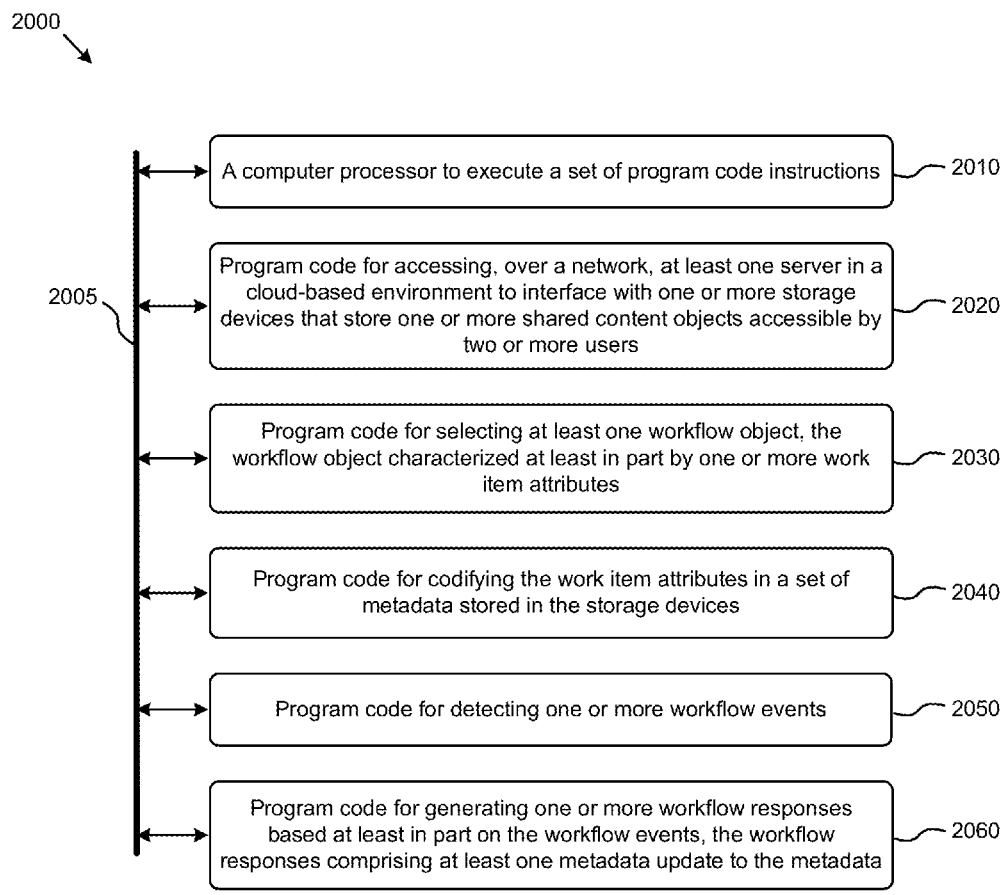
FIG. 20 depicts a system as an arrangement of computing modules that are interconnected so as to operate cooperatively to implement certain of the herein-disclosed embodiments.

FIG. 20 depicts a system 2000 as an arrangement of computing modules that are interconnected so as to operate cooperatively to implement certain of the herein-disclosed embodiments. The partitioning of system 2000 is merely illustrative and other partitions are possible. As an option, the system 2000 may be implemented in the context of the architecture and functionality of the embodiments described herein. Of course, however, the system 2000 or any operation therein may be carried out in any desired environment.

The system 2000 comprises at least one processor and at least one memory, the memory serving to store program instructions corresponding to the operations of the system. As shown, an operation can be implemented in whole or in part using program instructions accessible by a module. The modules are connected to a communication path 2005, and any operation can communicate with other operations over communication path 2005. The modules of the system can, individually or in combination, perform method operations within system 2000. Any operations performed within system 2000 may be performed in any order unless as may be specified in the claims.

The shown embodiment implements a portion of a computer system, presented as system 2000, comprising a computer processor to execute a set of program code instructions (module 2010) and modules for accessing memory to hold program code instructions to perform: accessing, over a network, at least one server in a cloud-based environment to interface with one or more storage devices that store one or more shared content objects accessible by two or more users (module 2020); selecting at least one workflow object, the workflow object describing a workflow comprising one or more work items, the workflow object characterized at least in part by one or more work item attributes (module 2030); codifying the work item attributes in a set of metadata stored in the storage devices (module 2040); detecting one or more workflow events (module 2050); and generating one or more workflow responses based at least in part on the workflow events, the workflow responses comprising at least one metadata update to the metadata (module 2060).

Variations of the foregoing may include more or fewer of the shown modules and variations may perform more or fewer (or different) steps, and/or may use data elements in more, or in fewer (or different) operations.

More Examples

Some embodiments include variations where the workflow responses further comprise at least one content update to the shared content objects.

Some embodiments include variations where the work item attributes associate at least one of, the users, or the shared content objects, to at least one of the work items.

Some embodiments include variations where the users are associated with two or more enterprises.

Some embodiments include variations that comprise acts for receiving, over the network, at least one of, the work item attributes, or the workflow events, from one or more user devices associated with the users.

Some embodiments include variations that comprise acts for delivery, over the network, at least one of, a workflow alert, or a workflow view, to one or more user devices associated with the users.

Some embodiments include variations where at least one of the workflow responses is generated by applying one or more workflow rules to at least one of, the work item attributes, or the workflow events.

Some embodiments include variations where the workflow rules comprise at least one of, an event mapping, or a logic mapping.

Some embodiments include variations where the workflow object is selected based at least in part on at least one of the workflow events.

Some embodiments include variations that comprise acts for codifying one or more object attributes in the metadata, the object attributes characterizing the shared content objects.

Some embodiments include variations where the work item attributes characterize at least one of, an item, a state, a task, a trigger, a rule, a parent, an object, a user, an enterprise, a type, one or more permissions, one or more constraints, one or more messaging settings, or an environment.

SYSTEM ARCHITECTURE OVERVIEW

Additional System Architecture Examples

Figure 21A:
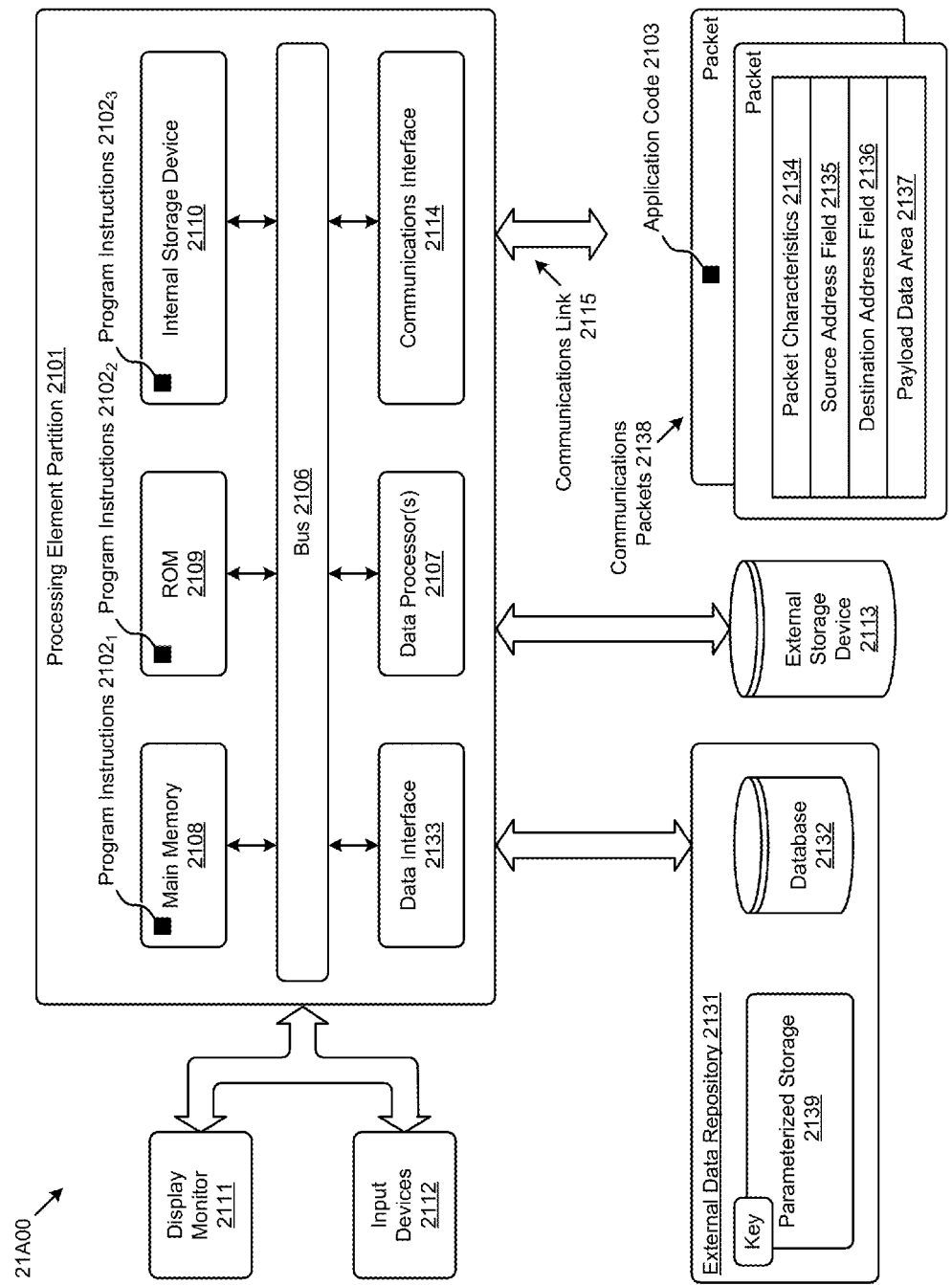
FIG. 21A and FIG. 21B present block diagrams of computer system architectures having components suitable for implementing embodiments of the present disclosure, and/or for use in the herein-described environments.

FIG. 21A depicts a block diagram of an instance of a computer system 21A00 suitable for implementing embodiments of the present disclosure. Computer system 21A00 includes a bus 2106 or other communication mechanism for communicating information. The bus interconnects subsystems and devices such as a central processing unit (CPU), or a multi-core CPU (e.g., data processor 2107), a system memory (e.g., main memory 2108, or an area of random access memory (RAM)), a non-volatile storage device or non-volatile storage area (e.g., read-only memory 2109), an internal storage device 2110 or external storage device 2113 (e.g., magnetic or optical), a data interface 2133, a communications interface 2114 (e.g., PHY, MAC, Ethernet interface, modem, etc.). The aforementioned components are shown within processing element partition 2101, however other partitions are possible. The shown computer system 21A00 further comprises a display 2111 (e.g., CRT or LCD), various input devices 2112 (e.g., keyboard, cursor control), and an external data repository 2131.

According to an embodiment of the disclosure, computer system 21A00 performs specific operations by data processor 2107 executing one or more sequences of one or more program code instructions contained in a memory. Such instructions (e.g., program instructions $2102_1$, program instructions $2102_2$, program instructions $2102_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 21A00 performs specific networking operations using one or more instances of communications interface 2114. Instances of the communications interface 2114 may comprise one or more networking ports that are configurable (e.g., pertaining to speed, protocol, physical layer characteristics, media access characteristics, etc.) and any particular instance of the communications interface 2114 or port thereto can be configured differently from any other particular instance. Portions of a communication protocol can be carried out in whole or in part by any instance of the communications interface 2114, and data (e.g., packets, data structures, bit fields, etc.) can be positioned in storage locations within communications interface 2114, or within system memory, and such data can be accessed (e.g., using random access addressing, or using direct memory access DMA, etc.) by devices such as data processor 2107.

The communications link 2115 can be configured to transmit (e.g., send, receive, signal, etc.) any types of communications packets 2138 comprising any organization of data items. The data items can comprise a payload data area 2137, a destination address 2136 (e.g., a destination IP address), a source address 2135 (e.g., a source IP address), and can include various encodings or formatting of bit fields to populate the shown packet characteristics 2134. In some cases the packet characteristics include a version identifier, a packet or payload length, a traffic class, a flow label, etc. In some cases the payload data area 2137 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 2107 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 2131, which in turn can be formatted into any one or more storage areas, and which can comprise parameterized storage 2139 accessible by a key (e.g., filename, table name, block address, offset address, etc.).

Execution of the sequences of instructions to practice certain embodiments of the disclosure are performed by a single instance of the computer system 21A00. According to certain embodiments of the disclosure, two or more instances of computer system 21A00 coupled by a communications link 2115 (e.g., LAN, PTSN, or wireless network) may perform the sequence of instructions required to practice embodiments of the disclosure using two or more instances of components of computer system 21A00.

The computer system 21A00 may transmit and receive messages such as data and/or instructions organized into a data structure (e.g., communications packets). The data structure can include program instructions (e.g., application code 2103), communicated through communications link 2115 and communications interface 2114. Received program code may be executed by data processor 2107 as it is received and/or stored in the shown storage device or in or upon any other non-volatile storage for later execution. Computer system 21A00 may communicate through a data interface 2133 to a database 2132 on an external data repository 2131. Data items in a database can be accessed using a primary key (e.g., a relational database primary key).

The processing element partition 2101 is merely one sample partition. Other partitions can include multiple data processors, and/or multiple communications interfaces, and/ or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 2107. Some embodiments include one or more special-purpose hardware components (e.g., power control, logic, sensors, transducers, etc.). A module may include one or more state machines and/or combinational logic used to implement or facilitate the operational and/or performance characteristics of managing flow-based user interactions with shared content in a highly collaborative cloud-based environment.

Various implementations of the database 2132 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of managing flow-based user interactions with shared content in a highly collaborative cloud-based environment). Such files or records can be brought into and/or stored in volatile or non-volatile memory.

Figure 21B:
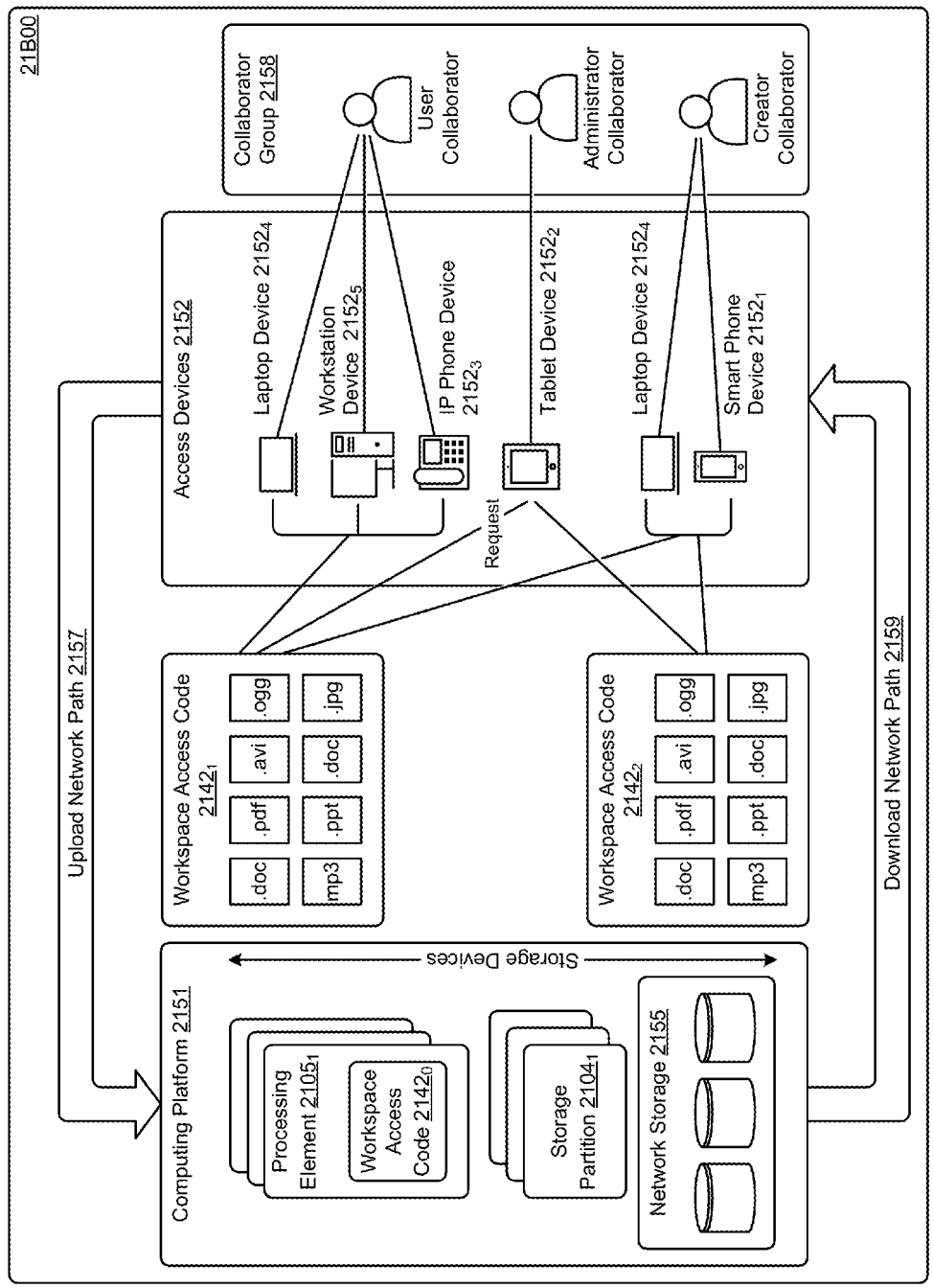

FIG. 21B depicts a block diagram of an instance of a cloud-based environment 21B00. Such a cloud-based environment supports access to workspaces through the execution of workspace access code (e.g., workspace access code $2142_0$, workspace access code $2142_1$, and workspace access code $2142_2$). Workspace access code can be executed on any of the shown access devices 2152 (e.g., laptop device $2152_4$, workstation device $2152_5$, IP phone device $2152_3$, tablet device $2152_2$, smart phone device $2152_1$, etc.). A group of users can form a collaborator group 2158, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform 2151, including in a middleware setting. As shown, a portion of the workspace access code resides in and can be executed on one or more processing elements (e.g., processing element $2105_1$). The workspace access code can interface with storage devices such as the shown networked storage 2155. Storage of workspaces and/or any constituent files or objects, and/or any other code or scripts or data can be stored in any one or more storage partitions (e.g., storage partition $2104_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 2157). A stored workspace can be delivered to a particular user and/or shared with other particular users via a download (e.g., a download from a processing element to an access device over a download network path 2159).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   accessing, over a network, at least one server in a cloud-based environment that is interfaced with one or more storage devices that store one or more shared content objects accessible by two or more users, the one or more shared content objects comprising at least one shared content object that corresponds to a folder or a file
   implementing a workflow for the one or more shared content objects using metadata comprising at least participant metadata that identifies the two or more users collaborating on the workflow and workflow metadata that describes the workflow as having a plurality of workflow tasks carried out in progression by the two or more users;
   maintaining a first database table that holds the participant metadata, wherein the first database table comprises:
      (i) a first column that holds a unique identifier for the two or more users;
      (ii) a second column that identifies the plurality of workflow tasks associated with the two or more users identified in the first column; and
      (iii) a plurality of database table rows, each row from the plurality of database table rows corresponding to a specific user, wherein the specific user is designated as a participant in various portions of the workflow by inserting a row for the specific user into the plurality of database table rows;
   maintaining a second database table that holds attributes for the plurality of workflow tasks, wherein the second database table comprises:
      (i) a first column that identifies at least some of the workflow tasks from the first database table;
      (ii) a second column that describes the workflow task that is performed on the one or more shared object;
      (iii) a third column that tracks a status associated with the workflow task; and
      (iv) a plurality of rows that each correlate to a sequence of the at least some of the workflow tasks from the second column of the first database table by tracking the progression of the workflow performed by the two or more users identified from the first column in the first database table within the workflow;

processing the workflow task that is described in the second column of the second database table, wherein the workflow task corresponds to a user from among the two or more users modifying the at least one shared content object;

detecting one or more workflow events in response to the processing of the workflow task, or in response to a modification of the at least one shared content object; and generating one or more workflow responses based at least in part on the one or more workflow events, the workflow responses comprising at least one update to the third column of the second database table.

2. The method of claim 1, the workflow responses further comprising a progression to a next workflow state, wherein the progression between work tasks is identified by associating at least some of the workflow tasks from the first column of the second database table with a parent-child item relationship stored in a third column of the first database table.

3. The method of claim 1, the first database table further comprising a third column that associates the users with two or more enterprises, the two or more enterprises comprising at least a first enterprise and a second enterprise, a first workflow view being presented for users from the first enterprise and a second workflow view is presented for users from the second enterprise, wherein the second workflow view being different from the first workflow view.

4. The method of claim 1, further comprising receiving, over the network, at least one of the workflow events from one or more user devices associated with the users.

5. The method of claim 1, further comprising delivering, over the network, at least one of, a workflow alert, or a workflow view, to one or more user devices associated with the users.

6. The method of claim 1, wherein at least one of the workflow responses is generated by applying at least one workflow rule to the at least one shared content object.

7. The method of claim 6, wherein the workflow rules comprise at least one of, an event mapping, or a logic mapping.

8. The method of claim 1, wherein the workflow task is selected based at least in part on at least one of the workflow events.

9. The method of claim 1, further comprising codifying one or more object attributes in the metadata, the object attributes characterizing the shared content objects.

10. The method of claim 1, further comprising a third column that identifies a role for a user in the first column of the first database table.

11. A computer readable medium, embodied in a non-transitory computer readable medium, the non-transitory computer readable medium having stored thereon a sequence of instructions which, when stored in memory and executed by one or more processors causes the one or more processors to perform a set of acts the acts comprising:

accessing, over a network, at least one server in a cloud-based environment that is interfaced with one or more storage devices that store one or more shared content objects accessible by two or more users, the one or more shared content objects comprising at least one shared content object that corresponds to a folder or a file implementing a workflow for the one or more shared content objects using metadata comprising at least participant metadata that identifies the two or more users collaborating on the workflow and workflow metadata that describes the workflow as having a plurality of workflow tasks carried out in progression by the two or more users;

maintaining a first database table that holds the participant metadata, wherein the first database table comprises:

(iv) a first column that holds a unique identifier for the two or more users;

(v) a second column that identifies the plurality of workflow tasks associated with the two or more users identified in the first column; and (vi) a plurality of database table rows, each row from the plurality of database table rows corresponding to a specific user, wherein the specific user is designated as a participant in various portions of the workflow by inserting a row for the specific user into the plurality of database table rows;

maintaining a second database table that holds attributes for the plurality of workflow tasks, wherein the second database table comprises:

(v) a first column that identifies at least some of the workflow tasks from the first database table;

(vi) a second column that describes the workflow task that is performed on the one or more shared object;

(vii) a third column that tracks a status associated with the workflow task; and (viii) a plurality of rows that each correlate to a sequence of the at least some of the workflow tasks from the second column of the first database table by tracking the progression of the workflow performed by the two or more users identified from the first column in the first database table within the workflow;

processing the workflow task that is described in the second column of the second database table, wherein the workflow task corresponds to a user from among the two or more users modifying the at least one shared content object;

detecting one or more workflow events in response to the processing of the workflow task, or in response to a modification of the at least one shared content object; and generating one or more workflow responses based at least in part on the one or more workflow events, the workflow responses comprising at least one update to the third column of the second database table.

12. The computer readable medium of claim 11, the workflow responses further comprising a progression to a next workflow state, wherein the progression between work tasks is identified by associating at least some of the workflow tasks from the first column of the second database table with a parent-child item relationship stored in a third column of the first database table.

13. The computer readable medium of claim 11, the first database table further comprising a third column that associates the users with two or more enterprises, the two or more enterprises comprising at least a first enterprise and a second enterprise, a first workflow view being presented for users from the first enterprise and a second workflow view is presented for users from the second enterprise, wherein the second workflow view being different from the first workflow views.

14. The computer readable medium of claim 11, further comprising instructions which, when stored in memory and executed by the one or more processors causes the one or more processors to perform acts of receiving, over the network at least one of the workflow events from one or more user devices associated with the users.

15. The computer readable medium of claim 11, further comprising instructions which, when stored in memory and executed by the one or more processors causes the one or more processors to perform acts of delivery, over the network, at least one of, a workflow alert, or a workflow view, to one or more user devices associated with the users.

16. The computer readable medium of claim 11, wherein at least one of the workflow responses is generated by applying at least one workflow rule to the at least shared content object.

17. The computer readable medium of claim 16, wherein the workflow rules comprise at least one of, an event mapping, or a logic mapping.

18. The computer readable medium of claim 11, wherein workflow task is selected based at least in part on at least one of the workflow events.

19. A system comprising:
a storage medium having stored thereon a sequence of instructions; and
one or more processors that execute the instructions to cause the one or more processors to perform a set of acts, the acts comprising,
accessing, over a network, at least one server in a cloud-based environment that is interfaced with one or more storage devices that store one or more shared content objects accessible by two or more users, the one or more shared content objects comprising at least one shared content object that corresponds to a folder or a file
implementing a workflow for the one or more shared content objects using metadata comprising at least participant metadata that identifies the two or more users collaborating on the workflow and workflow metadata that describes the workflow as having a plurality of workflow tasks carried out in progression by the two or more users;
maintaining a first database table that holds the participant metadata, wherein the first database table comprises:
(i) a first column that holds a unique identifier for the two or more users;
(ii) a second column that identifies the plurality of workflow tasks associated with the two or more users identified in the first column; and
(iii) a plurality of database table rows, each row from the plurality of database table rows corresponding to a specific user, wherein the specific user is designated as a participant in various portions of the workflow by inserting a row for the specific user into the plurality of database table rows;
maintaining a second database table that holds attributes for the plurality of workflow tasks, wherein the second database table comprises:
(i) a first column that identifies at least some of the workflow tasks from the first database table;
(ii) a second column that describes the workflow task that is performed on the one or more shared object;
(iii) a third column that tracks a status associated with the workflow task; and
(iv) a plurality of rows that each correlate to a sequence of the at least some of the workflow tasks from the second column of the first database table by tracking the progression of the workflow performed by the two or more users identified from the first column in the first database table within the workflow;
processing the workflow task that is described in the second column of the second database table, wherein the workflow task corresponds to a user from among the two or more users modifying the at least one shared content object;
detecting one or more workflow events in response to the processing of the workflow task, or in response to a modification of the at least one shared content object; and
generating one or more workflow responses based at least in part on the one or more workflow events, the workflow responses comprising at least one update to the third column of the second database table.

20. The system of claim 19, the workflow responses further comprising a progression to a next workflow state, wherein the progression between work tasks is identified by associating at least some of the workflow tasks from the first column of the second database table with a parent-child item relationship stored in a third column of the first database table.

* * * * *